United States Patent
Takahashi et al.

(10) Patent No.: US 6,665,239 B1
(45) Date of Patent: Dec. 16, 2003

(54) OPTICAL INFORMATION RECORDING AND REPRODUCING APPARATUS

(75) Inventors: Junichi Takahashi, Zama (JP); Koichi Kudou, Kanagawa-ken (JP); Nobuaki Toyoshima, Kanagawa-ken (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 09/457,140

(22) Filed: Dec. 8, 1999

(30) Foreign Application Priority Data

| Dec. 10, 1998 | (JP) | 10-351189 |
| Jan. 29, 1999 | (JP) | 11-021194 |
| Mar. 3, 1999 | (JP) | 11-055207 |
| Jul. 9, 1999 | (JP) | 11-195545 |

(51) Int. Cl.$^7$ .............................................. G11B 7/00
(52) U.S. Cl. ................ 369/44.23; 369/126; 369/112.01
(58) Field of Search .............................. 369/126, 44.26, 369/44.23, 43, 112.01, 112.27, 13.33, 44.13; 250/306, 307

(56) References Cited

U.S. PATENT DOCUMENTS

| 5,615,192 A | * | 3/1997 | Kikukawa et al. | 369/47.17 |
| 5,796,706 A | * | 8/1998 | Shintani et al. | 369/126 |
| 6,185,178 B1 | * | 2/2001 | Noh | 369/126 |
| 6,304,527 B1 | * | 10/2001 | Ito et al. | 369/126 |
| 6,370,107 B1 | * | 4/2002 | Hosaka et al. | 369/275.4 |

FOREIGN PATENT DOCUMENTS

| JP | 60101731 A | * | 6/1985 |
| JP | 04109440 A | * | 4/1992 |
| JP | 07-021564 | | 1/1995 |
| JP | 07-192280 | | 7/1995 |
| JP | 07-225975 | | 8/1995 |
| JP | 08-007323 | | 1/1996 |
| JP | 08-321084 | | 12/1996 |
| JP | 09-017047 | | 1/1997 |

* cited by examiner

Primary Examiner—Thang V. Tran
(74) Attorney, Agent, or Firm—Dickstein Shapiro Morin & Oshinsky LLP

(57) ABSTRACT

An optical information recording/reproducing apparatus enabling fine actuation of almost several nm order for performing the tracking correction includes a pair of fixed electrodes so as to put a probe therebetween in a direction perpendicular to the direction of data row arrangement on a recording medium and a voltage applying medium for applying the voltage between the respective fixed electrodes and the probe. The position of the tip end of the probe is controlled by the action of electrostatic attractive force between the fixed electrodes and the probe caused by applying the voltage thereacross. The probe is constructed with center core clad therearound. The base part is fixed and the sharpened tip end is free, as a so-called cantilever structure. The apparatus further enables to obtain the tracking error. Laser light is emitted from the tip end and radiated onto the information recording medium. The light reflected on the recording medium is converted optoelectrically. The average value of the electric signal is outputted as the tracking error signal. An information recording/reproducing apparatus capable of improving the stability of the control voltage for tracking the probe includes control voltages and bias voltage applying members respectively independent from each other.

54 Claims, 56 Drawing Sheets sensor with wavelengths as compared with the wavelength of the laser light on the projecting end surface. A recording surface 11 moves relating to the opening 10. A reflection light taken out from the recording surface 11 through the scanning head 9 is detected by a light detector 13. A scanning control head 20 unitarily mounted in parallel with the scanning head 9 includes a semiconductor laser (laser diode) 15 employed as a peculiar (original) light source, a lens system, and optoelectric conversion element 19, and generates a tracking error detecting signal for positioning the scanning head 9 onto the track of the recording surface 7. An actuator 21 is controlled on the basis of the tracking error signal and thereby the tracking accuracy can be improved.

Background Art 2 (for the First-group Invention)

On the other hand, in the published specification of, Japanese Laid-open Patent Publication No.8-321,084 (called "Background Art 2"), a structure of the optical information recording and reproducing apparatus is proposed in FIG. 15 as the structure capable of performing the positional control in the track width direction with high precision and performing the operation of recording/reproducing with high accuracy in the scanning type probe memory technology. In such structure, tracking probes 51 and 56 are provided adjacently to probes 52 through 55 in order to record and
OPTICAL INFORMATION RECORDING AND REPRODUCING APPARATUS

BACKGROUND OF THE INVENTION

1. Field of the Invention

The present invention relates to an optical information recording and reproducing apparatus for performing an optical recording or optomagnetic recording with high density and large capacity, in particular, an optical information recording and reproducing apparatus for optically recording the information or optomagnetically recording the information with high density and large capacity such as the optical information recording and reproducing apparatus which is preferable for recording and reproducing the optical information with high density and high precision by use of the adjacent-field light (evanescent light), and for radiating the light from the tip end of the probe onto the optical information recording medium, and the optical information recording and reproducing apparatus applying the probe microscope.

2. Discussion of the Background

An optical information recording and reproducing apparatus for recording and reproducing the information with high density by use of the adjacent field light (evanescent light) has been already proposed.

Background Art 1 (for the First Invention)

For instance, in the published specification of Japanese Laid open Patent Publication No.7-192,280 (called "Background Art 1), a structure of the optical information recording and reproducing apparatus is proposed in FIG. 14 as the structure capable of raising the accuracy of the tracking control and enabling to use a disc-state recording medium in the high-density recording/reproducing operation utilizing the above-mentioned evanescent light.

In such structure, a laser light radiated (emitted) from the semiconductor laser (laser diode) 1 is focused by a lens 6, and the focused laser light is applied to an optical fiber 7 through an opening 8 thereof. A scanning head 9 formed on the tip end portion of the optical fiber 7 becoming thinner toward the tip end has an opening 10 of a diameter almost equal to or smaller than the wavelength of the laser light on the projecting end surface. A recording surface 11 moves relating to the opening 10. A reflection light taken out from the recording surface 11 through the scanning head 9 is detected by a light detector 13. A scanning control head 20 unitarily mounted in parallel with the scanning head 9 includes a semiconductor laser (laser diode) 15 employed as a peculiar (original) light source, a lens system, and optoelectric conversion element 19, and generates a tracking error detecting signal for positioning the scanning head 9 onto the track of the recording surface 7. An actuator 21 is controlled on the basis of the tracking error signal and thereby the tracking accuracy can be improved.

Background Art 2 (for the First-group Invention)

On the other hand, in the published specification of, Japanese Laid-open Patent Publication No.8-321,084 (called "Background Art 2"), a structure of the optical information recording and reproducing apparatus is proposed in FIG. 15 as the structure capable of performing the positional control in the track width direction with high precision and performing the operation of recording/reproducing with high accuracy in the scanning type probe memory technology. In such structure, tracking probes 51 and 56 are provided adjacently to probes 52 through 55 in order to record and reproduce the information on a recording area 64. The positional control in the track width direction of the probes 52 through 55 for use in recording or reproducing is performed by a probe actuator 65 on the basis of the tracking error signal detected by the tracking probes 51 and 56, and thereby the positional control in the track width direction can be performed with high accuracy.

In the above-mentioned background arts 1 and 2, since the information is written in on the recording medium by use of the adjacent field light, the size of the recorded mark becomes almost several tens n m in the diameter thereof. Consequently, it is necessary to set the accuracy of the tracking for precisely writing in and reading out the recorded mark suitably to an extent of several nm.

However, although the above background arts 1 and 2 describe the detection medium for detecting the tracking error signal, those arts do not describe any concrete structure for finely moving (actuating) the probe in order to compensate the tracking error.

Background Art 3 (for the Second-group Invention)

The background art 3 described in the published specification of Japanese Laid-open Patent Publication No.7-192, 280 raises the accuracy of the tracking control in the high-density recording/reproducing by use of the evanescent light, and enables to use the disc-state recording medium.

For this reason, as shown in FIG. 17, a laser light radiated (emitted) from the semiconductor laser (laser diode) 201 is focused by a lens 202, and the focused laser light is applied to an optical fiber 203 through an opening 204 thereof. A scanning head 205 formed on the tip end portion of the optical fiber 203 becoming thinner toward the tip end has an opening 206 of a diameter almost equal to or smaller than the wavelength of the laser light on the projecting end surface. A recording surface 207 of the recording medium moves relatively to the opening 206. A reflection light taken out from the recording surface 207 through the scanning head 205 is detected by a light detector 208. A scanning control head 209 unitarily mounted in parallel with the scanning head 205 includes a semiconductor laser (laser diode) 210 employed as a peculiar (original) light source, a lens system, and optoelectric conversion element 217, and generates a tracking error detecting signal for positioning the scanning head 205 onto the track of the recording surface 207.

Background Art 4 (for the Second-group Invention)

The background art 4 described in the published specification of Japanese Patent Publication No, 8-321,084 performs the positional control in the track width direction with high accuracy in the scanning type probe memory technology and thereby performs the operation of recording or reproducing with high accuracy.

For this reason, as shown in FIG. 18, tracking probes 215 and 216 are provided adjacently to probes 211 through 214 for use in recording or reproducing the optical information. The positional control of the probes 211 through 214 for use in recording/reproducing in the track width direction is performed by the tracking error signal detected by the tracking probes 215 and 216.

Background Art 5 (for the second-group Incention)

The background art 5 described in the published specification of Japanese Patent Publication NO. 8-7323 provides an ultrahigh-density and small-size optical information recording and reproducing apparatus.

For this reason, as shown in FIG. 19, a semiconductor laser (laser diode) 221, a light detector 222, and an evanescent light generating probe 223 are respectively carried on a floating (surfacing) slider 224. The information is recorded on the recording medium 226 by the action of the evanescent light 225. When the information is reproduced, the electric current value of the semiconductor laser is biased with the threshold value, and as the result the S/N ratio can be improved.

The operation of tracking is performed in such way as mentioned below. Namely, as shown in FIG. 20 (FIGS. 20A and 20B), by use of the probe shown in FIG. 19, the evanescent light is formed in the track direction (the circular circumferential direction of the medium 226), and the light beam having a little (somewhat) spreading-out width is formed in the direction perpendicular to the track direction. It is preferable that the ratio of those two light beams diameters is 5:1. There exist a servo area 228 having previously formed prepit 227 and the data area 229. The prepit 227 is a wobble pit having a center respectively disposed on a place displaced right and left by a constant when the surface of the wobble pit is scanned by the light beam, if the light 30 deviates from the track center, there occurs an unbalanced state in the signal from the successive two prepits. Here, taking the difference between those signals the difference value is employed as the tracking error signal.

Background Art 6 (for the Second-group Invention)

The background art 6 described in the published specification of Japanese Laid-open Patent Application NO. 9-17047 performs the operation of accessing by the head with high speed and the control of positioning the head, and thereby attain a high-speed recording/reproducing.

For this reason, the operation of recording/reproducing is performed by use of the head constructed by combining a scanning type probe head for the recording/reproducing and an optical head for performing the positional control into one. Namely, in order to raise the speed of recording/reproducing, the light is used as the control signal in order to control the height and position of the recording/reproducing head. Namely, the background art 6 uses a complex type head having the scanning type probe head for recording/reproducing provided with the position controlling optical head.

In such complex type head, the scanning type probe head performs the recordinq/reproducing, while the optical head provided in the scanning type probe head performs the positional control for the probe head.

By utilizing the above-mentioned optical head, the control of positioning the probe head with high accuracy and the operation of recording/reproducing can be done with high speed. The mark on the plural tracks is recorded on the land portion of the recording medium, and the tracking operation is done by use of the head specially used for the tracking on the adjacent land portions also specially used for the tracking.

Background Art 7 (for the Second-group Invention)

The background art 7 described in the published specification of Japanese Laid-open Patent Publication No. 7-225, 975 realizes the probe scanning with practically sufficient speed in the information recording and reproducing apparatus for scanning the probe along the surface of the recording medium and thereby performing the operation of recording/reproducing.

For this reason, as shown in FIG. 21, a linearly-polarized light flux emitted from the light source 231 passes through a polarization surface preserving type optical fiber 232 and forms an evanescent wave through a metal mask 234 having a fine opening portion 233 smaller than the wavelength of the above-mentioned light.

Here, since both of the metal mask 234 and an optomagnetic recording medium 236 are made of electrically conductive substance, electrodes are respectively attached to both of them and the electrodes are connected to a capacitance-distance sensor 235 and thereby the distance d can be detected from the capacitance value between both of the electrodes. As the effect thereof, since the square measure of the part opposing to the optomagnetic recording medium 236 of the metal mask 234 is larger than that of the opening portion 233, the information of the distance d can be obtained with high accuracy and high hand (width). The information of the distance d is fed back to the actuator 237 and the position of the fine opening portion 233 is controlled. Thereby, a high-speed probe scanning can be done.

Background Art 8 (for the Second-group Invention)

The background art 8 described in the published specification of Japanese Laid-open Patent Publication No. 7-21564 can always accurately control the distance between the probe and the recording layer in every operational situation of the Foton STM type optical memory.

For this reason, as shown in FIG. 22, the first light 242 is guided in a transparent body 241 having a fine opening portion at the tip end thereof. A recording layer 244 of the light; recording medium 245 is mounted in the first evanescent field 243 formed at the fine opening portion. The information is recorded in the light recording medium 245 by use of the first light 242 or the recorded information is reproduced.

On the other hand, the second light 246 having a different wavelength from that of the first light 242 is guided in the light recording medium 245. The light thus guided detects the second evanescent wave 247 formed on the surface of the light recording medium by (through) the transparent body 241. The detected light is separated from the guided light due to the first light 242 by use of a wavelength separating medium 248, and the intensity of the second light 246. Thereby, the distance between the transparent body 41 and the light recording medium 245 can be adjusted.

Background Art 9 (for the Second-group Invention)

In the background art 9 described in the published specification of Japanese Laid -open Patent Publication No. 10-172,172 in the information recording and reproducing apparatus applying the probe microscope, when there exists the manufacturing error or the time-elapsing variation in the shape of the optical probe, the distance between the optical probe and the recording medium cannot be kept constant and it is difficult to abstain a predetermined recording density. In consideration of such problems, even though there exists a reason of the optical probe resolution varying occurrence such as the unevenness of the probe shape, the time-elapsing variation, the predetermined recording density can be kept (maintained).

For this reason, as shown in FIG. 23, periodical patterns 250 and 251 respectively having different periods are provided on the recording medium 249, and those periodical patterns 250 and 251 are detected by an optical probe 252. The frequencies of the obtained signals are analyzed and compared with each other. In such way, the distance between the optical probe 252 and the recording medium 249 is detected. When the distance H is large, the component of the high spatial frequency becomes small, and the distance H can be measured by the above component of the high spatial frequency.

Background Art 10 (for the third-group Incention)

Conventionally, as the information recording and reproducing apparatus, there exists the apparatus intending to realize a high-density information recording and reproducing apparatus by utilizing the probe microscope. On this occasion, when there exists the manufacturing error or the time-elapsing variation in the optical probe shape, the distance between the optical probe and the recording medium cannot be kept constant, and thereby it is difficult to obtain the predetermined recording density.

Here, for instance, the background art 10 described in the published specification of Japanese Laid-open Patent Publication No. 10-172172 proposes a high-density information recording and reproducing apparatus which can keep the predetermined recording density even though there exists a reason of varying the resolution of the optical probe such as the unevenness or the time-elapsing variation in the shape of the optical probe.

According to the background art 10, as shown in FIG. 55, periodical patterns 402 and 403 respectively having different periods Λ1 and Λ2 are provided on the recording medium 401. Those periodical patterns 402 and 403 are detected by an optical probe 404, and the frequency of the signal thus obtained is analyzed and compared with each other. In such way, the distance H between the optical probe 404 and the recording medium 401 can be detected. The reference numeral 405 represents a semiconductor laser (laser diode), and the numeral 406 represents a lens. The optical probe 404 is formed by a projecting portion 407b at the tip end of an optical fiber 407 having a core 407a and covered with a metal film 408. The reference numeral 409 represents an optical detector.

According to such structure, the magnitude of the fundamental wave component I of the light amount (intensity) variation at the time of scanning the periodical patterns 402 and 403 with the optical probe 403 becomes "H: small" as shown in FIG. 56 when the distance H between the recording medium 401 and the optical probe 404 is small. On the contrary, when the distance H is large, the magnitude of the fundamental wave component I becomes "H: large".

Namely, when the distance H is large, the component of the high spatial frequency K becomes small. In such situation, by scanning those periodical patterns 402 and 403 and taking the difference of the fundamental component of the light intensity variation, the distance H between the optical probe 404 and the periodical patterns 402 and 403 (namely, recording medium 401).

Here, the spatial frequencies K1 and K2 of the periodical patterns 402 and 403 can be respectively obtained by the following equations:

$K1 = 2\pi/\Lambda 1$, and $K2 = 2\pi/\Lambda 2$.

Background Art 11 (for the Third-group Invention)

Furthermore, there has been proposed an information recording and reproducing apparatus employing an optical fiber emitting the light from the tip end thereof as the probe, in the background art 11. Referring to FIGS. 57 through 59, the background art 11 is described hereinafter.

At first, the optical fiber emitting the light from the tip end thereof is employed as the probe 411 and put on a slider 412 as shown in FIG. 57. For instance, it may be allowable that the flying slider not brought into contact with the recording medium 415 composed of a base board 413, a recording layer, and a protection layer 14, etc. or the contact slider brought into contact with the same is used as the slider 412. Here, a spindle motor for rotating the recording medium 415 is fixed on the same baseboard through a suspension 416, an arm 417, and an arm motor not shown. In such structure, the slider 12 is movably mounted so as to be moved in the tracking direction of the recording medium 415 by the arm motor for rotating the recording medium 415. However, the slider 412 can be moved in the tracking direction of the recording medium 15 by the arm motor. By the action of those sliders 12, the distance between the recording medium 415 and the tip end of the probe 411 can be stably kept to several tens nm during the period of the recording medium 415 rotation.

As shown in FIG. 58, mark pits 418 are arranged in the circumferential direction (track direction) on the surface of recording medium 415 or in the vicinity of the surface thereof, and the information is written in. Since the recording medium 415 rotates, unless the tracking of the probe 411 is performed so as to put the tip end of the probe 411 on the center line of the mark pit 418, it is impossible to write in or read out the correct information.

FIG. 59 is an enlarged cross-sectional structural view showing the vicinity of the probe 411 shown in FIG. 57 which is cut in the radius direction. The probe 411 of the optical fiber structure includes a core 419a and a clad 419b. The upper-edge base (root) side of the probe 411 is fixed on the slider 412 through a common electrode portion 20, while the tip end side 411a of the probe 411 opposing to the recording medium 415 is put in a free state. The probe 411 has a so-called cantilever (arm) structure. The tip end 411a thereof is made finely sharpened utilizing the method of etching. A light intercepting metal film 421 entirely covers the circumference of the probe 411 such that the light is emitted only through the small opening of the tip end 411a. The diameter of the opening is equal to or smaller than the wavelength of the light propagating (transmitted) through the optical fiber. The so-called adjacent field light (called "evanescent light") is emitted from the above opening.

Furthermore, in the background art 11, since it is allowed to use the probe having the cantilever structure, the probe is not limited, in particular, to the adjacent field light. It may be also allowed to use the probe having an opening diameter larger than the employed wavelength, for instance, the internal-concentration type probe. The writing-in and reading-out operations of the information for the recording medium are performed by use of the light. The light-intercepting metal film 421 covering the probe 411 is grounded (connected to the earth).

Furthermore, a pair of electrodes 422 and 423 are provided so as to nip the probe 411 in the radius direction of the recording medium 415 (tracking direction) at the time of using the slider 412. Those electrodes 422 and 423 are fixed in the slider 412. Different voltages V1 and V2 are respectively applied across the electrodes 422 and 423 and the common electrode 420 of the probe 11 (light-intercepting metal film 421). Thereby, an electrostatic attractive farce occurs between the electrodes 424 and 425 and the probe 411 is in a state of a cantilever, and the tip end 411a thereof swings in the radius direction of the recording medium 415. Thereby, the movement (actuation) of the tip end 411a of the probe 411 necessary for the tracking is done.

In FIG. 59, when the tip end 411a of the probe 411 is moved in the direction ①, only the voltage $V_1$ is applied to the electrode 22 and the voltage $V_2$ is not applied to the electrode 23. When the tip end 411a of the probe 411 is moved in the direction ②, vice versa. Namely, only the voltage $V_2$ is applied to the electrode 23 and the voltage $V_1$ is not applied to the electrode 22. On this occasion, the electrostatic attractive farce $F_1$ in the direction ① is expressed by the below equation (1), while the electrostatic attractive force $F_2$ in the direction ② is expressed by the below other equation (2).

$$F_1 = -(½)(\partial C_1/\partial d_1)V_1^2 - (½)(V_1^2/d_1^2)\epsilon_a S_1 \quad (1)$$

$$F_2 = -(½)(\partial C_2/\partial d_2)V_2^2 - (½)(V_2^2/d_2^2)\epsilon_a S_2 \quad (2)$$

In the above equations (1) and (2), $c_1$ and $c_2$ represent respective electrostatic capacitances between the probe 411 and the electrodes 422, 423, $S_1$ and $S_2$ equivalent square measures of the electrostatic capacitances $c_1$, $c_2$, $d_1$ and $d_2$ respective distances between the probe 411 and the electrodes 22, 23, and $\epsilon a$ permittivity (dielectric rate) of the air. Furthermore, the electrostatic, capacitances $c_1$ and $c_2$ are assumed to be expressed by the following equations (3) and (4):

$$C_1 = \epsilon_a \cdot S_1/d_1 \quad (3)$$

$$C_2 = \epsilon_a \cdot S_2/d_2 \quad (4)$$

Consequently, the electrostatic attractive force is proportional to the square (value) of the voltage and inversely proportional to the square (value) of the distance.

As the method of applying the voltage for moving the tip end 411a of the probe 411, in addition to the above-mentioned method of applying the voltage only to the electrode in the desired direction of moving the probe 411, there exists another method of superposing the bias voltage V6 and the control voltage $\Delta V$ and simultaneously applying the voltage thus superposed to both of the electrodes 22 and 23.

Namely, the voltages $V_1$ and $V_2$ as expressed by the below equations are applied to the electrodes.

$$V_1 = V_b + \Delta V \quad (5)$$

$$V_2 = V_b - \Delta V \quad (6)$$

By changing the control voltage $\Delta V$, the tip end 411a of the probe 411 is moved.

Consequently, the force F exerted onto the probe 411 is expressed by the below equation (7).

$$F = F_1 - F_2 = ½(V_1^2/d_1^2)\epsilon_a S_1 - ½(V_2^2/d_2^2)\epsilon_a S_2 = [(2\Delta V + V)/d^2]\epsilon_a S \quad (7)$$

Here, the following equations are assumed:

$$S_1 = S_2 \quad (8)$$

$$d_1 \approx d_2 = d \quad (9)$$

Under such assumption, since the electrostatic attractive force is proportional to the control voltage $\Delta V$, the control operation therefor can be facilitated.

Background Art 12 (for the Third-group Invention)

As the background art 12, there exists an example of the proposal as shown in FIG. 60. Firstly, a laser light source 431 continuously oscillates (CW) and the light emitted therefrom is focused onto the end surface of the optical fiber 433 by the action of a coupling lens 432 and enters the core of the optical fiber 433. The light thus focused and entering the core exists as the adjacent field light at the place very near (several tens nm) to the sharpened tip end of the optical fiber 433.

Furthermore, in the background art 12, since it is allowed to use the probe having the cantilever structure, the probe is not limited, in particular, to the probe emitting the adjacent field light. Namely, the probe paving the opening diameter larger than the employed wavelength, for instance, an internal light-focusing type probe can be used.

Consequently, the light existing in the vicinity of the tip end of the optical fiber is not limited, in particular, to only the adjacent field light. Namely, the propagating light emitted from the tip end of the internal light-focusing type probe, or the light mixedly including the propagation light and the adjacent field light can be also allowed to be used.

A recording medium 434 is rotated by a spindle motor 435. An information is recorded on the surface of the recording Medium 34 by an area (mark) having a contrast of the transmission sate (factor). When the tip end of the optical fiber 433 functioning as a probe 436 is put onto a position several tens nm or less from the-surface of the recording medium 434, the adjacent field light spreading out from the tip end of the probe 436 propagates to the recording medium, and the transmission light having the power corresponding to the transmission factor of the aforementioned mark comes out at the opposite side to that of the probe 436 of the recording medium 437. The light enters a photomultiplier (PMT) 438 through a coupling lens 437. The PMT 438 converts the entering light to an electric signal. The signal thus converted is amplified by a pre-amplifier 439, and thereafter the amplified signal is converted to a digital signal by a binarizing circuit 440, and the converted signal is inpuktted into the computer 441, and then the information on the recording medium 434 is read out in the computer 441. Since the recording medium 434 and the probe 436 move relatively to each other, the information recorded on the marks arranged in the circular circumferential direction (track direction) is stored in the computer 441, in order of a time series.

Even in the other similar apparatus capable of writing in the information into the recording medium 434, the data can be written in the information in the similar way. The necessary writing-in pulse is applied to an LD driver 442 by the computer 441, and the signal thus applied thereto drives the laser light source 431. In such way, the information is written in order on the surface of the recording medium 434.

On this occasion, it is necessary to set the distance between the surface of the recording medium 434 and the tip end of the probe 436 to several tens nm. In practice, the recording medium 434 has convex and concave surface. In addition, usually, the recording medium 434 itself causes surface movement when it rotates, and the same 434 move up and down. Therefore, it is necessary to control the distance therebetween so as to make it constant. In order to perform such control, the shear force or the electrostatic attractive force based on the force between atoms is utilized for the surface of the recording medium 434 and the tip end of the probe 436.

Here, the probe 436 is bonded, with adhesive agent, on the one-side cantilever of a crystallized quartz (crystal) vibrator 443. The crystallized quartz vibrator 443 is connected to a piling-layer type piezoelectric element 445 through an L-shaped holder 444. The piling-layer type piezoelectric element 445 is connected onto a sliding-proof pad 446. The sliding-proof pad 446 is brought into contact with the surface of the recording medium 434. When the recording medium 434 rotates, the sliding-proof pad 446 slidably moves on the recording medium 434. As the result, there occurs a relative movement between the recording medium 434 and the probe 436. When the voltage is applied to the piling-layer type piezoelectric element 445, the element 445 is expanded and contracted in the Z-direction. Therefore, the distance between the probe 436 and the surface of the recording medium 434 can be changed.

The crystal vibrator 443 is vibrated by the crystallized quartz element 447, and thereby the resonance frequency can be changed. When the surface of the recording medium 434 approaches the tip end of the probe 436, the shear force or the electrostatic attractive force based on the force between the atoms is exerted between the surface of the recording medium 434 and the tip end of the probe 436. The above force acts as the spring existing between the surface of the recording medium 434 and the tip end of the probe 436. In such structure, the resonance frequency of the entire vibration system can be changed. However, since the frequency of vibrating by the piezoelectric element 447 does not change at all compared with that at the former time, the state of the entire vibration system is put outside of the resonant state, and thereby the amplitude of the vibration is reduced.

The voltage created by the crystallized quartz vibrator 443 is amplitude by the differential amplifier 448, and the voltage thus amplified is inputted into a lock-in amplifier 449. The lock-in amplifier 449 amplifies the amplitude signal of the crystallized quartz vibrator and converts the amplified signal to DC voltage in synchronism with the vibration frequency. The out-put of the lock-in amplifier 449 is converted from analog signal to digital signal by an analog-to-digital (A/D) converter 451, and the digital signal thus converted is taken into the computer 441.

From the difference of the desired distance between the probe 436 and the surface of the recording medium 434 from the standard value corresponding thereto, the computer 441 computes the numerical value for controlling the distance between the probe 336 and the surface of the recording medium 434 and outputs the computed numerical value therefrom. The output voltage outputted from the computer is converted to an analog voltage by a digital-to-analog (D/A) converter 452. Thereafter, the analog signal thus converted is amplified by a power amplifier 453 and inputted into the piling-layer type piezoelectric element 445. In such way, the distance between the probe 436 and the surface of the recording medium 434 is controlled by the computer 441.

Here, the entire objects carried on the sliding mechanism including the sliding-proof pad 446 is called a "slider", hereinafter. The slider 454 is fixed on the base board on which a spindle motor 435 is fixed through the suspension, the arm, and the arm motor, all not shown in the drawing (FIG, 60). Refer to the structure shown in FIG. 57.

However, the slider 454 can move in the tracking direction by the action of the arm motor and further move up and down in the z direction by the suspension. On the other hand, the slider 454 is pressed against the surface of the recording medium 434 with suitable force by the suspension, and the sliding-proof pad 446 is brought into contact with the surface of the recording medium 434.

When the information recording and reproducing apparatus as mentioned heretofore is put in a waiting state, the probe 436 is separated at a long distance from the recording medium 434 so as not to bring the probe 436 into contact with the recording medium 434. Therefore, as mentioned above, before starting the operations of writing-in or reading-out, it is necessary to perform the works of bringing the probe 436 to the place near the surface of the recording medium 434.

On this occasion, as mentioned above, if the distance between the probe 436 and the recording medium 434 is intended to know only by the shear force, the approach of the probe 436 to the surface of the recording medium 434 cannot be known until the distance therebetween approaches to several tens nm. Thereby, a collision is apt to happen therebetween.

In such situation, according to the proposal of the background art 12, such problems can be solved by causing an electric be solved by causing an electric potential difference between the probe 436 and the surface of the recording medium 434.

As the premise (precondition) thereof, it is necessary that the probe 436 needs to be made of electrically conductive substance from the bottom to the tip end thereof and the recording medium 434 also need to be conductive. Regarding the probe 436 utilizing the optical fiber 433 to be employed for the measurement of the adjacent field light, since the emission of the light from the clad causes noise, the clad is treated with metal in order to avoid such noise. Therefore, the former condition is satisfied generally.

Furthermore, the recording medium 434 made of opto-magnetic material, phase-variation material, etc. is conductor or semiconductor, and therefore the resistivity (specific resistance) thereof is low. Consequently, on many occasions, the recording medium 434 also satisfies the latter condition.

Under such precondition, a switch 455 capable of being changed over and controlled by the computer 441 is further provided in the apparatus. At first, a power source 456 of voltage $V_a$ is connected to light-intercepting metal film of the probe 436 by the switch 455. Since the metal film can be attached to the entire portion of the optical fiber 433, the power source 456 is connected to the bottom (base) portion of the optical fiber 433 (probe 436) and thereby the voltage $V_a$ Can be applied to the tip end of the probe 436. The recording medium 434 is connected to the standard electric potential (ground) through the shaft of a spindle motor 435.

In such structure, the voltage $V_a$ is applied across the metal at the tip end of the optical fiber 433 (probe 436) and the surface of the recording medium 434. Consequently, the electrostatic attractive force is exerted therebetween. The electrostatic attractive force is proportional to the square (value) of the voltage $V_a$ and inversely proportional to the square value of the distance d between the probe 436 and the recording medium 434. On the other hand, the force between the atoms, that is, the shear force is the exponential function of the distance d between the probe 436 and the surface of the recording medium 434 and decreases exponentially.

Consequently, since the attenuation of the electrostatic attractive force to the distance d is considerably gentle (slow) compared with that of the shear force, even though the distance d between the probe 436 and the surface of the recording medium 434, the approach therebetween can be grasped as the decrease in the amplitude of the crystallized quartz vibrator 443. The distance d depends on the value of the voltage Va. However, when the value is several tens V (voltage), even though the distance between the probe 436 and the surface of the recording medium 434 is almost several tens um, the amplitude decrease of the crystallized quartz vibrator 443 can be grasped. The extent of the possibility of grasping the approach between the probe 436 and the surface of the recording medium 434 from the distance therebetween can be adjusted by the voltage Va. When the approach therebetween from the further distant place is intended the grasp, the voltage Va should be made further large.

At the time of waiting, the slider 454 is brought, on the recording medium 434, into contact therewith. At this time, although the spindle motor 435 is rotated or stopped, it is more preferable to stop the spindle motor 435 in consideration of the risk of the occurrence of the contact between the probe 436 and the surface of the recording paper.

Before performing the operations of writing-in and reading-out, on the condition that the voltage Va is applied across the probe 436 and the recording medium 434, the crystallized quartz vibrator 443 and the probe 436 is vibrated with the resonance frequency, the vibration amplitude of the probe 436 is always monitored from the output signal of the crystallized quartz vibrator 443, the voltage of rapid ramp rate is applied to the piling-layer type piezoelectric element 445, and the probe 436 is caused to approach the surface of the recording medium 434. When the amplitude of the vibration becomes small, the voltage of the piling-layer type piezoelectric element 445 is held, and thereby the operation of causing the probe 436 to approach the surface of the recording medium 434 is stopped.

Furthermore, the electric potential difference between the probe 436 and the recording medium 434 is eliminated, and then the voltage of slow ramp rate is applied to the piling-layer type piezoelectric element 445. Thereby, the tip end of the probe 436 is caused to approach the surface of the recording medium 434 with low speed by use of a slightly-moving actuator (piezoelectric, etc.) such that the distance between the tip end of the probe 436 and the surface of the recording medium 434 becomes a desired value (distance). Thereafter, the operations of writing-in and reading-out are stated.

As an example, at the time of waiting, since the tip end of the probe 436 and the surface of the sliding-proof pad 446 are brought into contact with the surface of the recording medium 434, the height of the contact surface therebetween becomes same as that of the surface of the recording medium. In such structure, the slider 454 is made previously so as to obtain almost 0.5 um.

Furthermore, for instance, the voltage $V_a$ is set to almost 2V. The vibration amplitude of the probe 36 is always monitored from the output signal of the crystallized quartz vibrator 443. The voltage of the rapid ramp rate is applied to the piling-layer type piezoelectric element 445, and then the probe 436 is caused to approach the surface of the recording medium 434., When the distance between the probe 436 and the surface of the recording medium 434 becomes almost 2.00 nm, the vibration amplitude of the crystallized quartz vibrator 443 is reduced by the action of the electrostatic attractive force between the probe 436 and the surface of the recording medium 434. The computer 441 grasps the reduction of the vibration amplitude and holds the voltage of the piling-layer type piezoelectric element 445, and further stops the approach of the probe 436 onto the surface of the recording medium 434.

If the approach of the probe 436 onto the surface of the recording medium 434 is detected and stopped from the distance of almost 200 nm, there occurs no collision of the probe 436 onto the surface of the recording medium 434 owing to the over-run from the detection to the stopping. Consequently, the first approach can be done at a comparatively low speed (approx. 0.1 um/s).

Furthermore, the switch 455 is next changed over to the GND (ground) side. Thereby, the electric potential difference disappears between the probe 436 and the surface of the recording medium, and thereby the electrostatic allractive force is not exerted upon both of them. Thereafter, the voltage of the slow ramp rate is applied to the piling-layer type piezoelectric element 445, and the tip end of the probe 436 is caused to approach the surface of the recording medium 434 with low speed (approx. 10 nm/s). When the probe 436 approaches the surface of the recording medium 434 to the extent of several tens nm, the vibration amplitude of the crystallized quartz is reduced due to the shear force between the probe 436 and the surface of the recording medium 434. When both of them approach each other to a desired distance, the computer 441 grasps it and stops the displacement (deviation) of the piling-layer type piezoelectric element 445.

At this time, since the speed of the approach becomes slower than that of the previous stage (step), the over-run becomes small. Consequently, even through the distance between the probe 436 and the surface of the recording medium becomes small, there is no fear that both of them collide against each other. Thereafter, the operations of writing-in and reading-out are started.

As mentioned heretofore, when the distance between the probe 436 and the surface of the recording medium 434 is large, both of them are caused to approach each other with high speed, and at the same time the approach between both of them is grasped from the stage of long distance therebetween and thereby the collision with each other can be prevented. By stepwisely reducing (both of) the electric potential difference and the approaching speed between the probe 436 and the surface of the recording medium 434, the aforementioned sequence can be done. In the last (final) approach, the applying of the voltage across both of them is eliminated and the distance detection therebetween is performed by the action of the shear force, and then the approach is finished.

When the detection of the distance therebetween is done only by the action of the shear force, since the approach of each other therebetween cannot be detected until both of them approach each other to several tens nm, it is necessary to perform the approach of the both with very slow speed of several tens nm/s from the beginning of the approach. Therefore, very long time is consumed till the time of starting the writing-in and reading-out operations. However, according to the method of the background art 12, since it is possible to select the approaching speed corresponding to the distance between the probe 436 and the surface of the recording medium 434, the time needed until the time of starting the operation of writing-in and reading-out can be shortened.

SUMMARY OF THE INVENTION

Heretofore, the background art regarding the optical information recording and reproducing apparatus has been described. However, according to such background art which is disclosed in the background-art document, e.g., the specifications of Japanese Laid-open Patent Publication Nos. 7-192280, 8-321084, 8-7323, 9-17047, 7-225975, 7-21564, 10-172172, and other documents, etc., there exists no advantageous functional effect for improving the optical information recording and reproducing apparatus. The present invention has been made in view of the above-mentioned problems and other problems in order to solve such unfavorable problems.

Accordingly, to state concretely in more detail, the present invention solves the background-art defects as mentioned heretofore in the preceding articles, background arts 1 through 12. The present invention provides the optical information recording and reproducing apparatus solving the above matters. The invention provides the optical information recording and reproducing apparatus capable of realizing fine actuation of the extent of several nm in order to perform the correction of tracking with simple structure.

Generally, the probe is movably controlled for tracking. The probe has to be actuated so as to surely move it in the direction perpendicular to the direction of arranging the data row on the recording medium. The aforementioned background arts 1 and 2 do not describe at all any actuation medium. The present invention provide the optical information recording and reproducing apparatus capable of satisfying the demand of moving the probe in such direction.

Furthermore, when the structure of actuating the probe by the action of the electrostatic attractive force, the force is inversely proportional to the square of the distance between the probe and the electrode, and the force of pulling back the probe to the initial position by the spring is proportional to the distance therebetween. Consequently, when the probe goes once out of the stable area (the area where the distance between the probe and the electrode becomes equal to or less than ⅔ of the initial value, the electrostatic attractive force exceeds the force of the spring and thereby the probe is attracted to the electrode. As the result, the operation inevitably becomes very unstable.

The present invention can provide the optical information recording and reproducing apparatus capable of improving such unstable operation and widening the actuatable area, that is, the tracking movable area of the probe.

Since the probe has structure of the cantilever on which the base portion is fixed, the moving distance of the tip end thereof becomes large. When the tracking area needs to be widened, the distance between the electrode and the tip end of the probe is enlarged. However, when the probe is actuated by the electrostatic force, if the distance between the electrode and the probe is long, there arises a defect that, although the movable distance is long, large voltage has to be applied in order to move the probe.

On the other hand, if the distance therebetween is short, there arises another defect that, although even small voltage can actuate the probe, the movable distance inevitably becomes small.

The present invention can provide the optical information recording and reproducing apparatus capable of improving the above-mentioned problems and realizing the large tracking movable distance with low voltage.

Furthermore, both of the voltage applying circuit for applying the voltage between the electrode and the probe and the measurement circuit for measuring the distance therebetween have to operate with high speed and low noise. The present invention can provide the optical information recording and reproducing apparatus capable of satisfying such demand as mentioned above.

In the background art 3, it is necessary to prepare the light source, the lens, and the optoelectric conversion element, etc. only for obtaining the tracking error signal, in addition to the probe for performing the operations of writing in and reading out by use of the evanescent light, for the purpose of obtaining the tracking error signal.

In the background art 4, it is necessary to prepare the adjacent field probe only for obtaining the tracking signal.

In the background art 5, the probe has to be devised so as to emit the ellipse flat spot light, and in addition the wobble pit is formed on the recording medium in order to obtain the tracking error signal. For this reason, there arises a troublesome matter the density of recording the information is lowered.

In the background art 6, it is necessary to prepare the light source, the lens, and the optoelectric conversion element, etc. only for obtaining the tracking error signal, in addition to the probe for performing the operations of writing in and reading out Furthermore, only in order to obtain the tracking error signal, the land needs to be formed on the optical information recording medium. Thereby, there arises a troublesome matter that the density of recording the information is lowered.

The present invention can provide the optical information recording and reproducing apparatus capable of obtaining the tracking error signal with the simplified medium.

Furthermore, in the background art 7, the distance between the tip end of the probe and the surface of the recording medium is measured by the value of the electrostatic capacitance between the conductive part at the tip end part of the probe and the surface of the recording medium. Consequently, there arises a problem that the surface of the recording medium needs to be conductive and there are many restrictions in the structure of the recording medium. However, although the conductive ferromagnetic substance (body) is employed as the material of the recording medium, such substance cannot be applied to the media using the phase variation material requiring the non-conductive protection film. Furthermore, there arises a troublesome matter that the measurement circuit for, measuring the electrostatic capacitance needs to be prepared, and the square measure of the metal film at the tip end of the probe has to be made equal to or more than 500 nm×500 nm in order to obtain the sufficient measurement accuracy, and therefore, the restriction at the side of the probe turns out to be large inevitably.

In the background art 8, it is necessary to prepare another light source of different wavelength for measuring the distance between the measuring the distance between the tip end of the probe and the surface of the recording medium in addition to the light source for performing the operations of recording and reproducing.

In the, background art 9, there arises a troublesome matter that a pattern of different spatial frequency needs to be prepared on the recording medium in order to measure the distance between the tip end of the probe and the surface of the recording medium and thereby the density of recording on the recording medium becomes lowered inevitably. Furthermore, there arise another troublesome matter that the operation of analyzing the frequency of the obtained signal needs to be done, and much time is needed for those processes, and as the result, the distance between the tip end of the recording medium cannot be controlled with sufficiently high speed.

The present invention can provide the optical information recording and reproducing apparatus capable of solving all of the above-mentioned troublesome matters.

The present invention can provide the optical information recording and reproducing apparatus capable of capturing (knowing) the distance between the tip end of the probe and the surface of the recording medium with the simple medium. The present invention can provide the optical information recording and reproducing apparatus capable of measuring the distance therebetween with high accuracy. The present invention can provide the optical information recording and reproducing apparatus capable of performing the operations of writing in and reading out with high speed by use of the small-sized recording/reproducing head.

The present invention further can provide the information recording and reproducing apparatus capable of solving the problems of the background arts 10 through 12. In particular, for solving the background art 11, the voltages $V_1$ and $V_2$ to be applied to the electrodes 422 and 423 are the voltages obtained by superposing the bias voltage $V_b$ on the control voltage $\Delta V$ for moving the probe 411 in the tracking direction as shown in the equations (5) and, (6). On this occasion, since the control voltage $\Delta V$ or the bias voltage $V_b$ is put in the floating state, there arises a problem of difficulty in the circuit construction such as the stability of the electric potential.

The present invention can provide the information recording and reproducing apparatus capable of improving the stability of the control voltage for tracking the probe and, in addition, simplifying the circuit construction.

Furthermore, according to the background art 11, as the method of applying the voltage to the electrodes 422 and 423, there are disclosed, in the above background art, the method of applying the voltage only to the electrode 422 or 423 in the direction of desiring (intending) to move the probe 411 and the other method of to superposedly applying the bias voltage $V_b$ and the control voltage $\Delta V$ to both of the same electrodes. The latter method may be better than the former method.

However, the matter demanded as the apparatus is not only the controlling property but the possibility of driving the probe with as lower voltage as possible. In particular, regarding the control voltage required the response property in the high frequency, the low voltage can more easily realize the high-speed circuit than the high voltage.

In such situation as mentioned above, the present invention can provide the information recording and reproducing apparatus capable of specifying the condition of surely not only improving the control property but lowering the control voltage and reducing the burden of the circuit (cost, power consumption, size, etc.).

Furthermore, according to the background art 12, the DC voltage $V_a$ is applied to the probe 436 in order to attain a rapid approach to the recording medium 434. On the other hand, in the background art 11, the bias voltage $V_b$ is applied between the electrodes 422 and 423 for tracking the probe 411 and the probe itself 411, for the purpose of lowering the control voltage $\Delta V$ and realizing the linearity between the voltage and the movement of the probe 411. For this reason, if the DC voltage $V_a$ is applied to the probe 436 in order to attain the rapid approach as in the case of the background art 12, the condition of apply the voltage thereto goes out of the adequate bias condition.

Furthermore, in the background art 10, the patterns 402 and 403 of the different spatial frequency have to be provided on the recording medium 401 in order to measure the distance between the tip end of the probe 404 and the surface of the recording medium 401, and as the result, the density of recording turns out to be low inevitably. Furthermore, the frequency of the obtained signal has to be analyzed. Thereby, much time is required for performing such processes and therefore the distance cannot be controlled with sufficiently high speed.

In such situation as mentioned above, the present invention can provide the information recording and reproducing apparatus capable of realizing, at the same time, the improvement of the control property and the reduction of the control voltage, the small probability of impingement of the tip end of the probe upon the recording medium, and the high operational speed of the approach. Furthermore, the invention can provide the information recording and reproducing apparatus not requiring any of the specified wavelength, the pattern formed on the recording medium, and the signal processings taking much time.

Other objects, features and advantages of the present invention will become apparent from the following detailed description when read in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

Figure 1:
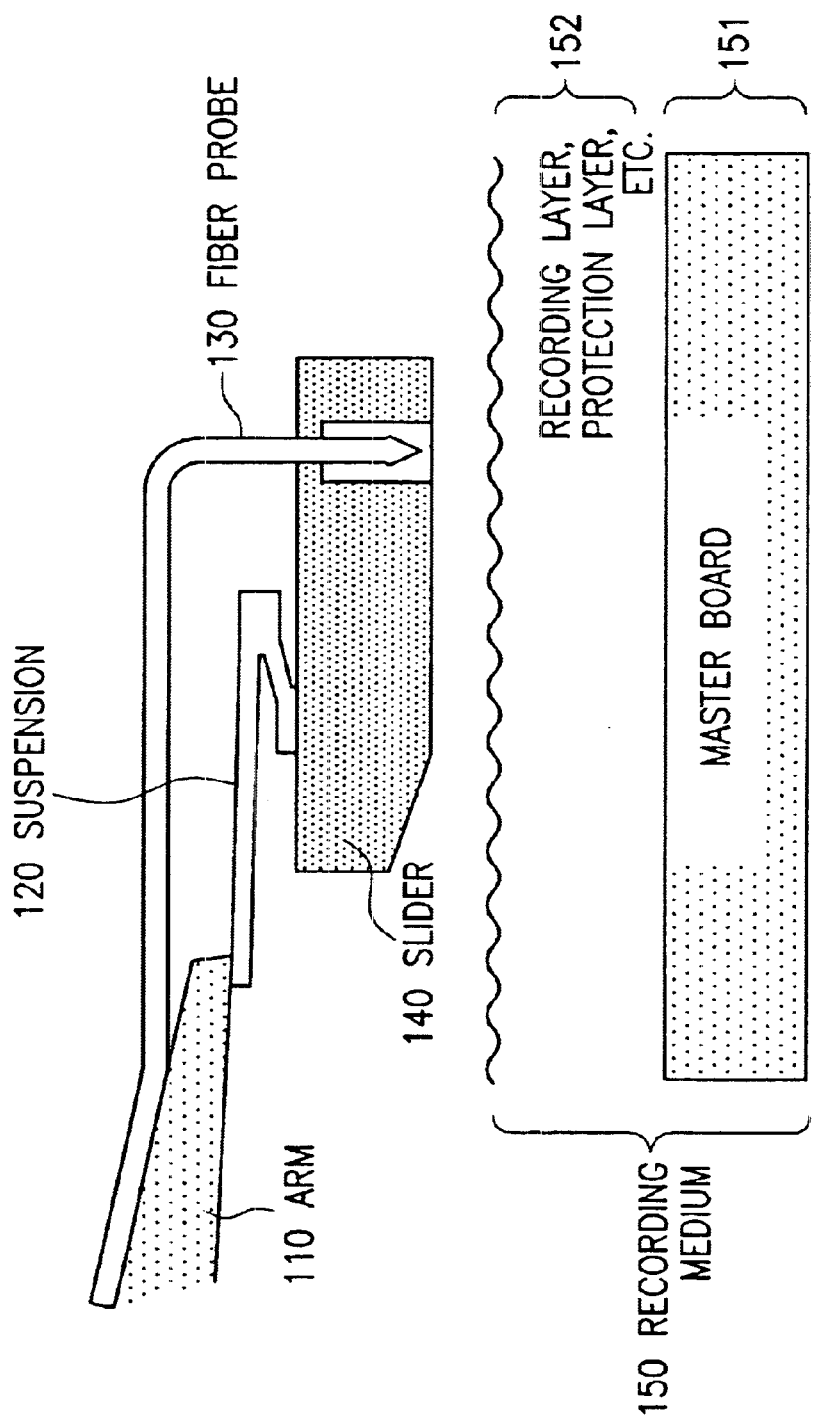
FIG. 1 is an entire view illustrating the arrangement relationship between the slider carrying the probe composed of the optical fiber for explaining the first embodiment according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

In order to attain the above-mentioned object of the present invention, the optical information recording and reproducing apparatus includes a pair of fixed electrodes provided so as to put the probe therebetween in a direction perpendicular to the direction of the data row arrangement on the recording medium and a voltage applying member for applying the voltage across the respective two fixed electrodes and the probe. The tip end position of the probe is controlled by the action of the electrostatic attractive force between the respective fixed electrodes and the probe which is caused by applying the voltage thereto from the voltage applying medium.

Furthermore, the distance between the two fixed electrodes and the probe is made shortest in a direction perpendicular to the direction of the data row arrangement on the recording medium. The rigidity of the probe in a direction perpendicular to the direction of the data row arrangement on the recording medium is made lower than the rigidity of the probe in the direction of the data row arrangement. A measuring medium for measuring the electrostatic capacitance between the probe and the fixed electrodes, and the direction therebetween is controlled on the basis of the measuring result by the measuring medium. The direction between the two fixed electrodes and the probe is made gradually large toward the tip end of the probe.

Moreover, the measuring medium is disposed in the vicinity of the probe and the two fixed electrodes, and the voltage applying medium is also disposed in the vicinity thereof.

The optical information recording and reproducing apparatus for recording and reproducing the information by radiating the light from the tip end of the probe includes a moving apparatus for moving the light radiating position in a direction perpendicular to the direction of the data row arrangement on the optical information recording medium and a signal taking-out apparatus for acquiring the tracking error signal of the radiating position in connection with the periodic movement from the reflected light or the transmitted light.

Consequently, in such structure it is not necessary to further provide a medium specially (exclusively) used for the tracking in addition to the moving apparatus. Furthermore, it is not necessary to prepare the land or the mark both specially used for the tracking which results in lowering the recording density even on the optical information. A special devising is not required for the probe itself. In such way, the tracking error signal can be obtained by use of a simple medium (structure).

The optical information recording and reproducing apparatus for recording and reproducing the information by radiating the light from the tip end of the probe includes a moving apparatus for moving the light radiating position in a direction perpendicular to the direction of the data row arrangement on the optical information recording medium and a signal taking-out apparatus for acquiring the signal of the distance between the tip end of the probe and the surface of the recording medium to be radiated thereon with the light in connection with the periodical movement.

Consequently, it is not necessary to devise a complicated circuit and probe for measuring the distance between the tip end of the probe and the surface of the optical information recording medium without adding some limitations of the structure and material to the optical information recording medium. In addition, the apparatus of the invention requires neither the light source of a special wavelength, nor the pattern formed on the optical information recording medium, nor the signal processing expensing much time. In such structure, the distance between the tip end of the probe and the surface of the recording medium can be known by use of simple medium.

The signal taking-out apparatus takes out a predetermined signal from the light radiated onto the optical information recording medium and keeps the instantaneous value thereof, and then from the value of the signal, acquires the tracking error signal and the signal in connection with the distance between the tip end of the probe and the surface of the recording medium.

Consequently, it is not necessary to devise a complicated circuit and probe for measuring the distance between the tip end of the probe and the surface of the optical information recording medium without adding some limitations of the structure and material to the optical information recording medium. In addition, the apparatus of the invention requires neither the light source of a special wavelength, nor the pattern formed on the optical information recording medium, nor the signal processing expensing much time. In such structure, the tracking error signal can be obtained and thereby the distance between the tip end of the probe and the surface of the recording medium can be known.

In the optical information recording and reproducing apparatus of the present invention, the signal taking-out apparatus takes out a predetermined signal from the light radiated onto the optical information recording medium and holds the maximum and minimum values of the signal respectively. The tracking error signal and the distance signal in connection with the distance between the tip end of the probe and the surface of the recording medium can be acquired from the above-mentioned maximum and minimum values of the signal.

Consequently, it is not necessary to devise a complicated circuit and probe for measuring the distance between the tip end of the probe and, the surface of the optical information recording medium without adding some limitations of the structure and material to the optical information recording medium. In addition, the apparatus of the invention requires neither the light source of a special wavelength, nor the pattern formed on the optical information recording medium, nor the signal processing expensing much time. In such structure, the tracking error signal can be obtained and thereby the distance between the tip end of the probe and the surface of the recording medium can be known.

In the optical information recording and reproducing apparatus of the present invention, the moving apparatus moves the radiating position of the light with the frequency w, and the signal taking-out apparatus takes out the signal from the light radiated onto the optical information recording medium and acquires the tracking error signal from the frequency-w component of the signal and further acquires the (distance) signal of the distance between the tip end of the probe and the surface of the recording medium.

Consequently, it is not necessary to devise a complicated circuit and probe for measuring the distance between the tip end of the probe and the surface of the optical information recording medium without adding some limitations of the structure and material to the optical information recording medium. In addition, the apparatus of the invention requires neither the light source of a special wavelength, nor the pattern formed on the optical information recording medium, nor the signal processing expensing much time. In such structure, the tracking error signal can be obtained and thereby the distance between the tip end of the probe and the surface of the recording medium can be known.

In the optical information recording and reproducing apparatus of the present invention, the moving apparatus moves the radiating position of the light with the frequency wo, by vibrating the probe with its resonance frequency wo. The signal taking-out apparatus takes out the signal from the light radiated onto the optical information recording medium and acquires the tracking error signal from the component of the frequency wo and further acquires the signal in connection with the distance between the tip end of the probe and the surface of the recording medium.

Consequently, the distance between the tip end of the probe and the surface of the recording medium can be measured.

In the same apparatus of the invention, the moving apparatus is the actuator same as the tracking apparatus for tracking the light radiating position.

Consequently, since the moving apparatus is the actuator same as the tracking apparatus for tracking the radiation position of the light, the actuator can be assembled with a simple structure. In addition, the recording and reproducing head can be made small-sized. As the result, the operations of writing-in and reading-out can be done with high speed.

In the same apparatus of the invention, the actuator is the one utilizing the electrostatic attractive force. Consequently, since the moving apparatus is the same actuator as that of the tracking apparatus, the actuator can be assembled with a simple structure, the recording and reproducing head can be made small-sized, and the operations of writing-in and reading-out can be done with high speed.

Furthermore, in the same apparatus of the invention, the actuator is the one utilizing the electromagnetic force, or the one utilizing the piezoelectric effect. Consequently, since the moving apparatus is the same actuator as that of the tracking apparatus, the actuator can be assembled with the simple structure, the recording reproducing head can be made small-sized, and the operations of writing-in and reading-out can-be done with high speed.

In the information recording and reproducing apparatus of the present invention in which the information is recorded or reproduced on the recording medium utilizing the energy applies onto the recording medium from the probe, the apparatus includes a pair of electrodes provided so as to put the probe therebetween in the tracking direction perpendicular to the track direction of the data row arrangement on the recording medium, a control voltage applying medium for applying the control voltages to those electrodes in order to displace (deviate) the tip end of the probe in the tracking direction, and a bias voltage applying medium for applying the bias voltage independent from the control voltages to the probe. Therefore, the bias voltage is independent from (regardless) the control voltages and the standard voltage (reference voltage) of those can be taken commonly. Consequently, the stability of the control voltage(s) can be increased and the circuit structure can be further simplified.

In the same apparatus of the invention in which the information is recorded or reproduced on the recording medium utilizing the energy applies onto the recording medium from the probe, the apparatus includes a pair of electrodes provided so as to put the probe therebetween in the tracking direction perpendicular to the track direction of the data row arrangement on the recording medium, and a control voltage applying medium for superposedly applying, across those electrodes and the probe, the control voltages to displace (deviate) the tip end of the probe in the tracking direction and the bias voltage independent from the control voltages. The (voltage) value of the bias voltage is set to a value larger than a quarter (¼) of the value of the control voltage required for exerting the desired force upon the probe at the time of not applying the bias voltage thereto. Consequently, by setting the value of the bias voltage to a proper value, the linearity of the electrostatic attractive force, and in addition, the control voltage for the tracking can be lowered and thereby the load (burden) of the circuit for outputting the control voltage can be reduced.

In the same apparatus of the invention in which the information is recorded or reproduced on the recording medium utilizing the energy applies onto the recording medium from the probe, the apparatus includes a pair of electrodes provided so as to put the probe therebetween in the tracking direction perpendicular to the track direction of the data row arrangement on the recording medium, a superposed voltage applying medium for superposedly applying, to those electrodes, the control voltages to displace the tip end of the probe in the tracking direction, the bias voltage independent from the control voltage, and the approach voltage for approaching the probe to the recording medium, and the approach voltage applying control medium for applying the approach voltage to the probe only at the time of approaching the probe to the recording medium. Consequently, by applying the approach voltage to the probe only when the probe is caused to approach the recording medium, the operation of the approach can be intended to perform with high speed. Therefore, it is not necessary to employ the special pattern. As the result, the time consumed for processing the signal does not turn to be elongated. On this occasion, although the control voltages, the bias voltage, and the approach voltage are superposedly applied to the electrodes, since the respective voltages applied to the electrode jointly cooperates with the same value in relation to the increase/decrease of the approach voltage, the control voltages and the bias voltage do not exert any bad influence upon the electric potential difference. Consequently, the control property for the tracking operation can be intended to improve and the value of the control voltage can be intended to lower.

The first through fifteenth embodiments according to the present invention are concretely described hereinafter, in detail, referring to the accompanying drawings attached to the specification.

FIRST EMBODIMENT

The first embodiment of the present invention is described hereinafter in detail, referring to the FIGS. 1 through 4 and 16.

In the optical information recording and reproducing apparatus of the first embodiment, an optical fiber emitting light from the tip end thereof is a probe represented by the, reference numeral 130. The probe 130 is carried on a slider 140 as shown in FIG. 1. It is allowable to use either one of a flying slider not brought into contact with a recording medium 150 or a contact slider brought into contact therewith, as a slider 140. During the time period when the recording medium 150 and the slider 140 move relatively, the distance between the recording medium 150 and the tip end of the probe 130 is stably kept to several tens nm by the action of the slider 140.

When a circular optical disc is used as the recording medium, both of the slider 140 and the recording medium 150 rotate relatively to each other. On the other hand, when a plate disc, e.g., an optical card memory is used as the recording medium, both of the slider 140 and the recording medium linearly move relatively to each other.

Figure 2:
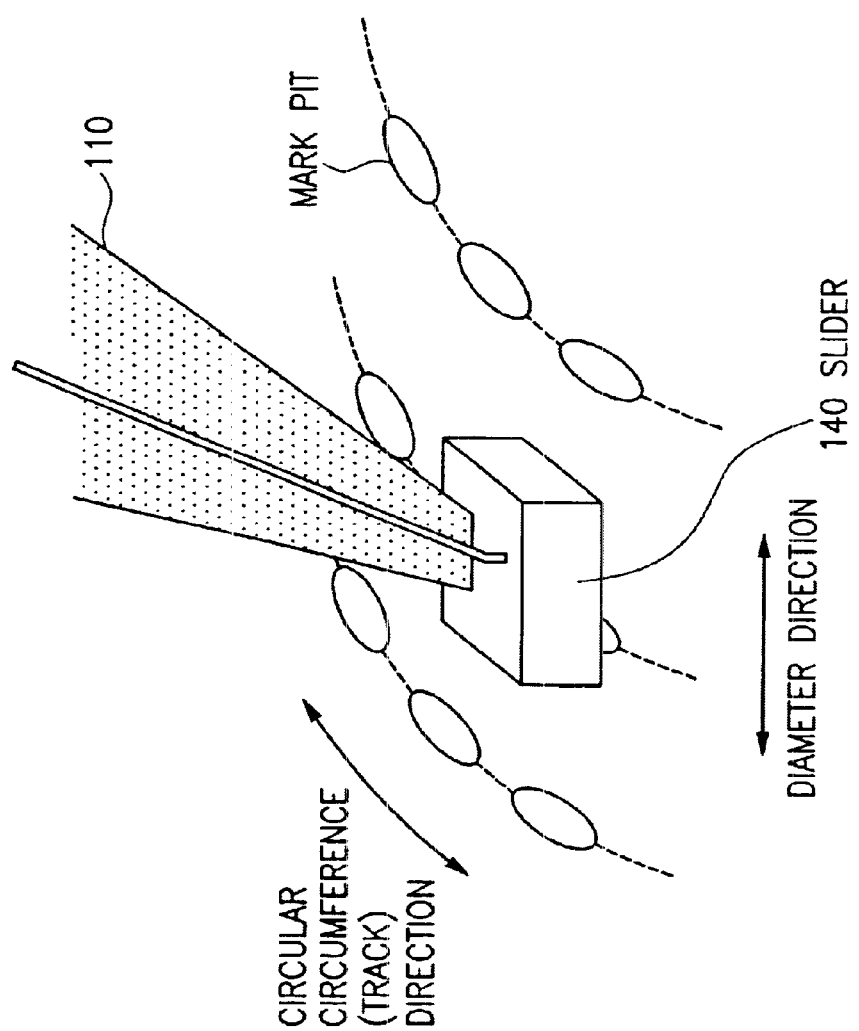
FIG. 2 is an explanatory perspective view illustrating the mark pit for writing therein the information on the surface of the recording medium or in the vicinity thereof.

When the recording medium 150 is the circular disc, mark pits are arranged in the direction of the data row arrangement as shown in FIG. 2, on the surface of the recording medium 150 or the vicinity thereof, and the information has been written in on the mark pits. Since the recording medium 150 rotates, if the probe 130 is not moved so as to put the tip end of the probe 130 on the center of the mark pit, the information cannot be written in or read out, correctly.

Figure 16:
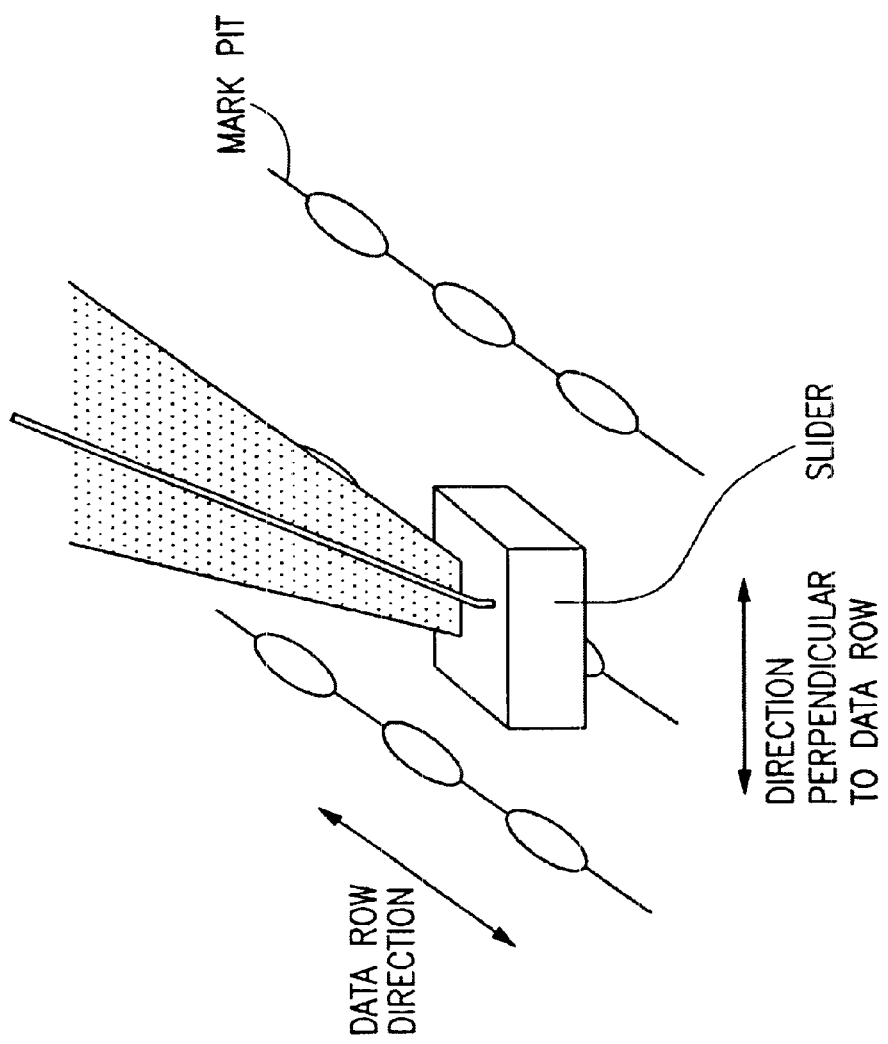
FIG. 16 is an explanatory perspective view for explaining the state of the mark pit arrangement in the direction of the mark pit arrangement on the surface of the plate-state recording medium or in the vicinity thereof and the state of writing therein the information.
Figure 17:
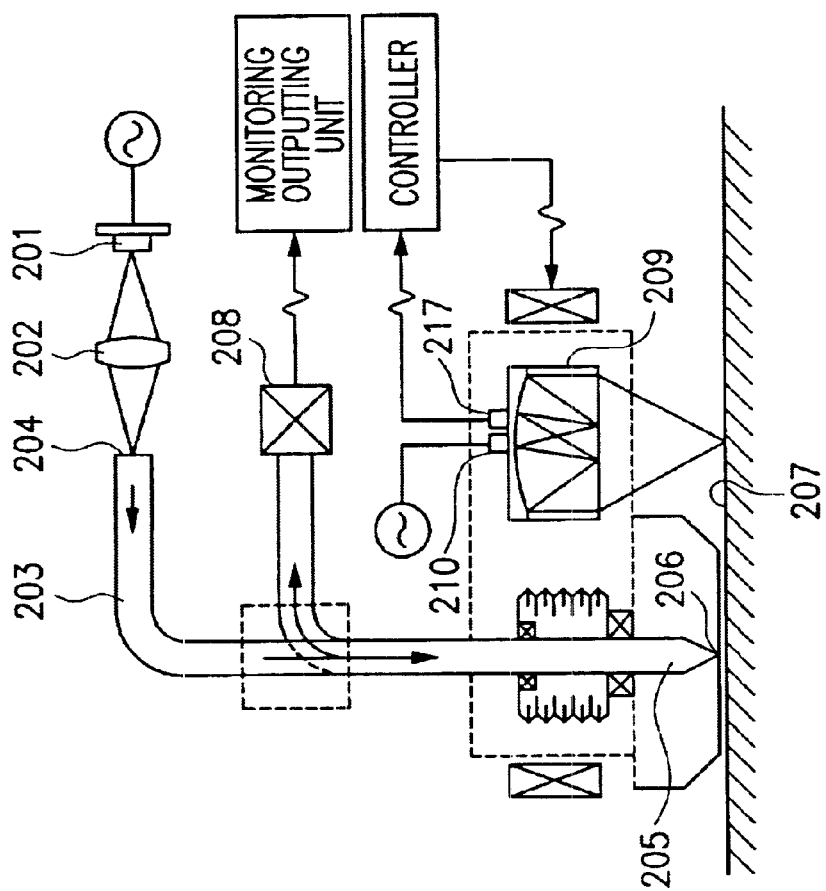
FIG. 17 is a concept (structural) diagram for explaining the background art 3 (substantially same as FIG. 14)
Figure 18:
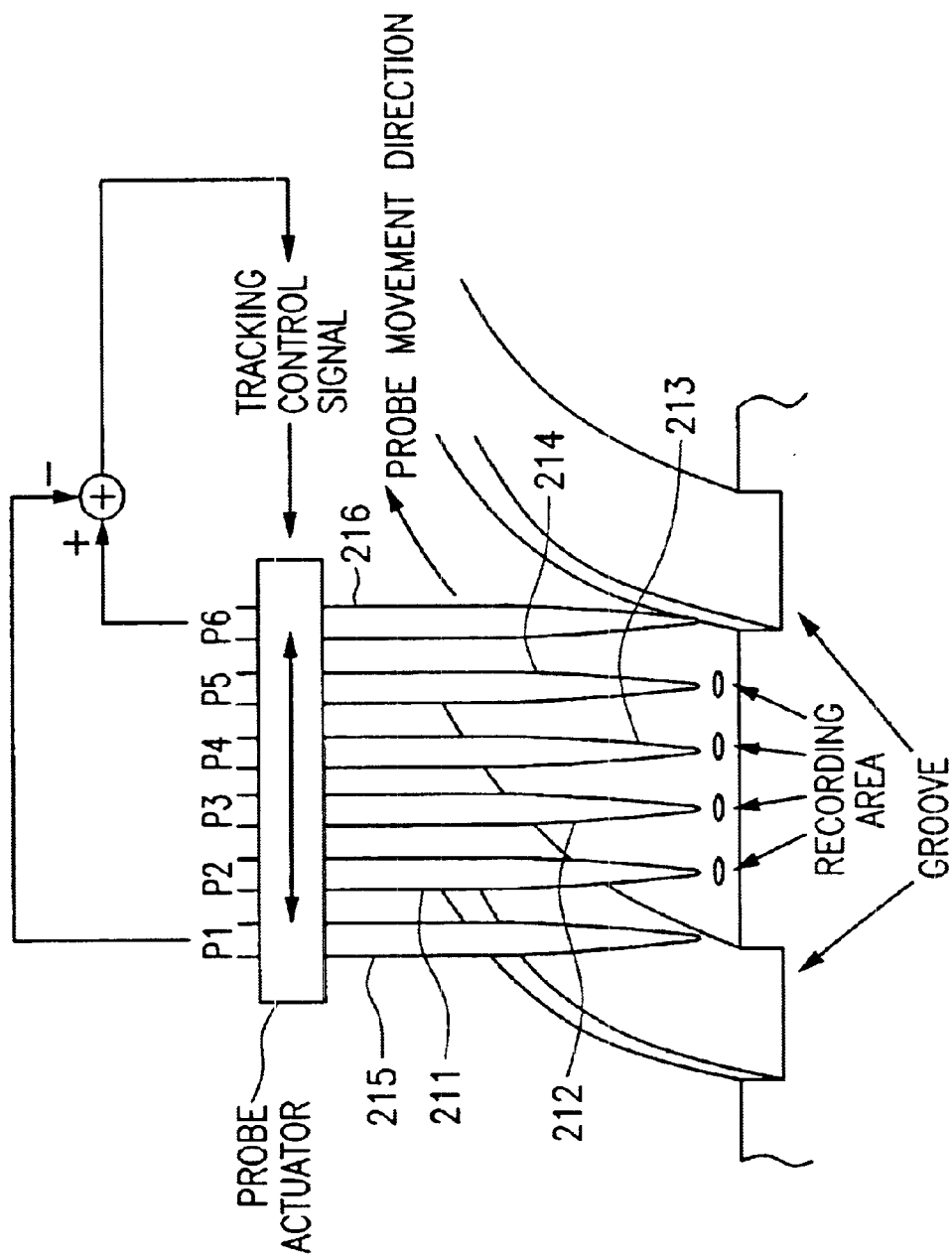
FIG. 18 is a concept (structural) diagram for explaining the background art 4 (substantially same as FIG. 15)
Figure 19:
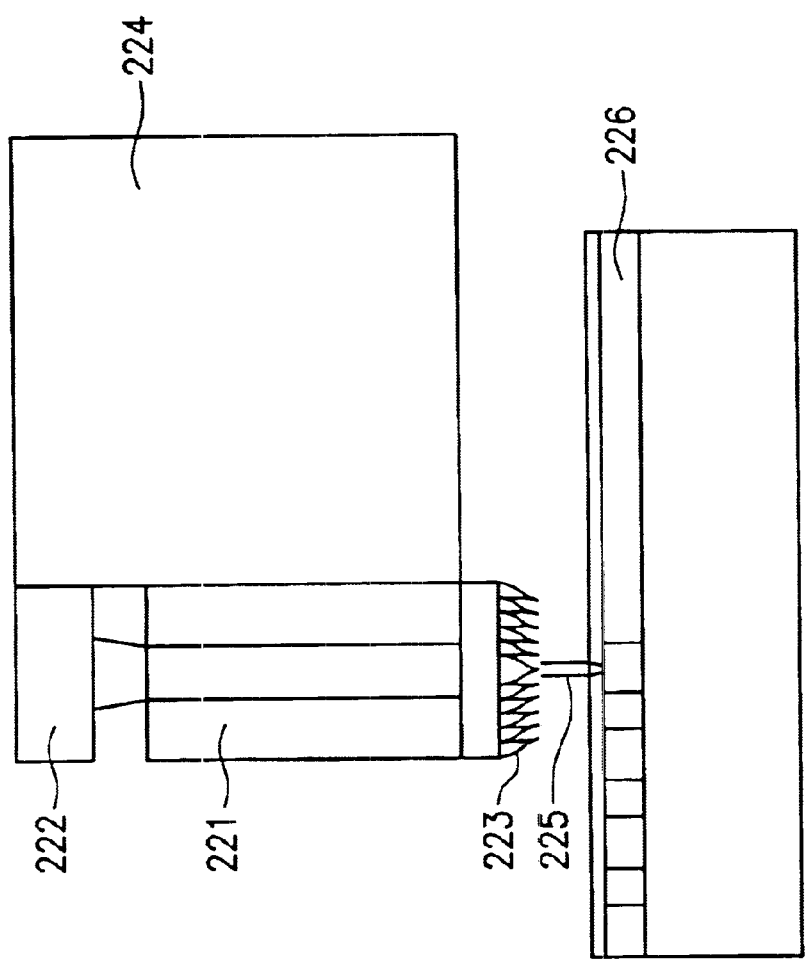
FIG. 19 is a concept diagram for explaining the background art 5.
Figure 20A:
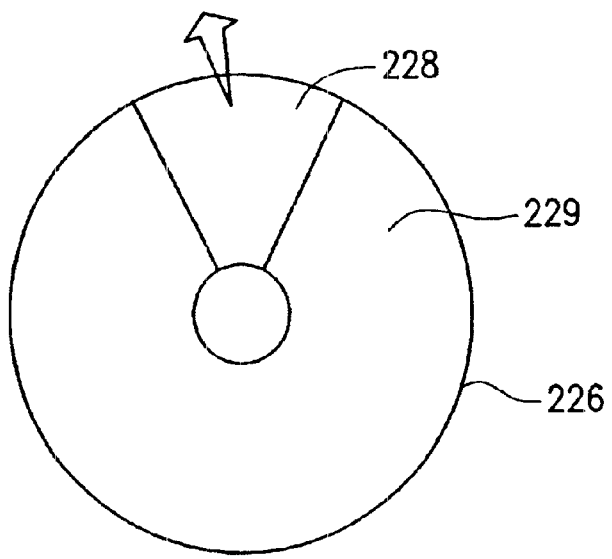
FIGS. 20A and 20B are concept diagram for explaining the background art 6.
Figure 20B:
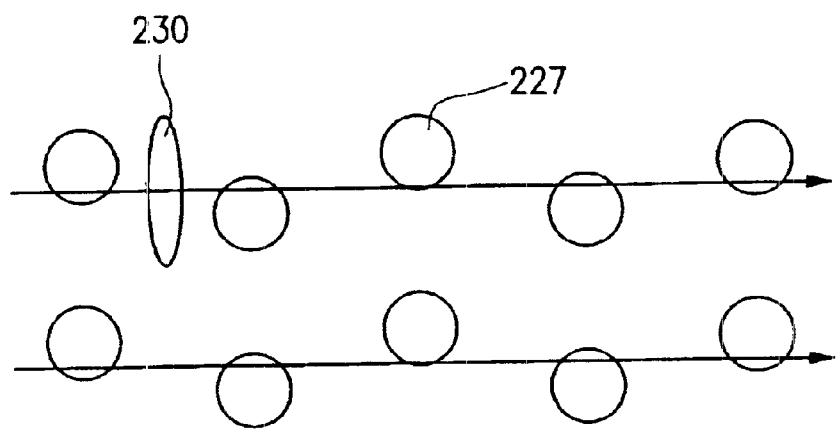
Figure 21:
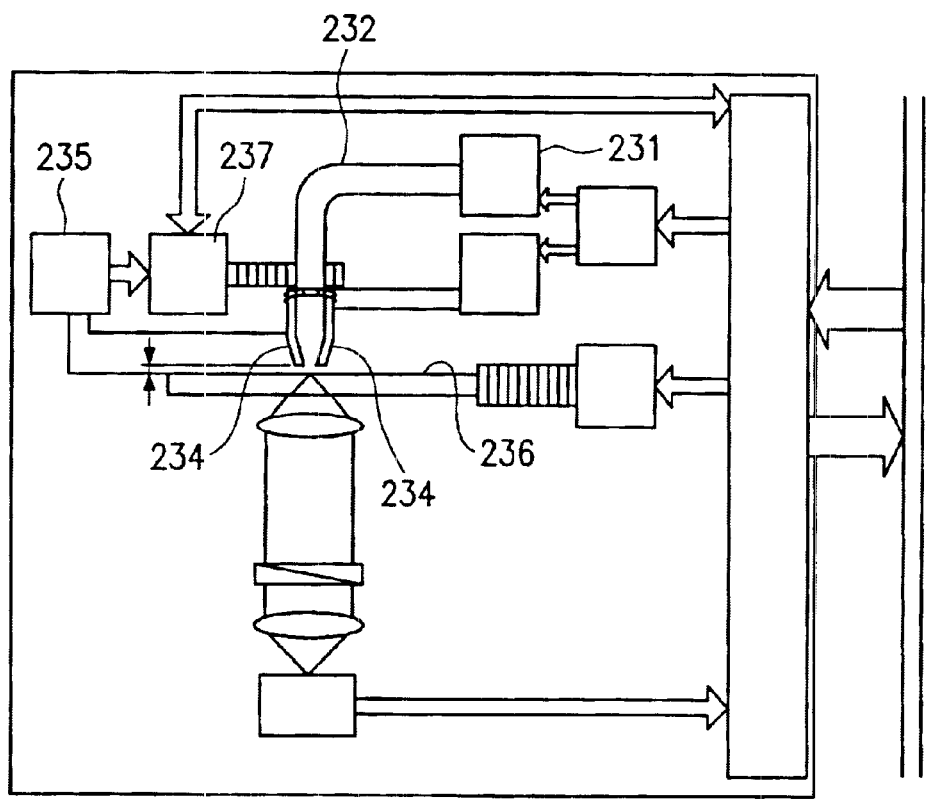
FIG. 21 is a concept diagram for explaining the background art 7.
Figure 22:
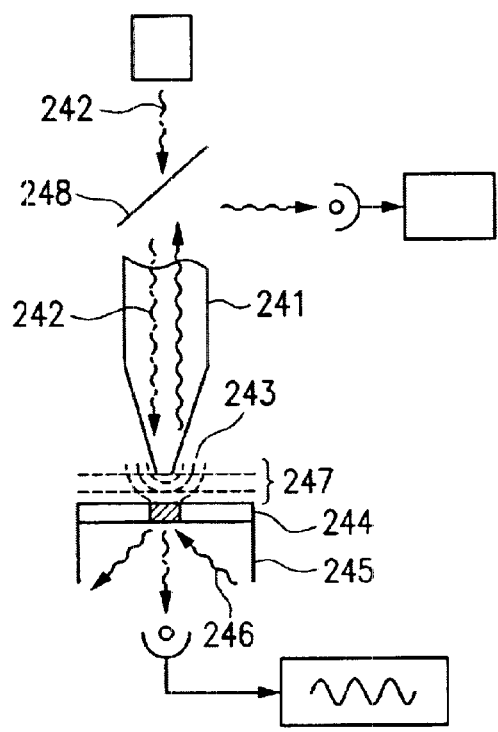
FIG. 22 is a concept diagram for explaining the background art 8.
Figure 23:
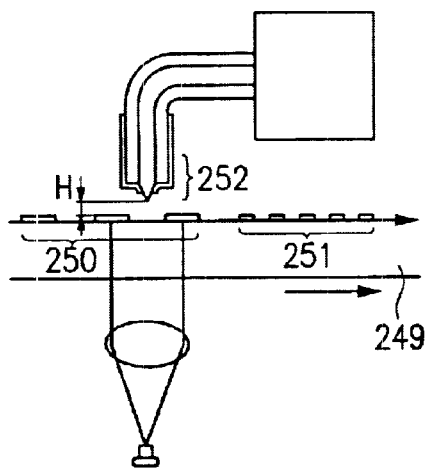
FIG. 23 is a concept diagram for explaining the background art 9.

Similarly, when the recording medium is the plate disc, the mark pits are arranged in the direction of the data row arrangement as shown in FIG. 16, on the surface of the recording medium 150 or the vicinity thereof, and the information has been written in on the mark pits. Since the recording medium 150 moves linearly, if the probe 130 is not moved so as to put the tip end of the probe 130 on the center of the mark pit, the information cannot be written in or read out, correctly.

Figure 3:
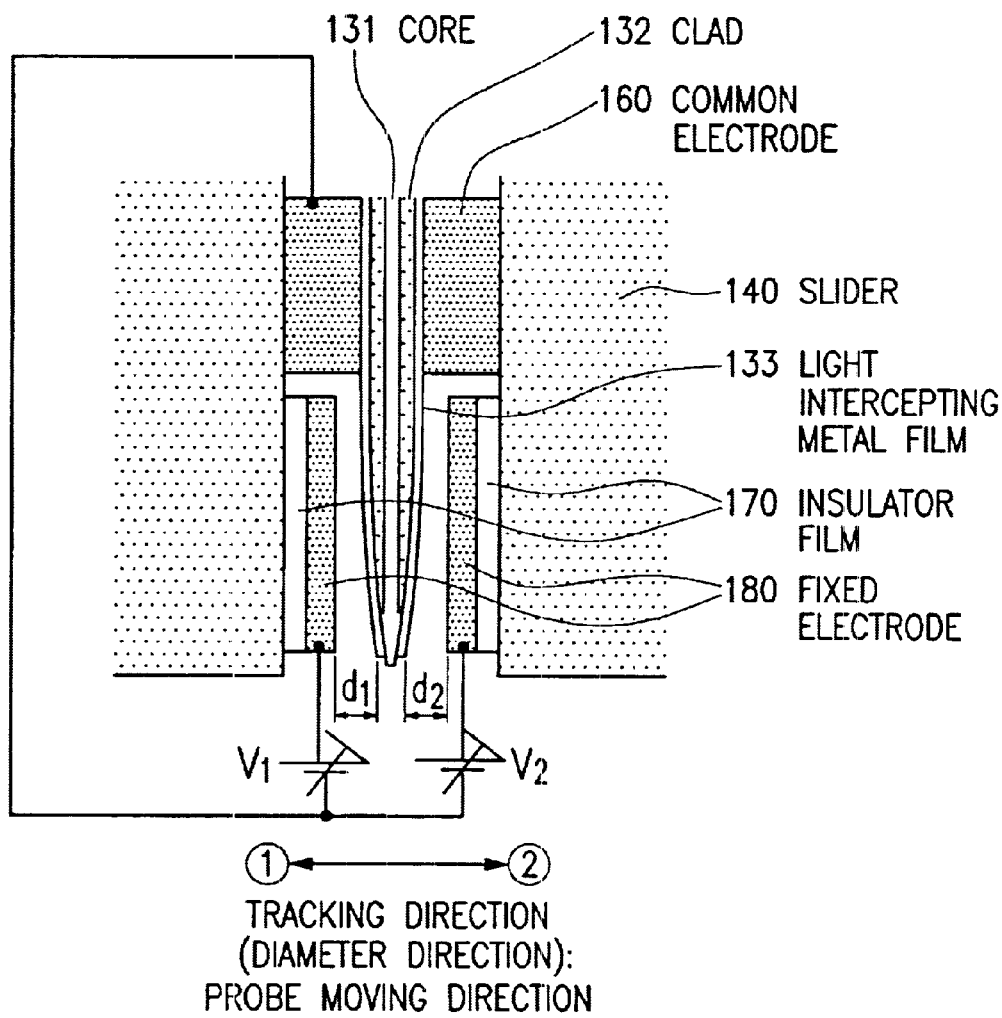
FIG. 3 is an enlarged view illustrating the part near the probe shown in FIG. 1.
Figure 4:
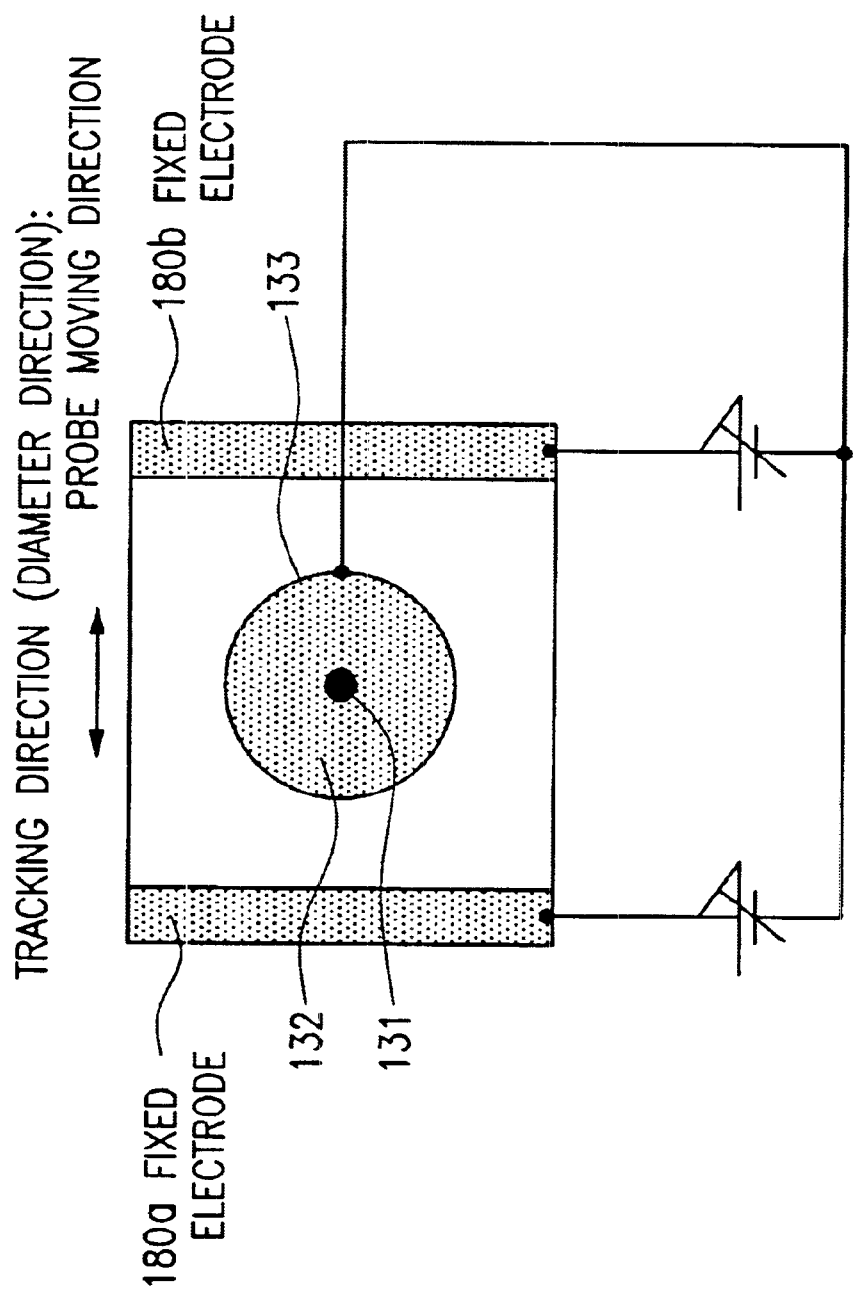
FIG. 4 is a diagram illustrating two fixed electrodes arranged, so as to put the probe therebetween, in the direction perpendicular to the direction of the data now arrangement on the recording medium.

FIG. 3 is an enlarged view illustrating the probe shown in FIG. 1 and the vicinity thereof. As shown in FIG. 3, the probe 130 is composed of a center core 131 and a clad 132 disposed therearound. The base portion of the probe 130 is fixed and the tip end thereof is free. Namely, the probe 130 has a so-called cantilever structure. The tip end of the probe 130 is sharpened by the etching, etc., namely, the diameter thereof becomes smaller toward the tip end. The circumference of the probe 130 is coated with a light intercepting film 133 such that the light is emitted only from the small opening at the tip end thereof. The opening has a diameter equal to or smaller than the wavelength of the light propagating through the (optical) fiber, and the so-called adjacent field light (called "evanescent light") is emitted from the opening. The operations of the writing-in onto the recording medium and the reading-out therefrom are performed by use of the adjacent field light. The light intercepting metal film 133 coating,the probe 130 is grounded (connected to the earth) as a common electrode 160. Two fixed electrodes 180a and 180b are provided (formed) so as to put the probe 130 therebetween, in the direction perpendicular to the direction of the data row arrangement on the recording medium 150 at the time of using the slider 140. Refer to FIG. 4.

An electrostatic attractive force is exerted between the fixed electrodes 180a, 180b and the probe 130, and thereby the probe 130 is put in the state of a cantilever. The tip end of the probe 130 swings in the direction perpendicular to the direction of the data row arrangement on the recording medium. Thereby, the movement (actuation) of the probe tip end required for the tracking can be practiced.

When the probe 130 is moved in the direction ①, the voltage is applied only to $V_1$ and that is not applied to $V_2$. On the contrary, when the probe 130 is moved in the direction ②, vice versa. At this time, the electrostatic attractive force $F_{12}$ in the direction ① is represented by the below equation (1) and that $F_2$ in the direction ② is presented by the other below equation (2).

$$F_1 = -(\tfrac{1}{2})(\partial C_1/\partial d_{12})V_1^2 = (\tfrac{1}{2})\ (V_1^2/d_1^2)\epsilon_a S_1 \quad (1)$$

$$F_2 = -(\tfrac{1}{2})(\partial C_2/\partial d_2)V_2^2 = (\tfrac{1}{2})\ (V_2^2/d_2^2)\epsilon_a S_2 \quad (2)$$

Here, $d_1$ and $d_2$ respectively represent the distance between the tip end of the probe 130 and the fixed electrode 180a and that between the tip end of the probe 130 and the other fixed electrode 180b, $C_1$ and $C_2$ respective electrostatic capacitances between the probe 130 and the fixed electrodes 180a, 180b, $S_1$ and $S_2$ respective equivalent square measures of $C_1$ and $C_2$, and $\epsilon_a$ dielectric constants of the air.

Furthermore, the assumption of the following equations (3) and (4) is done, regarding $C_1$ and $C_2$:

$$C_1 = \epsilon_a(S_1/d_1) \quad (3)$$

$$C_2 = \epsilon_a(S_2/d_2) \quad (4)$$

Consequently, the electrostatic attractive force is proportional to the square of the voltage and inversely proportional to the square of the distance.

Regarding the method of applying the voltage to the probe in order to move the prove, there is another way. That is the way of moving the probe by applying the voltage as expressed by the following equations (5) and (6) to the probe:

$$V_1 = V_b + \Delta V \quad (5)$$

$$V_2 V_b - \Delta V \quad (6)$$

Consequently, the force F exerted on the probe is expressed by the following equation (7):

$$F = F_1 - F_2 = (\tfrac{1}{2})\ (V_1^2/d_1^2)\epsilon_a S_1 - \tfrac{1}{2}(V_2^2/d_2^2)\epsilon_a S_2 = [(2\Delta V \cdot Vb)/d_2]\epsilon_a S \quad (7)$$

However, the assumption as shown by the following equations (8) and (9) is done in the above equation (7). In such way as mentioned above, since the electrostatic attractive force is proportional to the value of $\Delta V$, the control operation can be facilitated. Namely, the operational calculation can be simplified at the time of determining the voltage to be applied in order to move the probe from the tracking error signal. In addition, the stability of the feedback control can be considerably increased.

MODIFICATION OF FIRST EMBODIMENT

Figure 5:
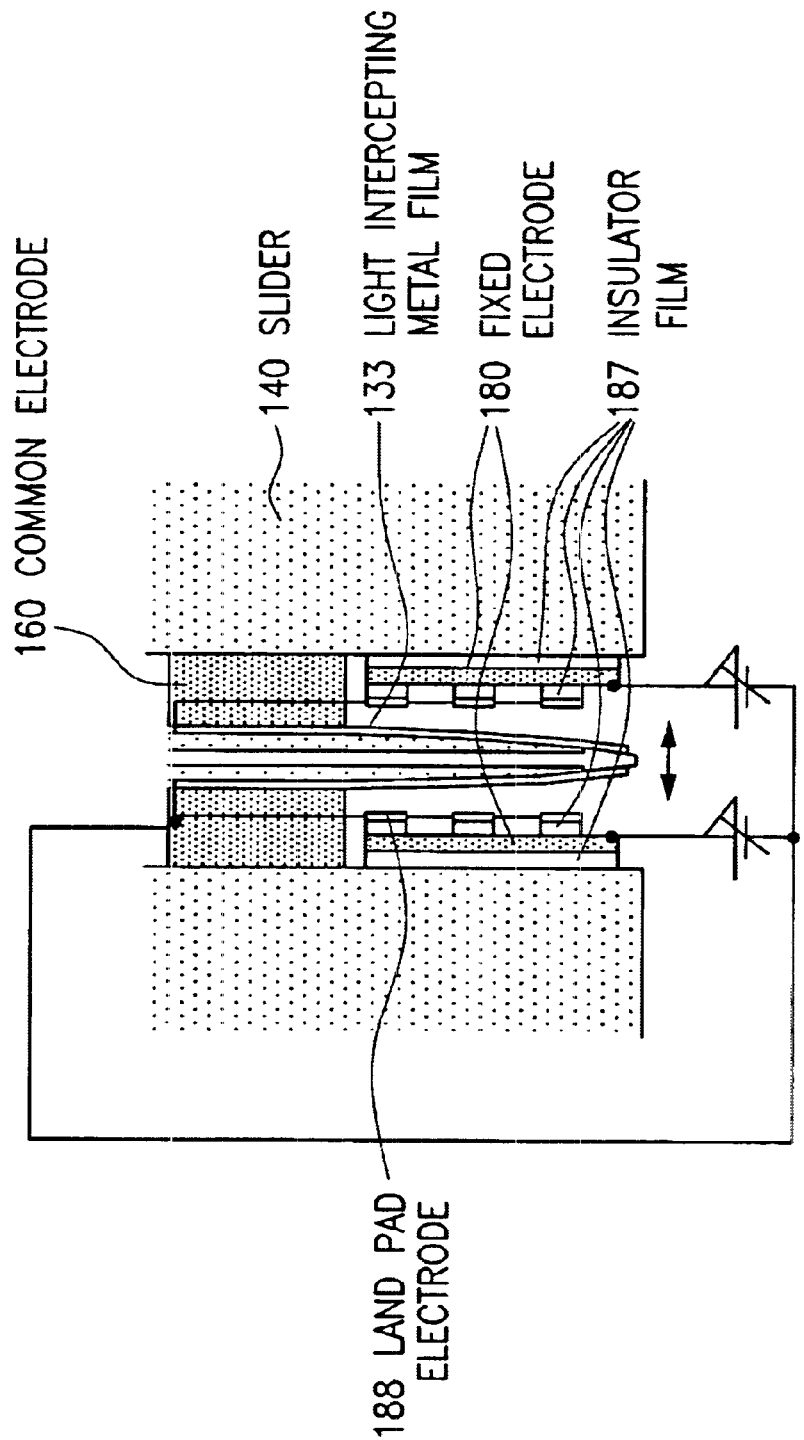
FIG. 5 is a view for explaining the modification of the first embodiment according to the present invention.

FIG. 5 is a view for explaining the modification of the first embodiment according to the present invention.

In FIG. 5, the control operation can be done until ⅓ of the distance between the probe and the fixed electrode(s). However, if the distance exceed ⅓ thereof, the electrostatic attractive force becomes larger than the return spring force due to the resilient deformation, and at the result the probe turns out to be attracted to either one of the fixed electrodes. At this time, since the voltage is applied across the probe and the fixed electrode(s), short-circuiting occurs therebetween and thereby both of them are destroyed or fused to each other by the action of the Joule heat. In order to prevent the occurrence of the above matter, as shown in FIG. 5, plural land pad electrodes are arranged at the places nearer to the probe than to the fixed electrode(s). In such structure, the electric potential of the land pad electrodes is made equal to that of the probe. Consequently, even though the probe is attracted to the fixed electrode(s) by the action of the electrostatic attractive force, both of them can be prevented from coming into contact with each other. Thereby, the destruction of the probe and the fixed electrodes and the fusing of both to each other can be prevented.

SECOND EMBODIMENT

Figure 6:
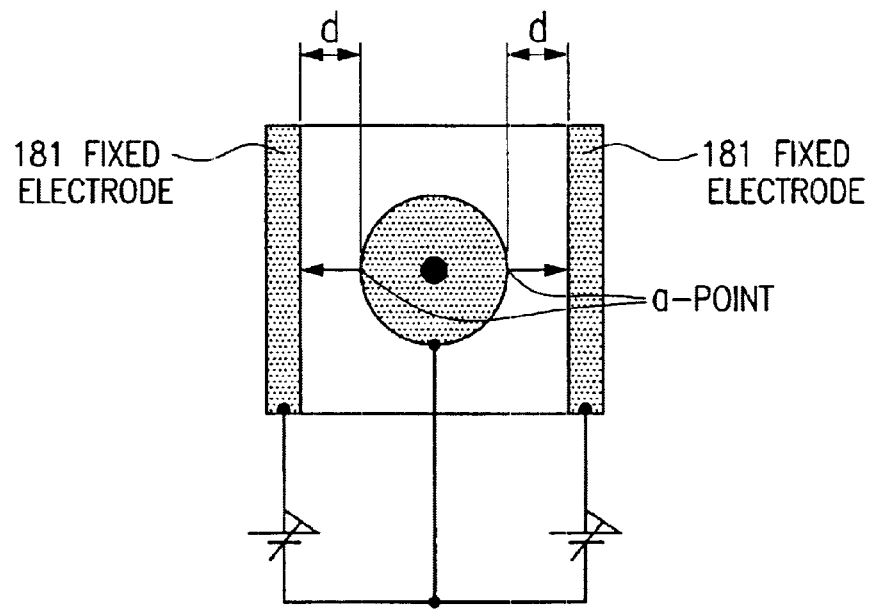
FIG. 6 is a view for explaining the second embodiment according to the present invention.

FIG. 6 is a view for explaining the second embodiment of the present invention.

Since the electrostatic attractive force is inversely proportional to the square of the distance, that is prominently affected by the distance. Consequently, the probe moves in the direction of the line segment of minimizing the distance between the surface of the probe and the surface of the fixes electrode. Since the probe has to be moved in the tracking direction, that is, the direction perpendicular to the direction of the data row arrangement on the recording medium, it is necessary to set the shape and arrangement of the fixed electrode such that the above-mentioned direction coincides to the direction of the line segment of minimizing the above-mentioned distance between the surface of the probe and that of the fixed electrode.

In FIG. 6, a point a on the surface of the probe electrode is the point nearest to the fixed electrode(s) 181. The arrow marks represent a direction of minimized distance between the fixed electrode(s) and the probe. Consequently, the probe is surely moved in that direction and therefore the tracking can be stably done.

FIRST MODIFICATION OF SECOND EMBODIMENT

Figure 7:
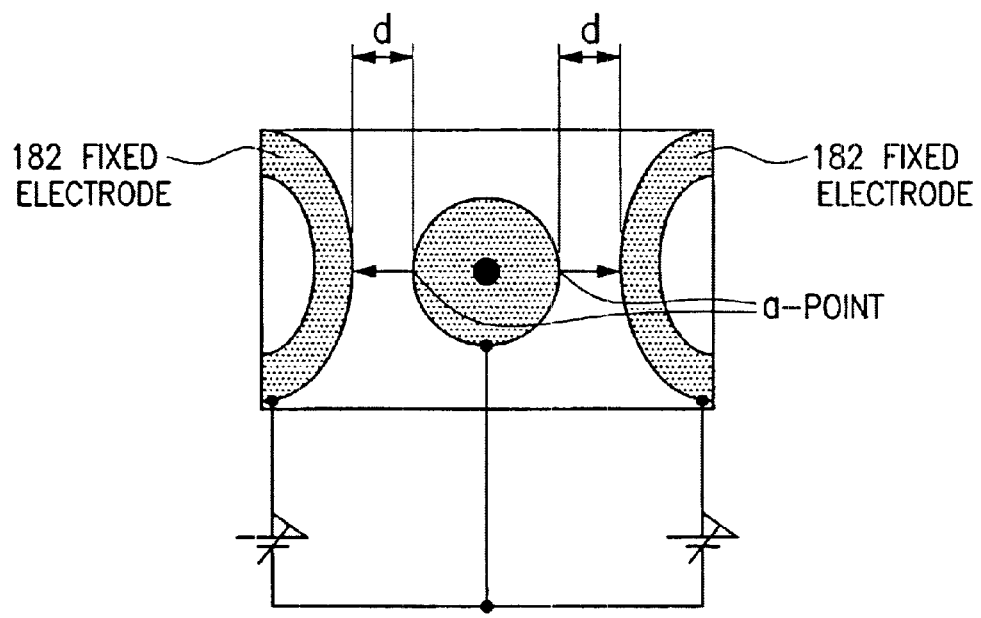
FIG. 7 is a view for explaining the first modification of the second embodiment shown in FIG. 6.

FIG. 7 is a view for explaining the first modification of the second embodiment shown in FIG. 6.

In FIG. 7, fixed electrodes 182 is made in the shape of semicircular cylinder. The point a of the probe electrode is the point (a-point) on the probe surface which is nearest to the fixed electrode(s) 182. The arrow marks represent the direction of minimizing the distance between the fixed electrode(s) 182 and the probe. In such structure, the probe can be surely moved in that direction. Consequently, the operation of tracking can be done stably.

SECOND MODIFICATION OF SECOND EMBODIMENT

Figure 8:
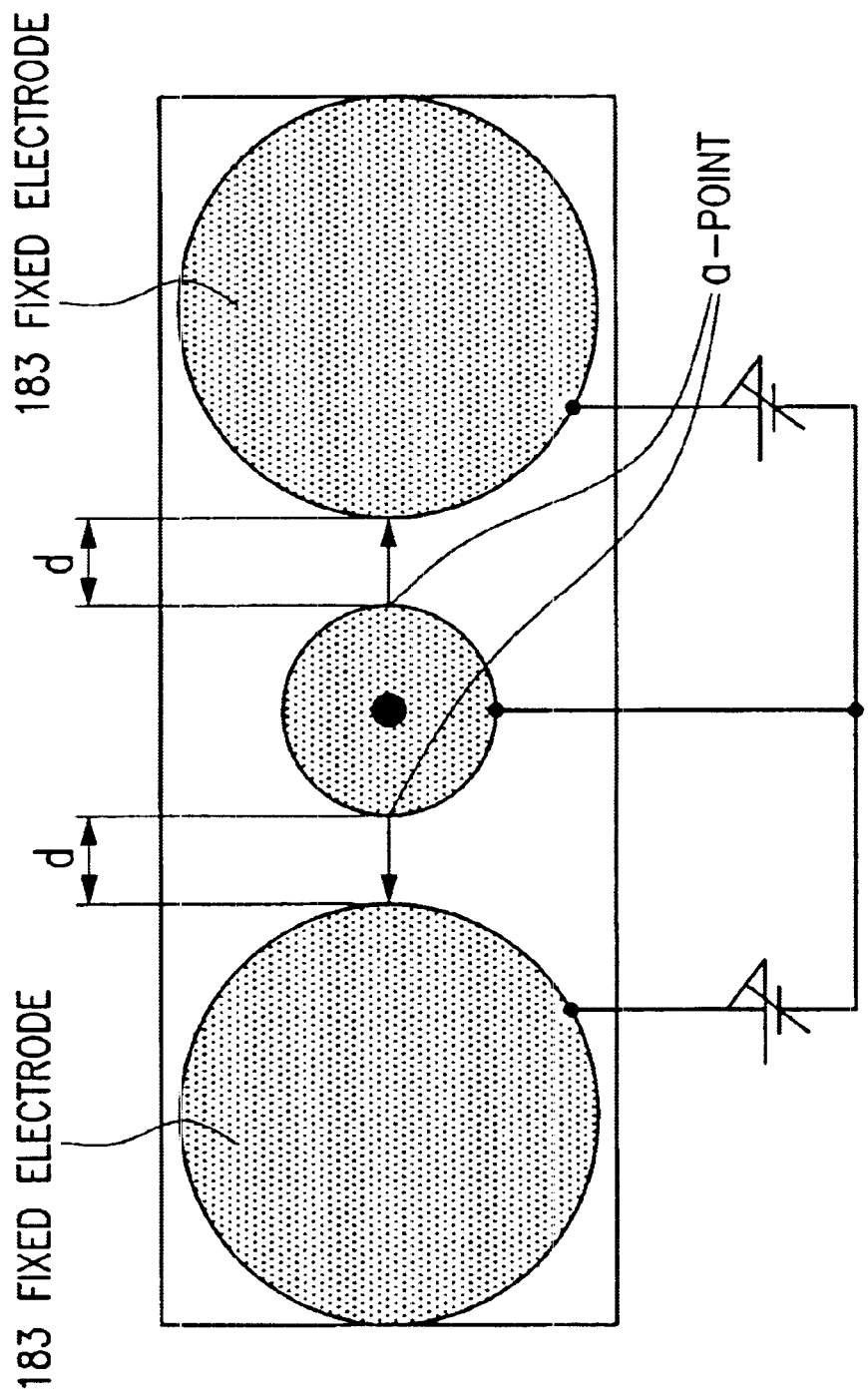
FIG. 8 is a view for explaining the second modification of the second embodiment shown in FIG. 6.

FIG. 8 is a view for explaining the second modification of the second embodiment shown in FIG. 6.

In FIG. 8, fixed electrodes 183 is made in the shape of circular cylinder. The point a of the probe electrode is the point (a-point) on the probe surface which is nearest to the fixed electrode(s) 183. The arrow marks represent the direction of minimizing the distance between the fixed electrode(s) 183 and the probe. In such structure, the probe can be surely moved in that direction. Consequently, the operation of tracking can be done stably.

THIRD EMBODIMENT

Figure 9:
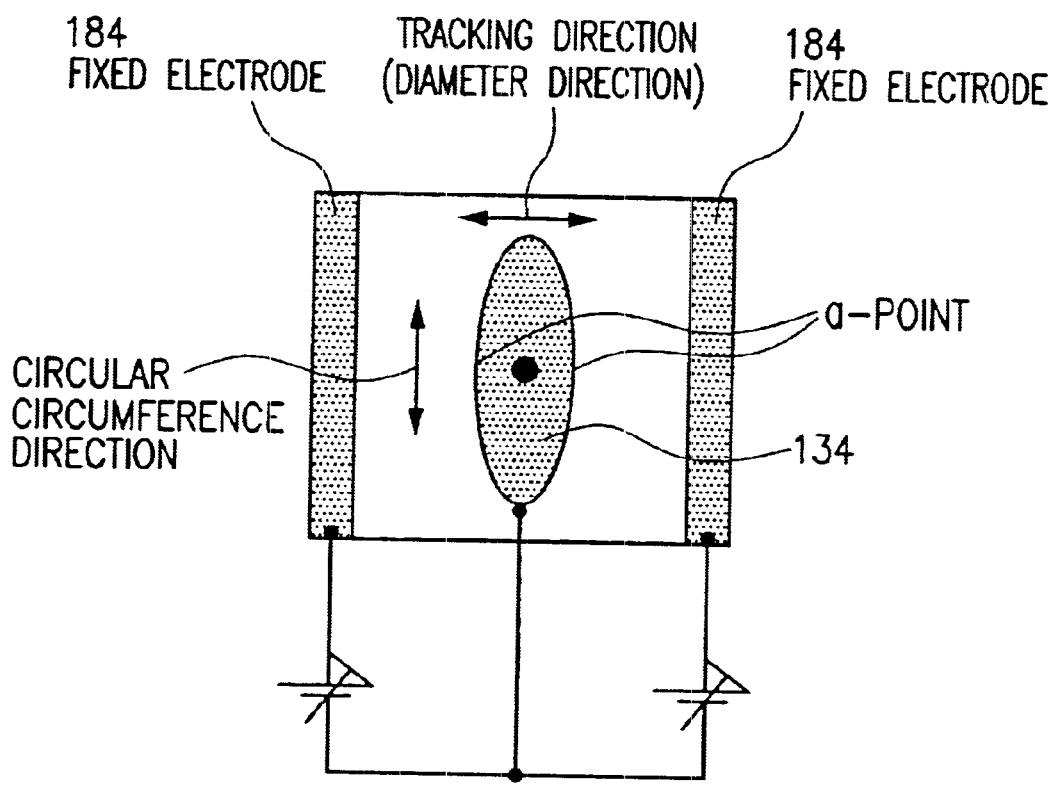
FIG. 9 is a view for explaining the third embodiment according to the present invention.

FIG. 9 is a view for explaining the third embodiment of the present invention.

In FIG. 9, the probe 134 is formed in the state of an ellipse such that the radius is large in the direction of the data row arrangement and the other radius is small in the tracking direction. In such structure, since the rigidity of the probe 134 is higher (larger) in the direction of the data row arrangement than in the diameter direction, the probe 134 is bent to a small extent in the former direction (data row arrangement direction). Consequently, the probe can be precisely moved only in the tracking direction with further security (sureness).

Regarding the method of making such probe 134, the surface of the optical fiber intended to make large the radius thereof is etched by utilizing the etching method of large aeolotropy (anisotropy) such as RIE (Reactive Ion Etching), etc. Thereafter, the opposite surface thereto is also etched, and then, the etching of the probe is done in order to sharpen the (tip end of the) probe. In such way, the metal coating film cam be formed.

FOURTH EMBODIMENT

Figure 10:
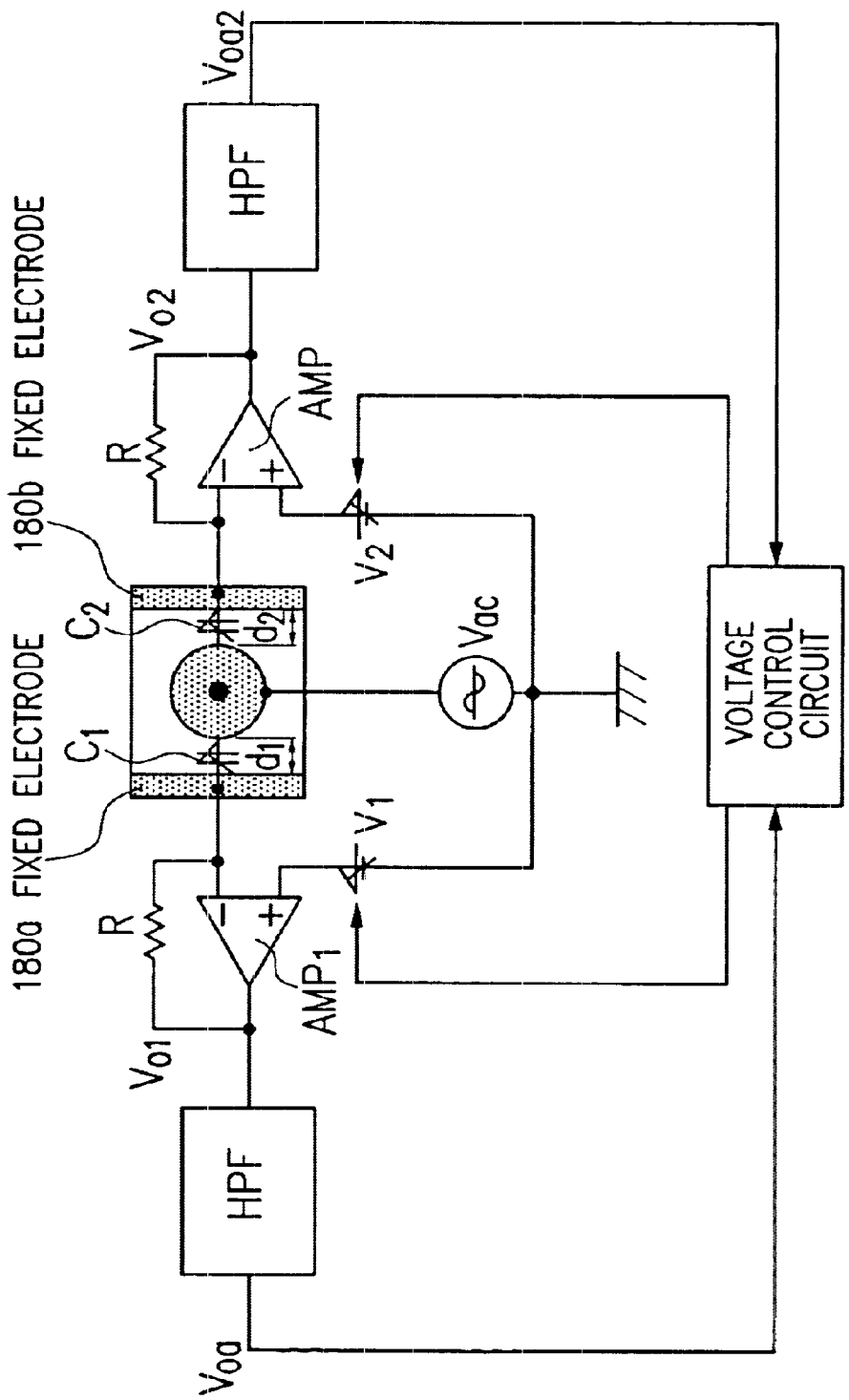
FIG. 10 is a schematic view for explaining the fourth embodiment according to the present invention.

FIG. 10 is a view for explaining the fourth embodiment of the present invention.

In FIG. 10, an AC voltage Vac is applied to the probe 130. The amplitude of Vac is set to a value considerably smaller than that of the voltage for the actuator to enter an unstable area. Furthermore, the frequency of Vac is set to a frequency higher than the resonance frequency of the cantilever composed of the probe 130, preferably, a frequency w equal to or more than there times of the above resonance frequency.

The fixed electrodes 180a and 180b are respectively connected to the inversion input terminal of operational amplifiers AMP1 and AMP2. Between the output terminals of the above operational amplifiers and the inversion input terminal of the amplifiers, for instance, a resistor is connected thereacross. The resistance value of the resistor is R. Voltage sources $V_1$ and $V_2$ are respectively connected to the non-inversion input terminal of the operational amplifiers AMP1 and AMP2.

At this time, the output voltages $V_{O1}$ and $V_{O2}$ are respectively expressed by the following equations (10) and (11):

$$V_{O1}=V_1-jwC_1RV_{ac} \quad (10)$$

$$V_{O2}V_2-jwC_2RV_{ac} \quad (11)$$

Regarding the output voltages $V_{O1}$ and $V_{O2}$ of the respective operational amplifiers AMP1 and AMP2, since DC components thereof are removed by the high-pass filter (HPF), the output voltages thereof are composed of only AC components as shown by the following equations (11) and (12):

$$V_{O1}=jWC_1RV_{ac} \quad (12)$$

$$V_{O2}=jwC_2RV_{ac} \quad (13)$$

Since $C_1$ and $C_2$ is the functions of only the distances $d_1$ and $d_2$ between the probe 130 and the fixed electrodes 180a and 180b as shown by the following equations (14) and (15):

$$C_1=\epsilon_a(S_1/d_1) \quad (14)$$

$$C_2=\epsilon_a(S_2/d_2) \quad (15),$$

the values $d_1$ and $d_2$ can be inversely known from $V_{O1}$ and $V_{O2}$.

As mentioned heretofore, the stable area and the unstable area of the actuator are determined by the distances $d_1$ and $d_2$, and the voltages respectively applied to the electrodes control the electrostatic attractive force. Since the amplification factor of the operational amplifiers AMP1 and AMP2 is very high, the electric potential phase difference between the inversion input and the non-inversion input is only of the order of microvolt. Both electric potentials are almost same.

Consequently, by controlling $V_1$ and $V_2$, the electrostatic attractive force between the respective electrodes 180a and 180b and the probe 130 can be controlled from the distances thus obtained so as to operate the actuator stably. Furthermore, the actuatable area, that is, the movable area of tracking the probe 130 can be widened.

FIFTH EMBODIMENT

Figure 11:
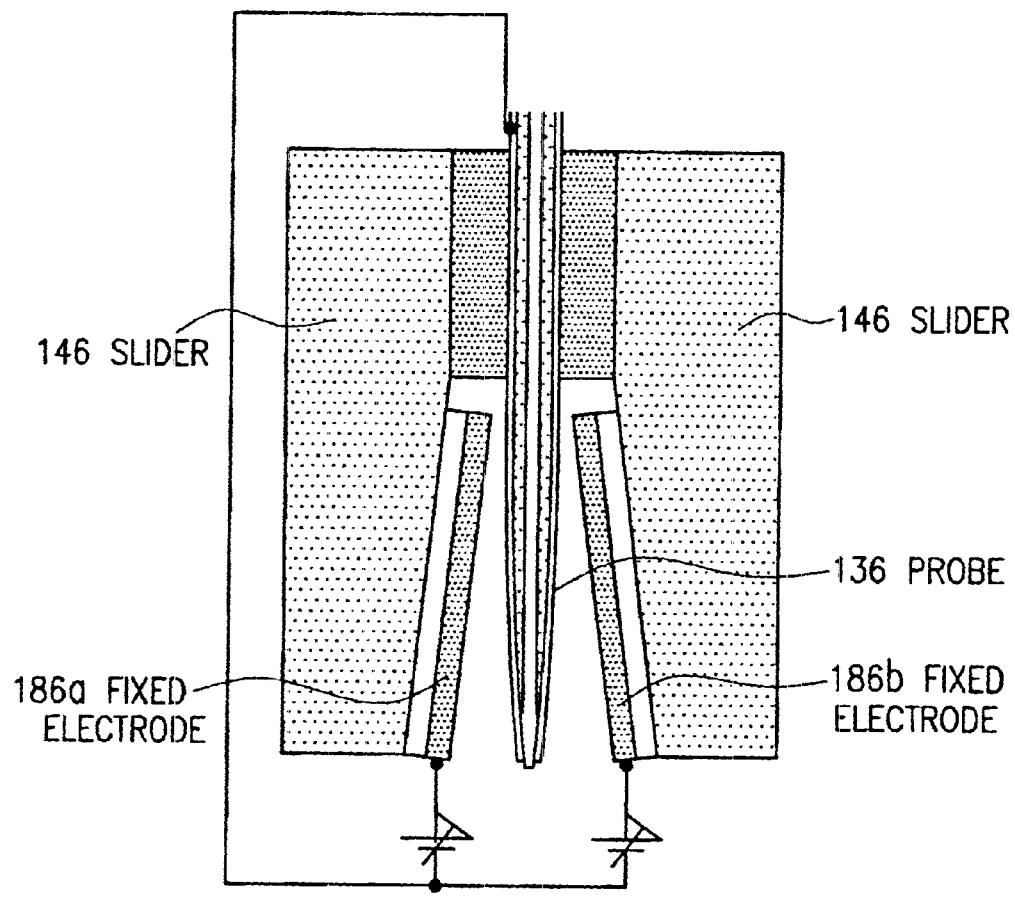
FIG. 11 is a view for explaining the fifth embodiment according to the present invention.

FIG. 11 is a view for explaining the fifth embodiment according to the present invention.

Figure 12:
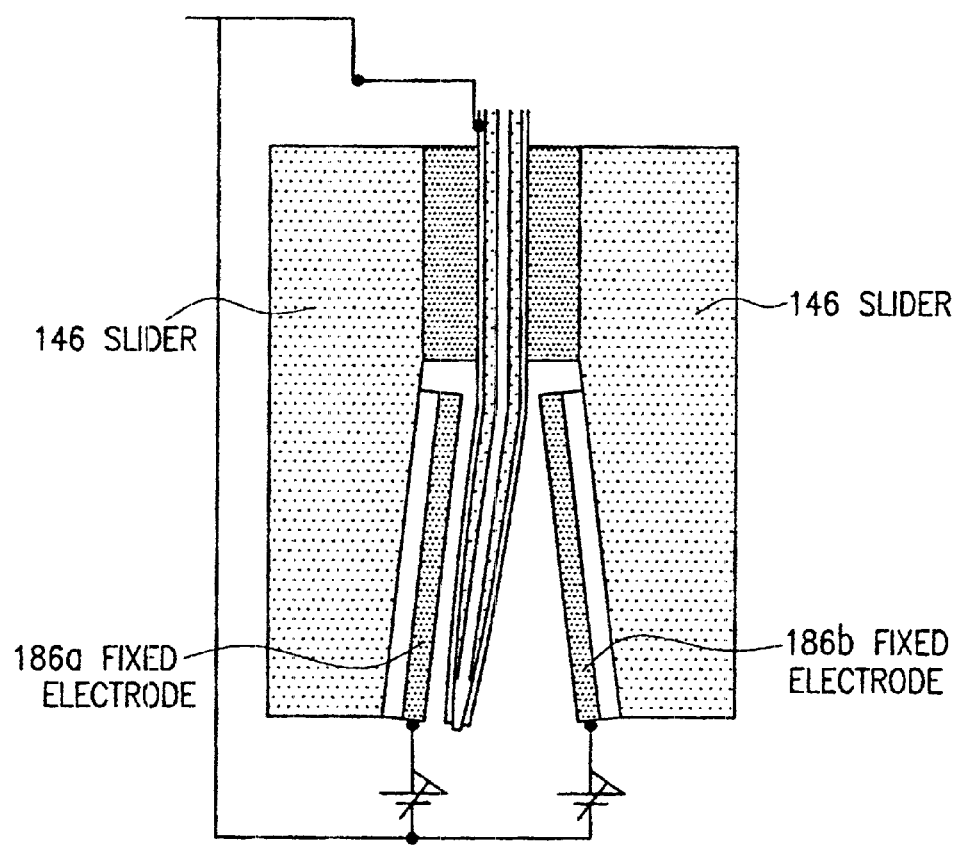
FIG. 12 is a view illustrating the state of the probe inclined to one of the fixed electrodes shown in FIG. 11.

In FIG. 11, the distance between the fixed electrodes 186a, 186b and the probe 136 becomes gradually large toward the tip end of the probe 136. For this reason, the distance of moving the tip end of the probe 136 can be enlarged. Furthermore, since the distance between the fixed electrodes 186a and 186b and the probe. 136 is short at the base portion of the probe 136, the force at this portion is stronger than at the tip end of the probe even though the applied voltage is low. Consequently, the probe 136 is inclined, for instance, to the fixed electrode 186a as shown in FIG. 12. As the result, since the distance between the probed and the fixed electrode 186b becomes shorter at the tip end thereof than at the base portion thereof, the electrostatic attractive force at the tip end thereof becomes further strong. In such way, since the probe is further apt to be easily inclined, the sufficient moving distance of the probe 136 can be obtained even though the voltage is low.

SIXTH EMBODIMENT

In the structure as mentioned in the fourth embodiment, when the distances d1 and d2 between the fixed electrodes 180a, 180b and the probe 130 are respectively obtained by the electrostatic capacitances $c_1$ and $c_2$ Therebetween, the direct current (DC) impedance between the lines connected to the respective inversion input terminals of the operational amplifiers AMP1 and AMP2 is very high.

Consequently, if the long lines are distributed for wiring, various, noises are apt to be mixed into the signal. In order to prevent such noises from occurring, the operational amplifiers AMP1 and AMP2 are disposed at the place in the close vicinity of those fixed electrodes 180a and 180b, and the long output line for wiring of the operational amplifiers can be arranged after performing the amplification.

Figure 13A:
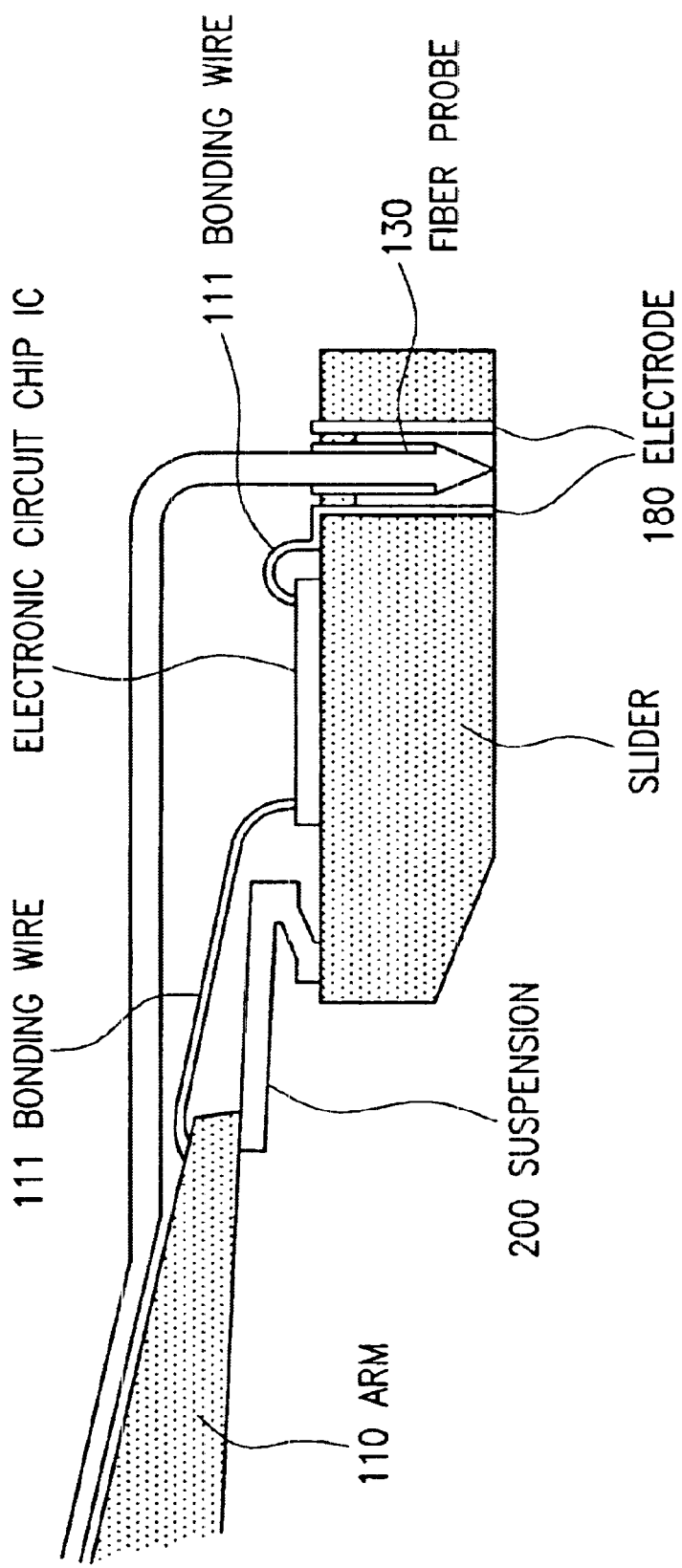
FIGS. 13A and 13B are views for explaining the sixth embodiment according to the present invention.
Figure 13B:
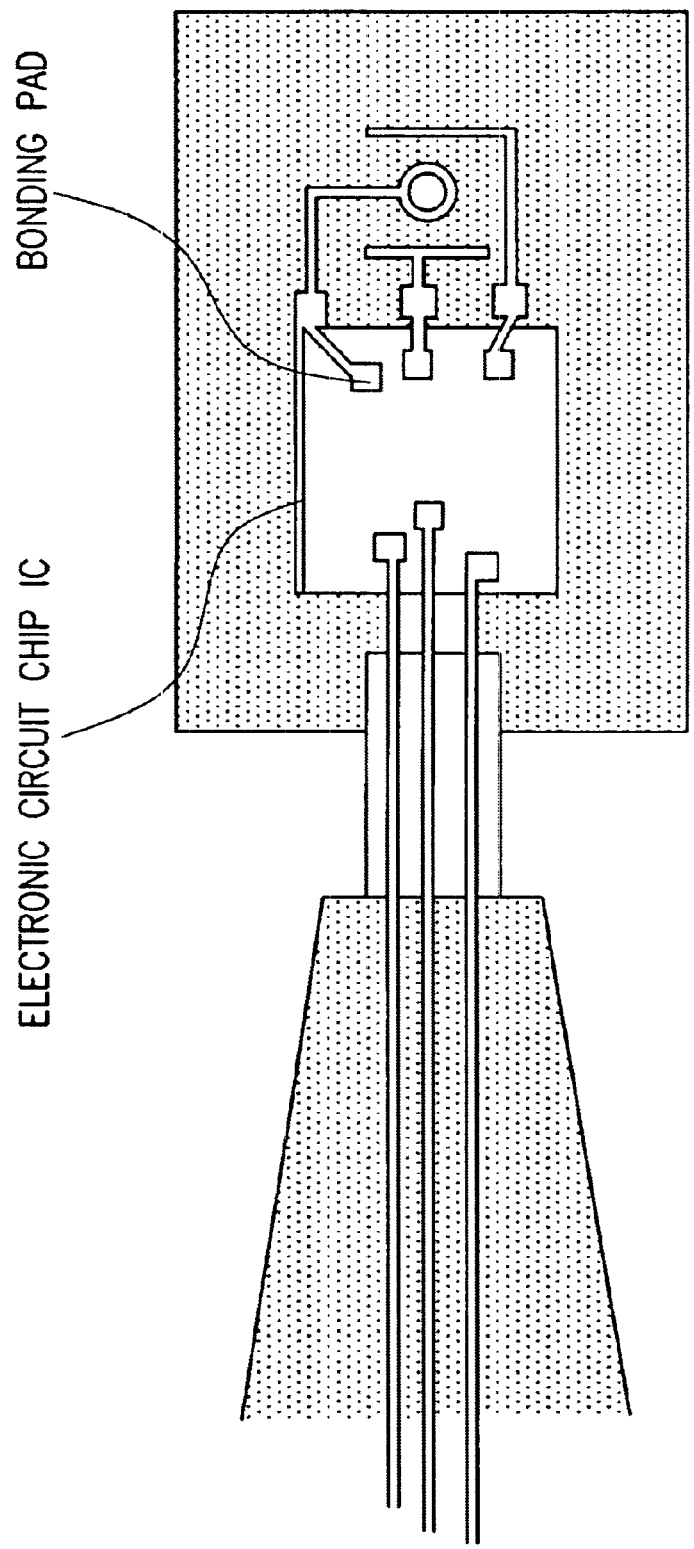
Figure 14:
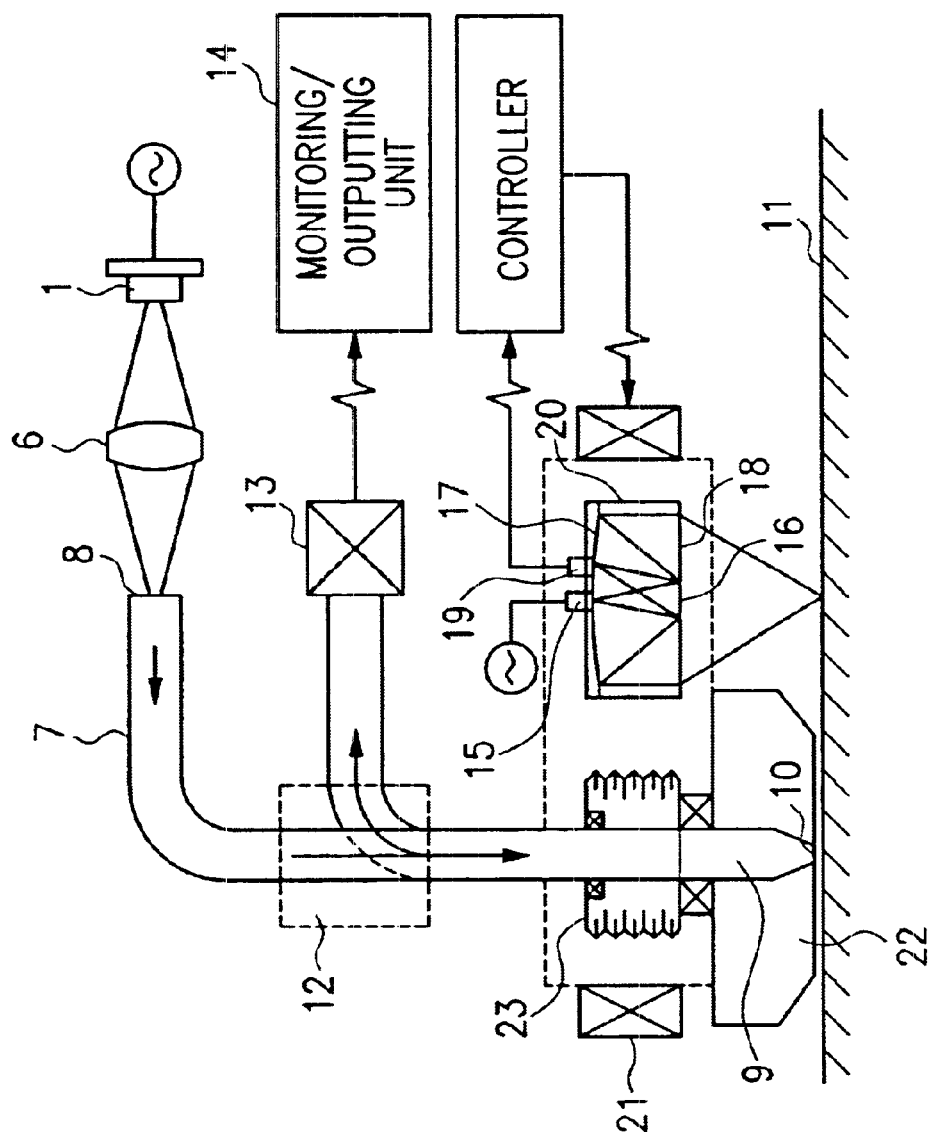
FIG. 14 is a structural diagram for explaining the background art 1.
Figure 15:
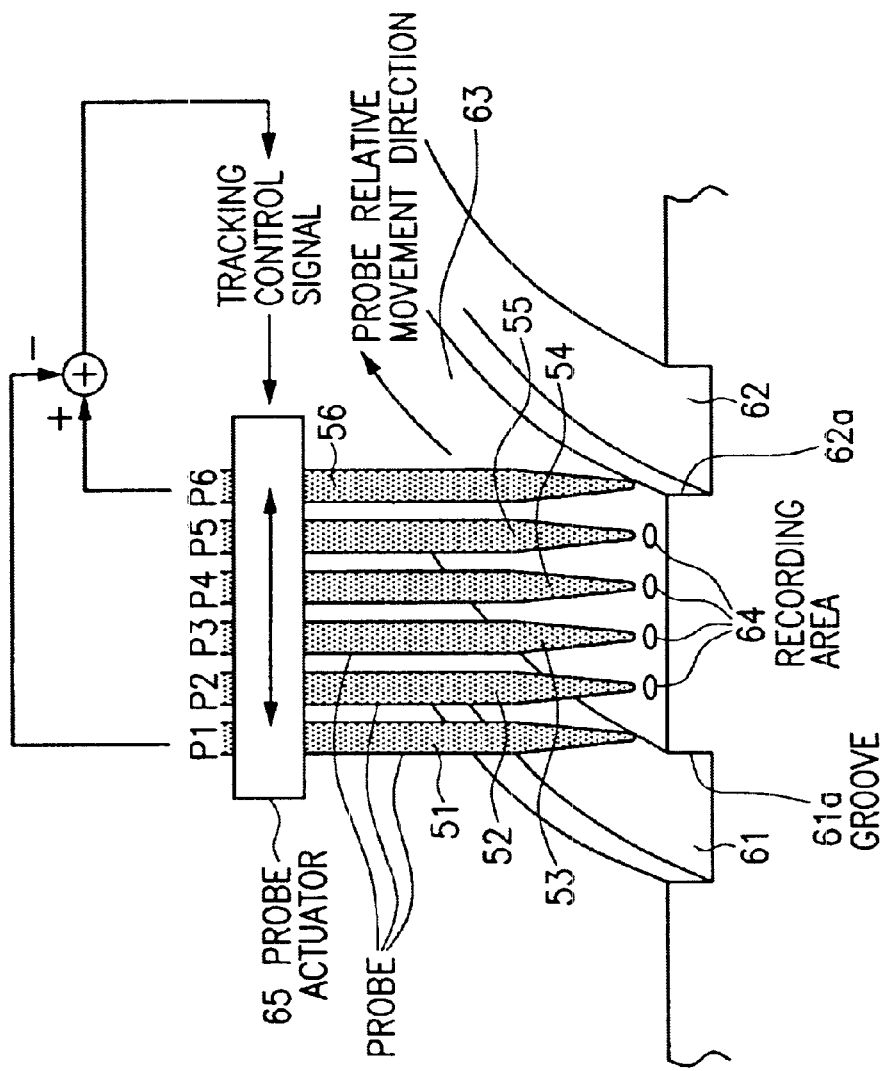
FIG. 15 is a structural diagram for explaining the background art 2.

FIGS. 13A and 13B are views for explaining the sixth embodiment of the present invention. FIG. 13A is a side view thereof and FIG. 13B is a plan view thereof.

In order to realize the above-mentioned wiring, an electronic circuit chip IC is carried on the slider. To state more concretely, a silicon chip having the operational amplifier circuit formed thereon is carried on the slider. On the slider, the above-mentioned fixed electrodes formed by the patterning utilizing the method of the photolithographic etching or the screen printing, etc., the wiring from the probe, and the bonding pad are wired to the side of the silicon chip. The wiring and the boding pad on the silicon chip are connected to each other by the wire-bonding. The output signal amplified by the silicon chip is transmitted to the control circuit in the apparatus by the wiring on the arm. In such structure, the distance between the fixed electrode(s) and the probe can be obtained with low noise. Furthermore, since the distance from the fixed electrode(s) and the probe to the input terminal(s) of the operational amplifier becomes shortened, the wiring capacity is reduced. In addition, the high-speed amplification, that is, the high-speed acquisition of the distance between the fixed electrode(s) and the probe can be made possible. As the result, the high-speed adjustment of the probe movement can be also made possible.

SUMMARY OF FIRST THROUGH SIXTH EMBODIMENTS

As is apparent from the foregoing descriptions, according to the present invention, the fine actuation of the extent of several nm for the compensation (correction) of tracking can be made possible, with the simplified structure as shown in FIG. 3, by adopting the structure of putting the probe between the two electrodes.

Furthermore, the probe is put between the two electrodes and the distance therebetween is minimized in the direction perpendicular to the direction of the data row arrangement on the recording medium. Thereby, the operation of actuating the probe such that the probe is surely-moved in the above-mentioned direction perpendicular to the direction of the data row arrangement on the recording medium.

Moreover, as is apparent from the foregoing description, according to the present invention, the area of enabling to stabilize the operation and actuate the prober, that is, the area of enabling the tracking of the probe can be widened, and thereby the large tracking movement distance can be realized with low voltage.

Furthermore, the circuit of applying the voltage across the electrodes) and the probe, and the circuit of measuring the distance therebetween are disposed in the vicinity of the probe, and thereby the operation of the apparatus can be done with high speed and low noise.

SEVENTH EMBODIMENT

Figure 24:
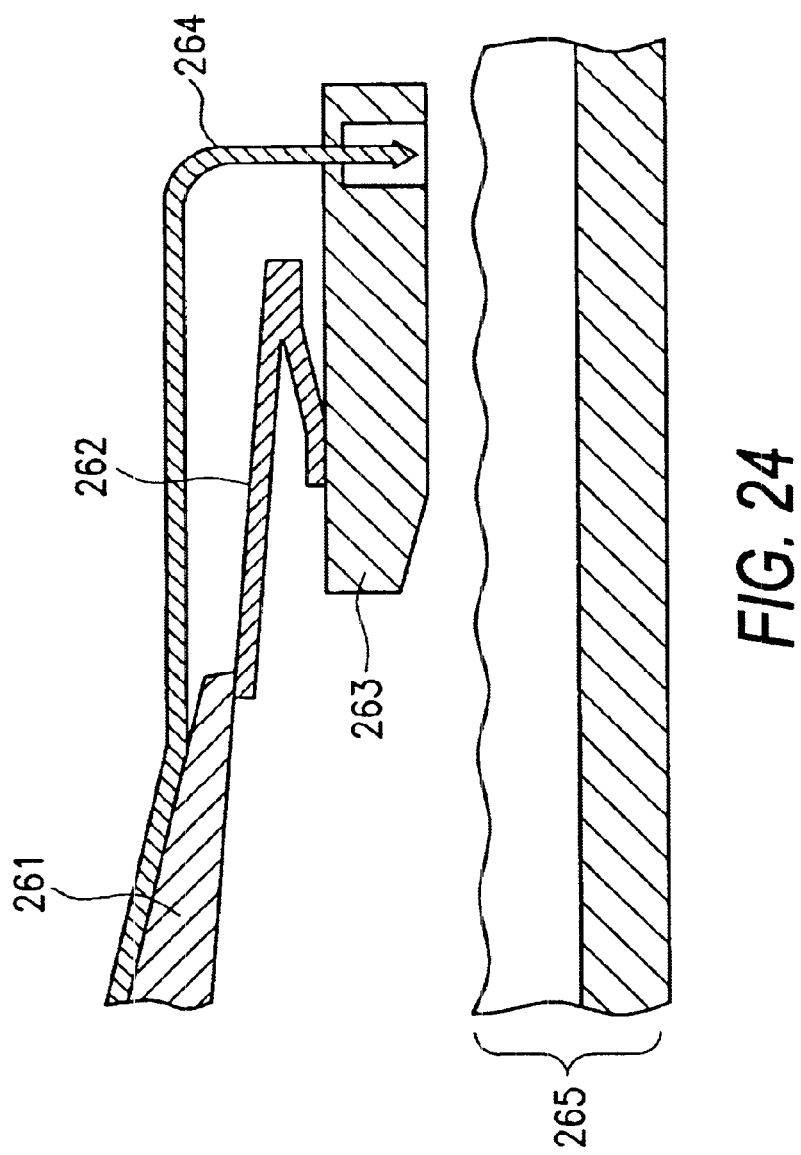
FIG. 24 is a cross-sectional view of the head portion in the optical information recording and reproducing apparatus of the seventh embodiment according to the present invention.

FIG. 24 is a cross-sectional view of a head portion in the optical information recording and reproducing apparatus of the seventh embodiment of the present invention.

In FIG. 24, the head portion in the apparatus radiates the light onto the optical information recording medium, and thereby the operations of recording and reproducing the optical information. The head portion is mounted on a slider 263 through a suspension 262 at the tip end portion of an arm 261. A probe 264 is employed as an optical fiber for emitting the light from the tip end thereof. The probe 264 is carried on the slider 263.

As to the slider 263, either one of a flying slider not coming into contact with an optical information recording medium 265 and a contact slider coming into contact therewith can be used. During the time period of the optical information recording medium's rotation, the distance between the recording medium 265 and the probe 264 is stably kept constant to several tens of nm.

Figure 25:
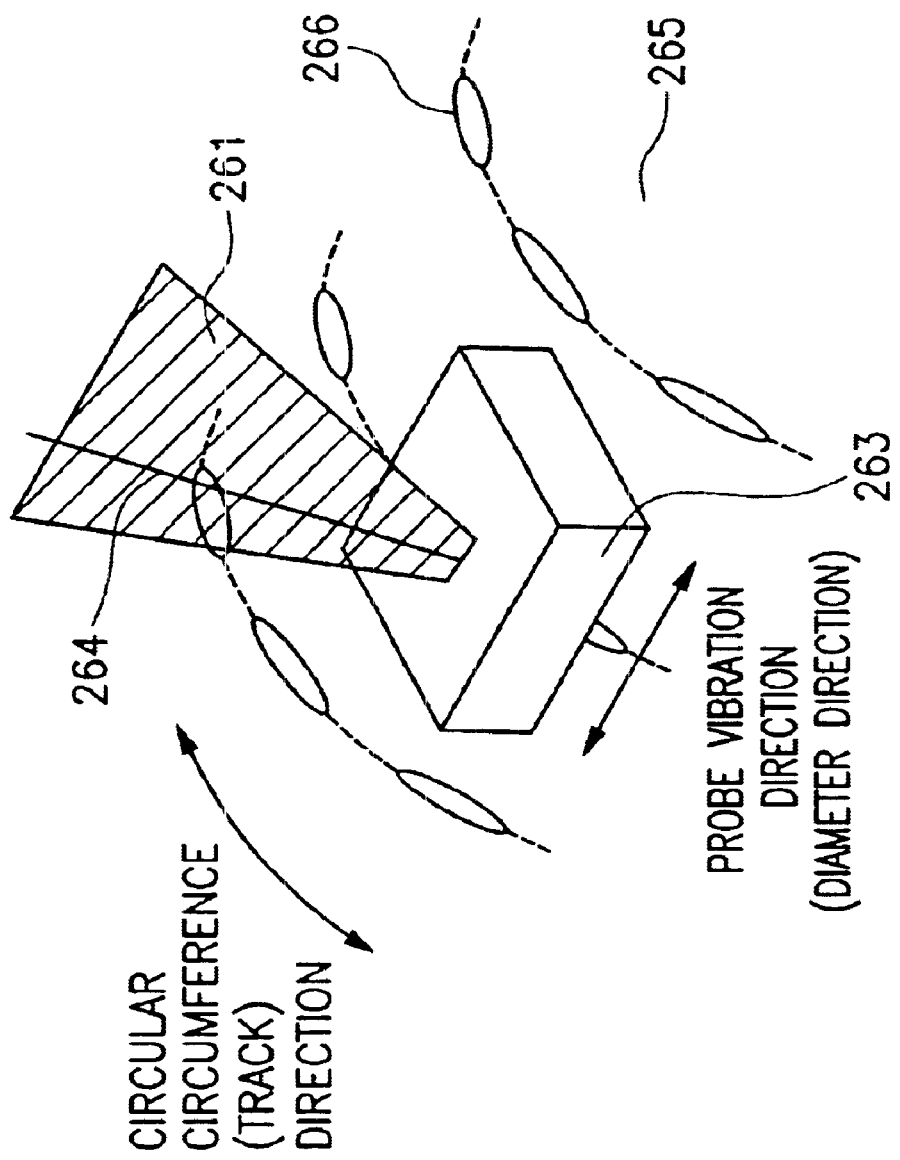
FIG. 25 is a schematic perspective view illustrating the state of scanning the surface of the optical information recording and reproducing apparatus or the vicinity thereof with the head portion.

As shown in FIG. 25, When the optical information recording medium 265 is made in the state of the circular disc, mark pits 266 are arranged in the circular circumferential direction of the optical information recording medium 265, on the surface of the recording medium 265 or in the vicinity of the surface, and the information is written in onto the mark pits 266. At this time, the recording medium 265 rotates. The row of the mark pits 266 moves in a zigzag direction due to the shaft shift (slippage) of the motor for rotating the medium 265 or due to the shaft shift of the medium itself 265. Consequently, unless the probe 264 is moved such that the tip end of the probe 264 is put on the center of the mark pit 266, the correct operations of writing in or reading out the information cannot be done.

Figure 51:
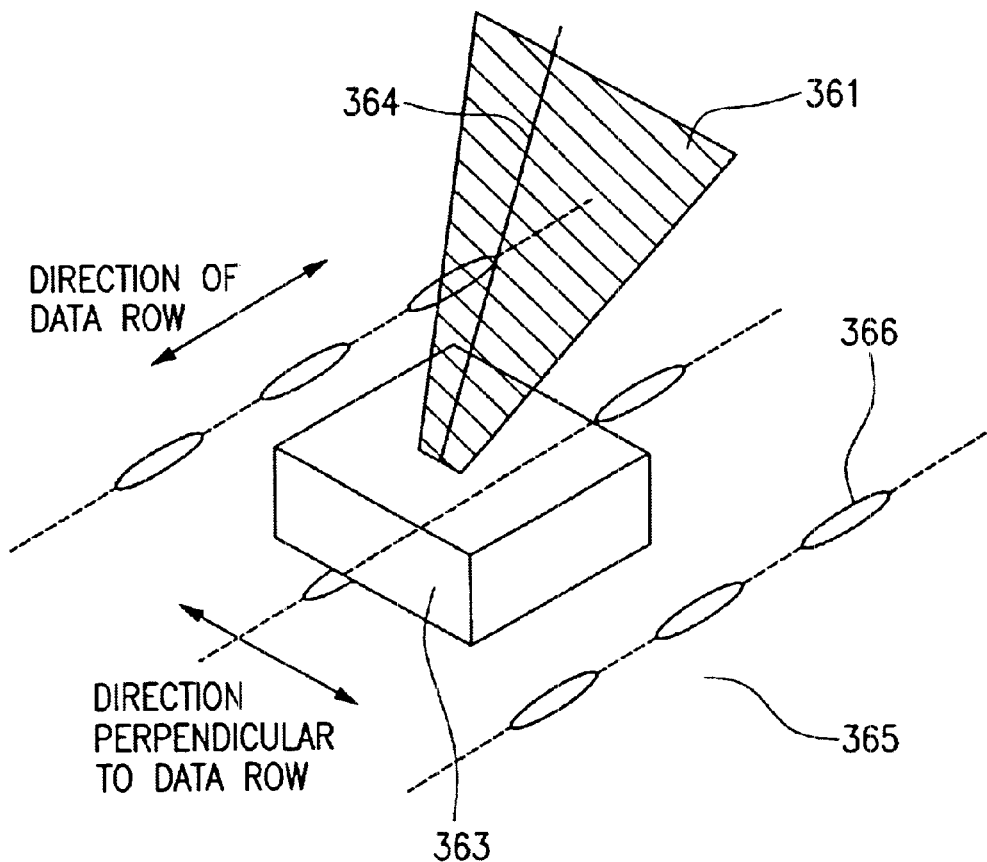
FIG. 51 is an explanatory perspective view for explaining the state of scanning the surface of the optical information recording medium or the vicinity thereof with the head portion.

When the optical information recording medium 265 is made in the state of plate, namely, the medium 265 is an optical card memory, the mark pits 266 are arranged linearly as shown in FIG. 51, and the information is wrote in onto the mark pits 266. Since the optical information recording medium 265 straightly moves linearly in the direction of the data row, unless the probe 264 is moved so as to put the tip end of the probe on the center of the mark pit 266, the correct operations of writing in or reading out the information cannot be done.

Figure 26:
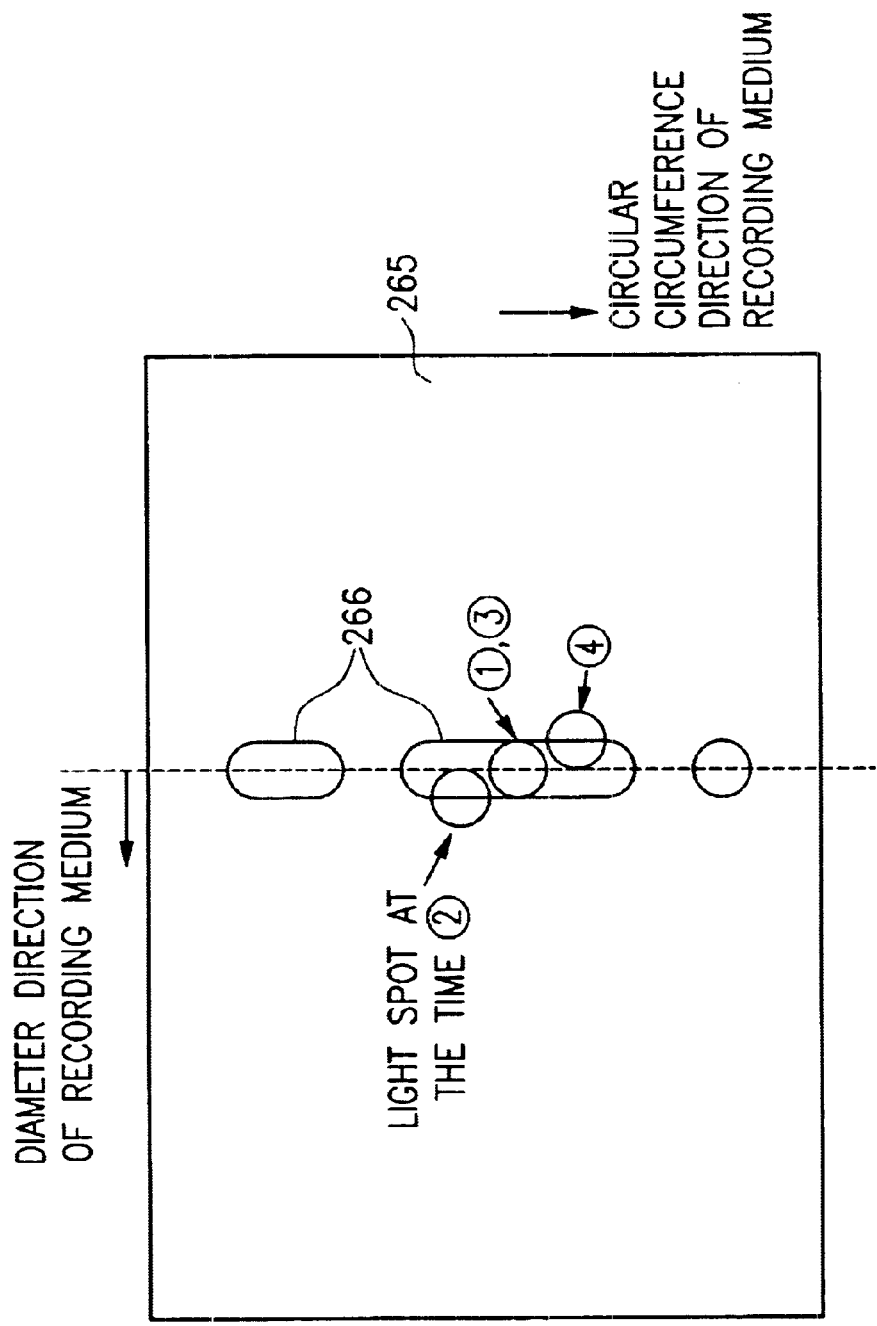
FIG. 26 is a plan view illustrating the movement (vibration) of the light emitted from the probe of the head portion and radiated onto the optical information recording medium.

Next, the operation of the head portion shown in FIG. 24 is described hereinafter. At first, the light emitted from the probe 264 and radiated onto the optical information recording medium 265 is periodically moved (vibrates) in the direction perpendicular to the direction of the data row arrangement of the circular disc type optical information recording medium 265 by use of the predetermined medium (member) mentioned below. FIG. 26 shown the above-mentioned state. In FIG. 26, the mark pits 266 have been already recorded on the optical information recording medium 265. Both of the reflection coefficient (reflectivity) and the transmission coefficient may become higher on the mark pits 266 than the other portions.

The symbols ①–④ in FIG. 26 respectively represent the positions of the light spots on the optical information recording medium 265 at the (just) times ①–④. On the position at the time ① shown in FIG. 26, since the position of the mark pit 266 in the radius direction of the medium 265 coincides with the position of the light spot, the intensity of the light signal of the reflected or transmitted light may become maximum. On the position at the time ② shown in FIG. 26, since the light spot may be separated from the center shaft of the mark pit 266 to a largest extent, the intensity of the light signal may become minimum. On the position at the time ③ shown in FIG. 26, the intensity of the light signal may also become maximum as in the case of the position at the time ①. On the position at the time ④ shown in FIG. 26, the intensity of the light signal may also become minimum as in the case of the position at the time ②.

Figure 27:
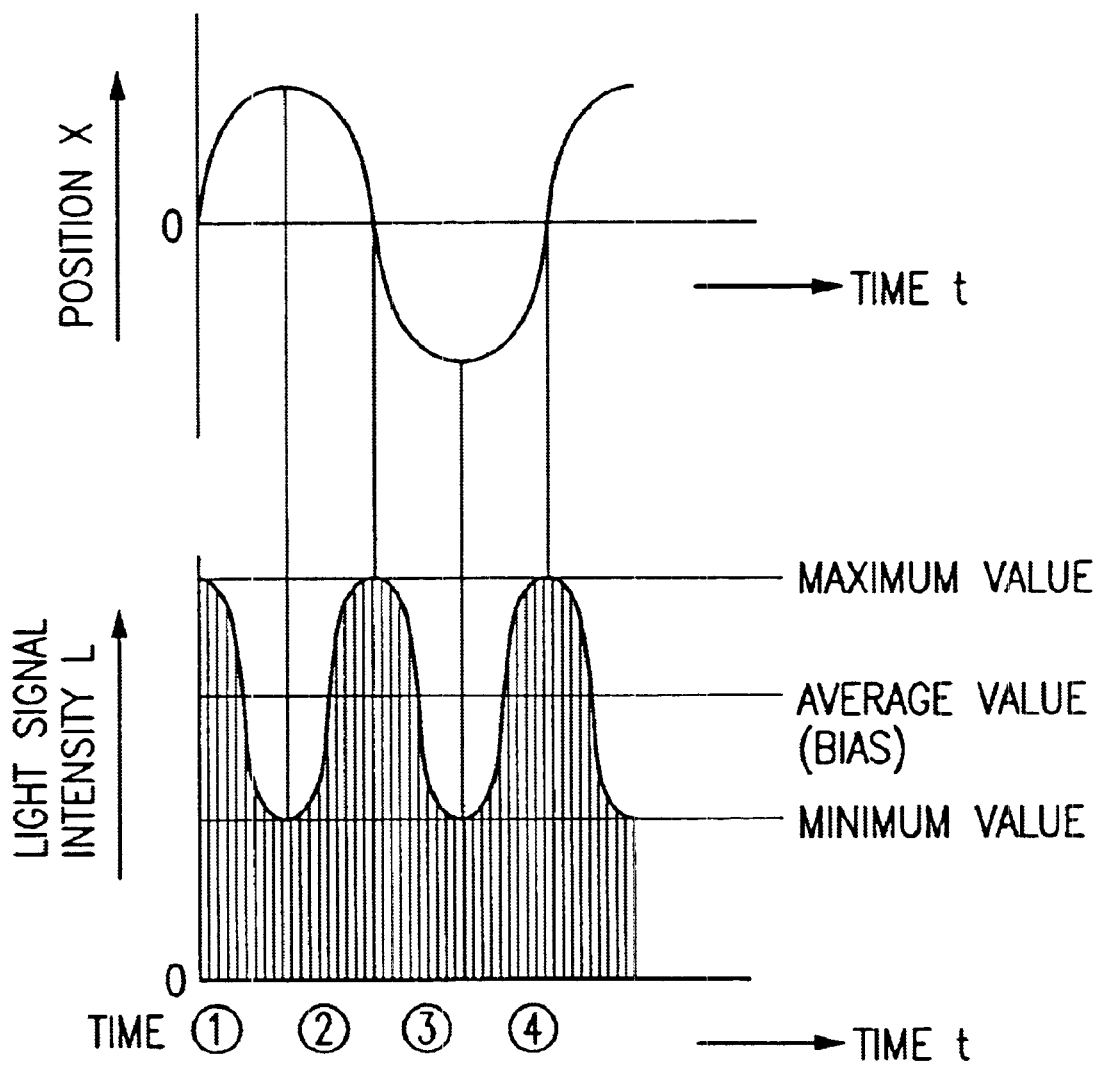
FIG. 27 is graph showing the variations of the signal intensity of the light and the position thereof in the radius direction of the optical information recording medium due to the movement (vibration) of the light.

From the foregoing descriptions, the light signal intensity and the variation of the position in the direction perpendicular to the data row arrangement direction of the optical information recording medium 265 both for the time elapsing are as shown in the graphs of FIG. 27.

Figure 28:
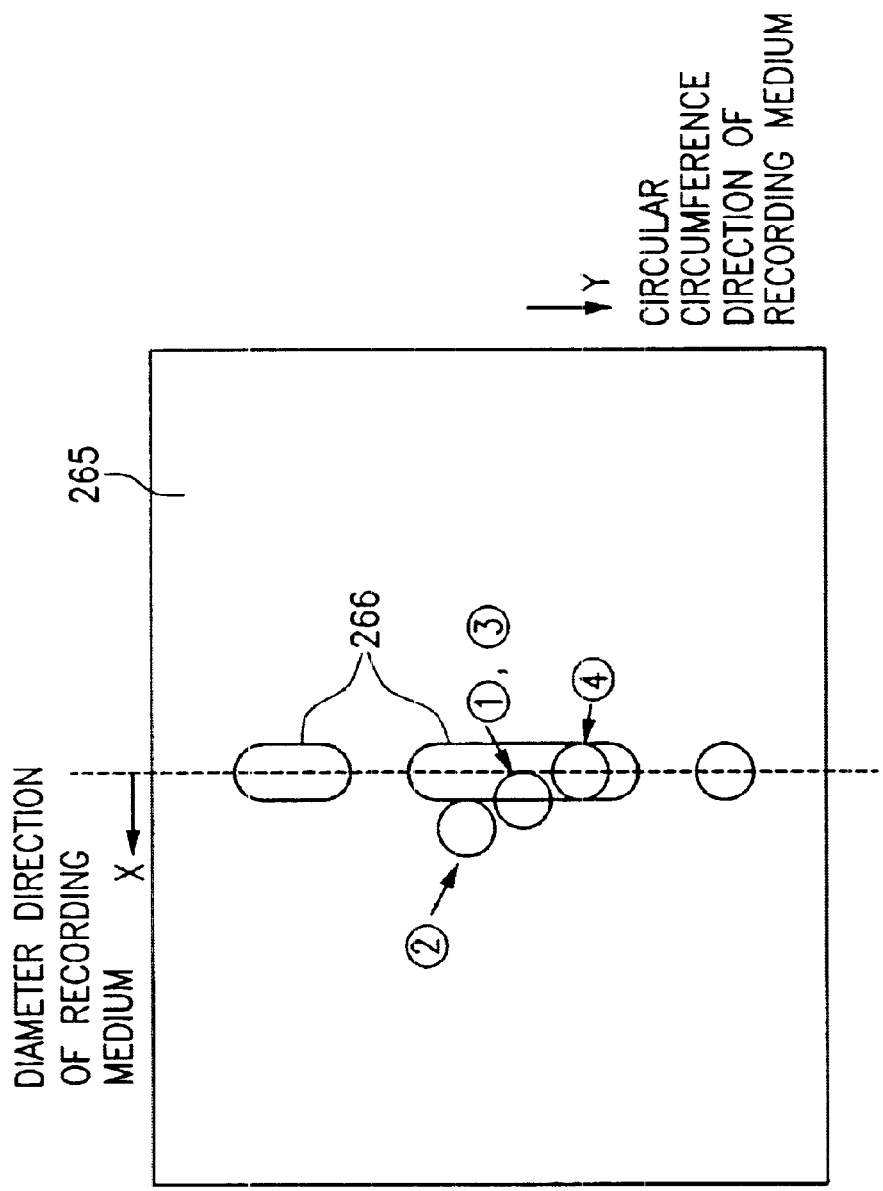
FIG. 28 is a plan view illustrating the movement (vibration) of the light.

Next, as shown in FIG. 28, the case in which the center of the light spot vibration is shifted from the center of the mark pit 266, namely the tracking is shifted therefrom, is considered as follows:

On the position at the time ① shown in FIG. 28, since the light spot comes on the border (boundary) where the reflection coefficient of the mark pit 266 changes, the light signal intensity of the reflected or transmitted light may become almost equal to half of the maximum value. On the position at the time ②, since the light spot is radiated on all of the positions of small reflection coefficient and small transmission coefficient, the light signal intensity may become minimum. On the position at the time ③, the light signal intensity may become almost equal to half of the maximum value as in the case of the position at the time ①. On the position at the time ④, since the light spot is radiated on the positions of large reflection coefficient and large transmission coefficient, the light signal intensity may become maximum.

Figure 29:
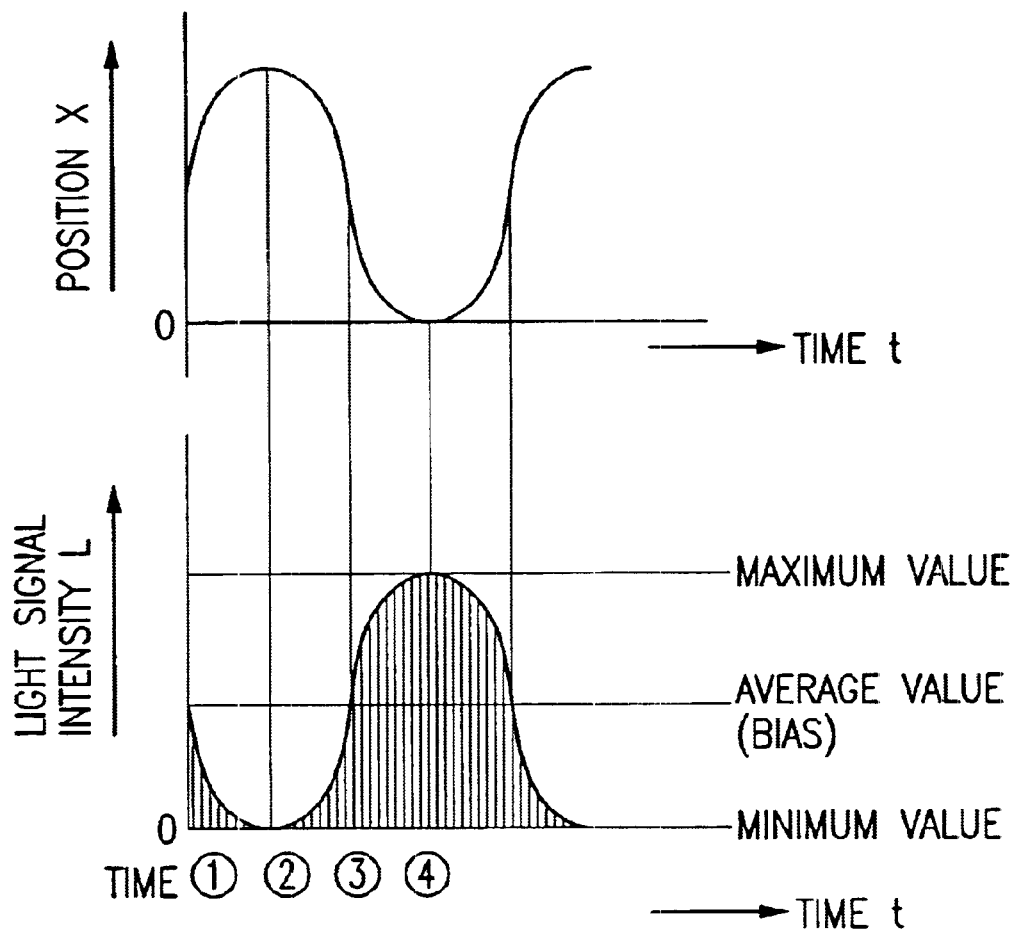
FIG. 29 is graph showing the variations of the signal intensity of the light and the position thereof in the radius direction of the optical information recording medium due to the movement (vibration) of the light.

From the foregoing descriptions, the light signal intensity and the variation of the position in the radius direction both for the time elapsing are as shown in the graphs of FIG. 29. On this occasion, since the time period when the light spot is radiated onto the area of the decreasing light signal intensity may become long, the overage value 7e (bias) of the light signal intensity may also become small.

Figure 30:
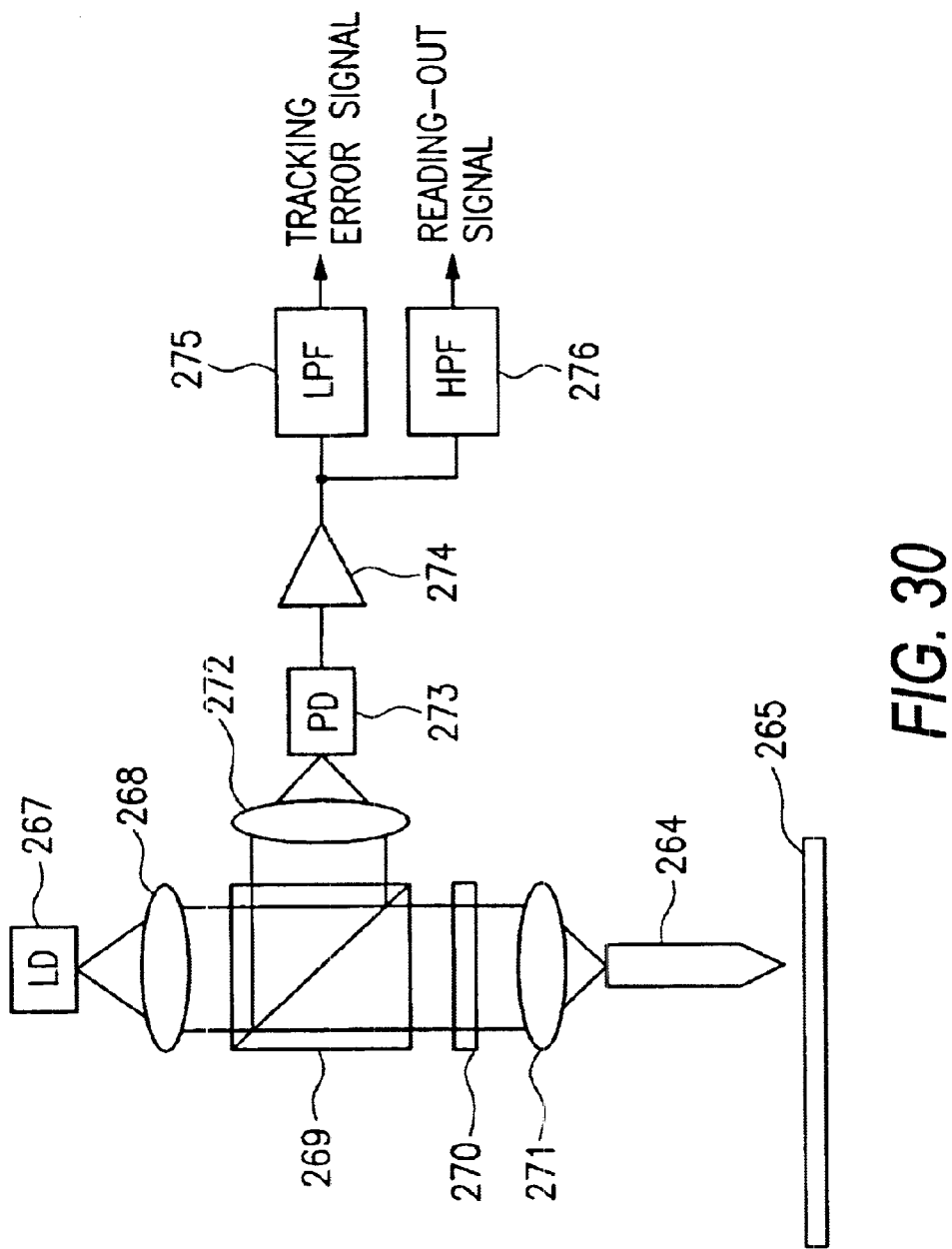
FIG. 30 is a block diagram for explaining the reflection-type optical system and the circuit for reading out the mark pit of the optical information recording medium with the head portion; FIG.
Figure 31:
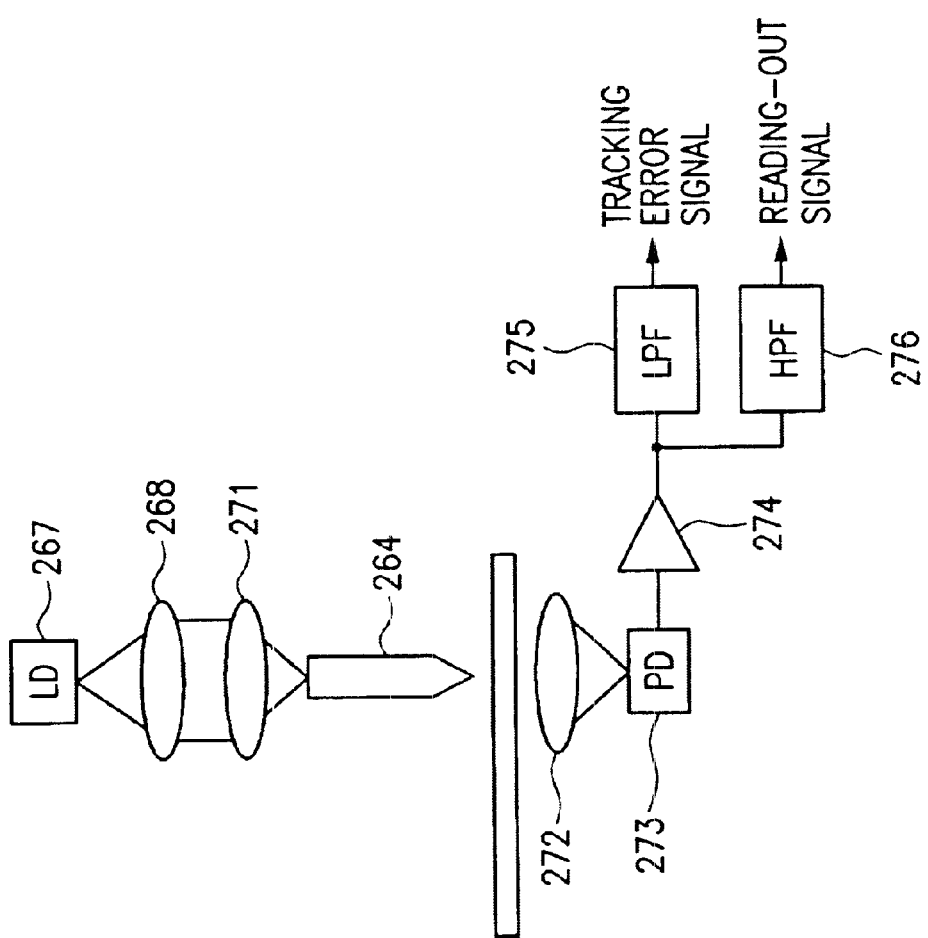
FIG. 31 is a block diagram for explaining the transmission-type optical system and the circuit for reading out the mark pit of the optical information recording medium with the head portion.

The frequency of the vibration of the probe 252 in the direction perpendicular to the direction of the data row arrangement on the optical information recording medium 265 is very small. Namely, that is smaller than the modulation frequency of the mark pit 266 at the time of reading-out. FIG. 30 shows the reflection type optical system for reading out the mark pit 266 and the circuit therefor. In FIG. 30, the light emitted from a laser diode 267 is directed onto the probe 252 as the incident light through a lens 268, a PBS 269, a quarter wavelength plate (hereinafter, called "λ/4 plate") 270, and a lens 271, and thereafter the light is emitted from the tip end of the probe 252 and radiated onto the optical information recording medium 265. The light reflected on the medium 265 is focused on a photodiode 273 through a probe 264, the lens 271, the λ/4 plate 270, the PBS 269, and a lens 272. The light thus focused thereon is optoelectrically converted by the photodiode 273 and output a signal. The converted signal is amplified by a preamplifier 274. The signal outputted from the pre-amplifier 274 is inputted to both of a low-pass filter 275 and a high-pass filter 276. The low-pass filter 275 serving as the signal taking-out apparatus removes the component of the high-frequency band. The average value (bias value) of the signal removed the high-frequency component therefrom is outputted as the tracking error signal. Furthermore, the high-pass filter 276 removes the low-frequency band component and the filter 276 takes out the reading-out signal of the mark pit 266. Moreover, as shown in FIG. 31, it may be allowable to use a transmission type optical system and circuit for reading out the mark pit 266. In FIG. 31, the members of the same reference numeral as that of FIG. 30 are common members in FIGS. 30 and 31.

Figure 32:
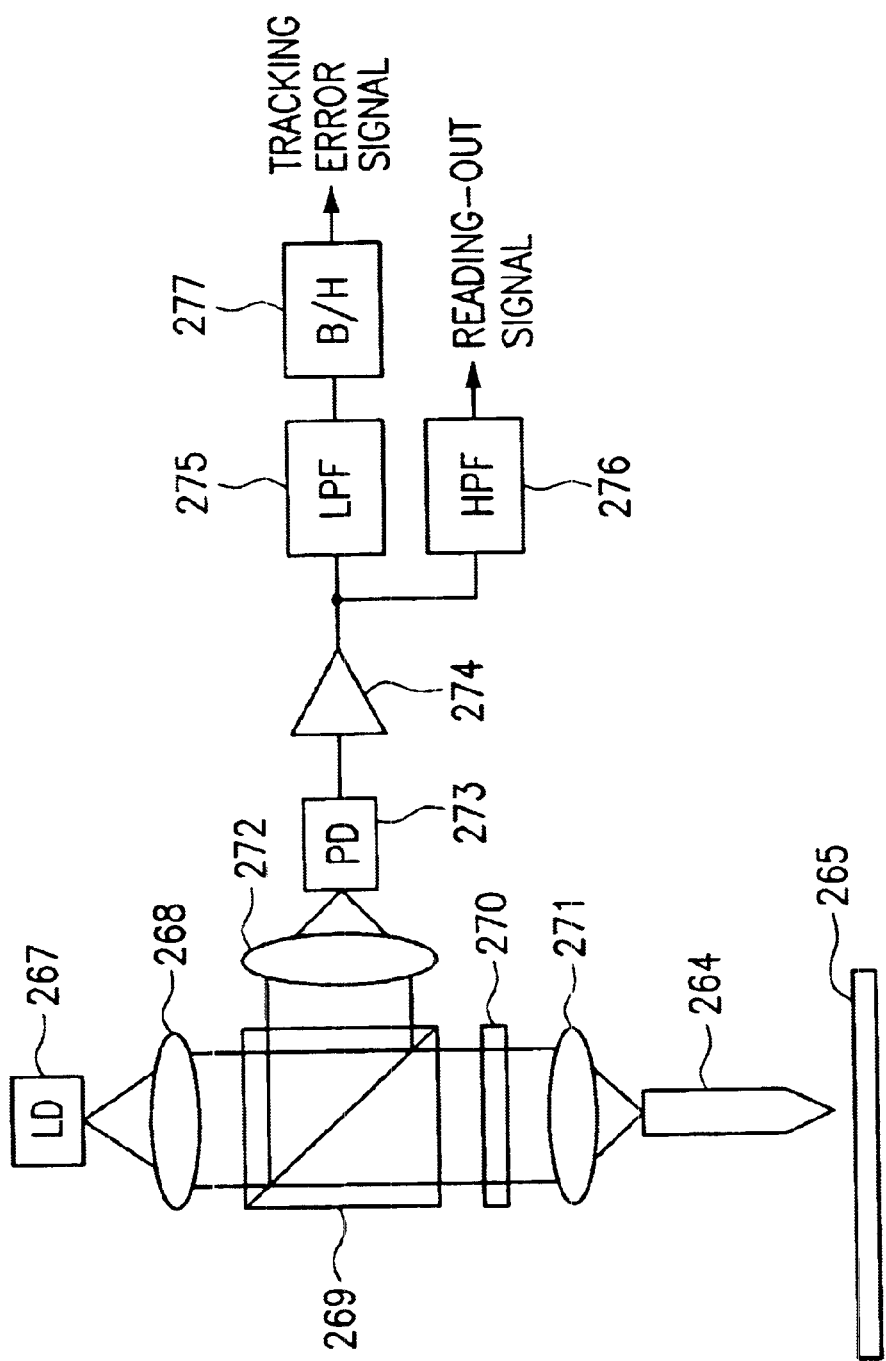
FIG. 32 is a block diagram for explaining the other example of the reflection-type optical system and the circuit.

For the reason of the above-mentioned, the light signal intensity becomes smaller in FIGS. 28 and 29 than in FIGS. 26 and 27. In the structures as shown in FIGS. 28 and 29, a bottom holding circuit 277 employed as a circuit for detecting the minimum value of the light signal intensity is added in FIG. 32 to the circuit-shown in FIG. 30. In such structure, the tracking error signal can be obtained. Even on this occasion, it may be allowable to use the transmission type ones as shown in FIG. 31.

Figure 33:
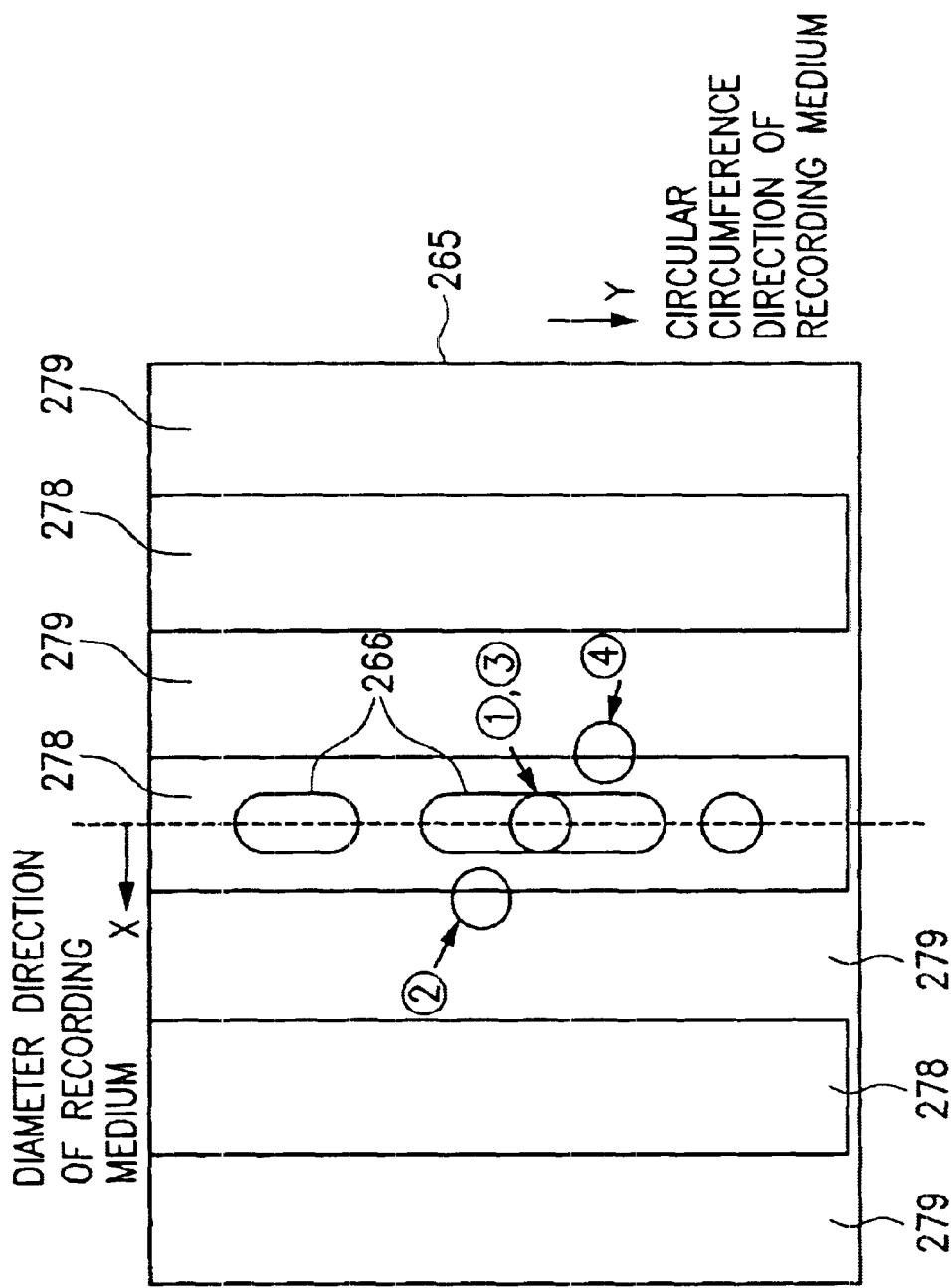
FIG. 33 is a plan view illustrating the movement (vibration) of the light.

Heretofore, a medium (member) for obtaining the tracking error signal by the difference between the reflection coefficient and the transmission coefficient of the mark pit itself 266. However, it is not always limited to the above-mentioned medium. For instance, as shown in FIG. 33, plural lines of land 278 and groove 279 are formed on the optical information recording medium 265. In such structure, the tracking error signal can be obtained by the same method as mentioned before referring to FIGS. 30 through, 32 from the difference between the reflection coefficients or the transmission coefficients of the land 278 and the groove 279. Utilizing the above tracking error signal, an actuator not shown for performing the tracking operation of the probe 264 and another actuator not shown for adjusting the distance between the probe 264 and the optical information recording medium 265 can be controlled.

Next, a medium (member) for periodically moving (vibrating) the light to be emitted from the probe 264 and radiated onto the optical information recording medium 265 in the radius direction of the medium 265.

Figure 34:
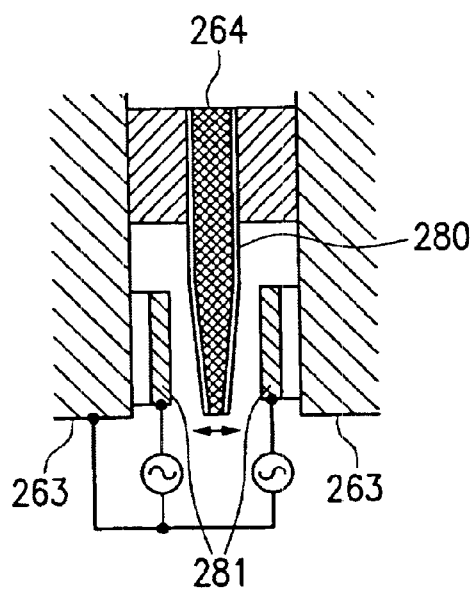
FIG. 34 is a structural cross-sectional view illustrating an example of the member periodically moving (vibrating) the light emitted from the probe and radiated onto the optical information recording medium.

At first, as shown in FIG. 34, the probe 264 is formed in the cantilever structure. Namely, the base portion of the probe 264 is fixed and the tail (tip) end portion thereof is free. The circumference of the probe 264 is coated with a metal film 280 so as to cause the light to emit only from the small opening at the tail end portion of the probe 264. The diameter of the opening is made, for instance, equal to or smaller than the wavelength of the light propagating through the optical fiber. A so-called adjacent field light (evanescent light) is emitted from the above-mentioned opening. However, it may be allowable that the (diameter of the) opening is larger than the wavelength of the light and the evanescent light is not emitted therefrom. Utilizing such light, the light is written in or read out on the optical information recording medium 265. The metal film 280 is grounded (connected to the earth). Two fixed electrodes 281, 281 which serve as the moving apparatus so as to put the probe 264 therebetween. Different voltages are respectively applied across the fixed electrodes 281, 281 and the metal film 280. Thereby, the electrostatic attractive force is exerted between the fixed electrodes 281, 281 and the probe 264. As the result, the tip end portion of the probe 264 vibrates and the light emitted from the probe 264 also vibrates at the same time.

Figure 35:
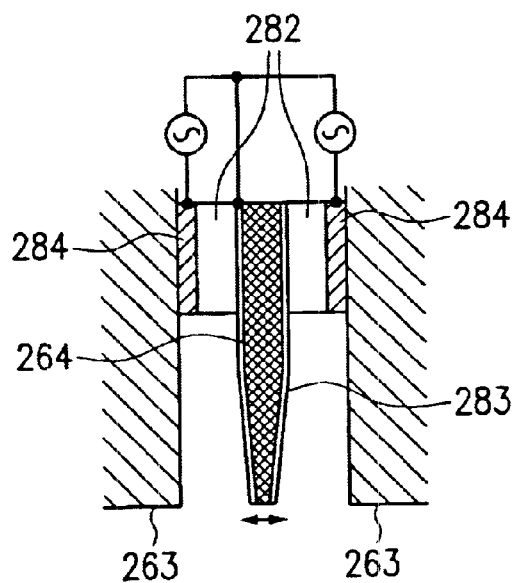
FIG. 35 is a structural cross-sectional view illustrating another example of the member periodically moving (vibrating) the light emitted from the probe and radiated onto the optical information recording medium.

As another moving medium, as shown in FIG. 35, two piezoelectric elements 282, 282 are disposed on the base portion of the probe 264 so as to put it therebetween in the direction perpendicular to the direction of the data row arrangement on the optical information recording medium 265. By use of same metal film 283 same as the metal film 280 shown in FIG. 34 and fixed electrodes 284, 284, different AC voltages are respectively applied across the metal film 283 and the two piezoelectric elements 282, 282 serving as the moving apparatus. The probe 264 can be vibrated by the action of the piezoelectric effect.

Figure 36:
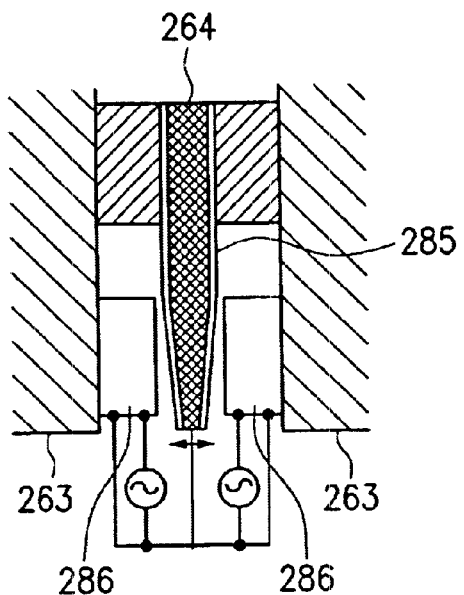
FIG. 36 is a structural cross-sectional view illustrating still another example of the member periodically moving (vibrating) the light emitted from the probe and radiated onto the optical information recording medium.

As still another moving medium, as shown in FIG. 36, a magnetic film 285 is formed on the surface of the probe 264 instead of the metal films 280 and 283, and two coils 286, 286 also serving as the moving apparatus are disposed so as to put the tail end portion of the probe 264 in the diameter direction of the optical information recording medium 265. By respectively applying different AC voltages to the coils 286, 286, the probe 264 can be vibrated by the action of the magnetic force.

Figure 37:
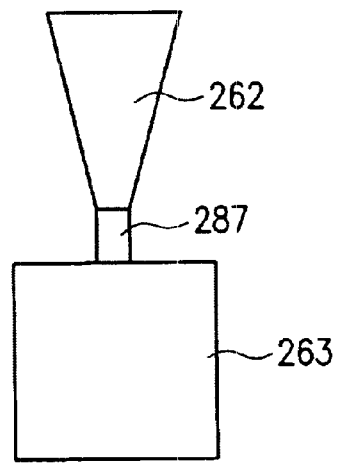
FIG. 37 is a view showing the arrangement of the actuator for vibrating the entire part of the slider of the head portion; FIG.

The aforementioned respective media (members) vibrate only the probe 264. However, as shown in FIG. 37, a predetermined actuator 287 serving as the moving apparatus is installed between a suspension 262 and a slider 263. The entire portion of the slider 263 can be also moved in the same way.

Figure 38:
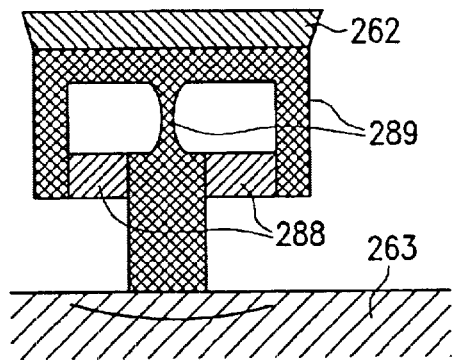
FIG. 38 is a cross-sectional view illustrating a structure example of the actuator.
Figure 39:
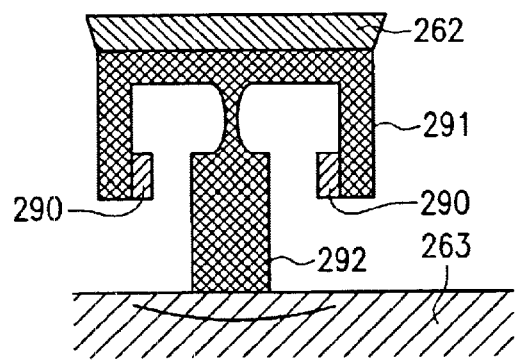
FIG. 39 is a cross-sectional view illustrating another structure example of the actuator.
Figure 40:
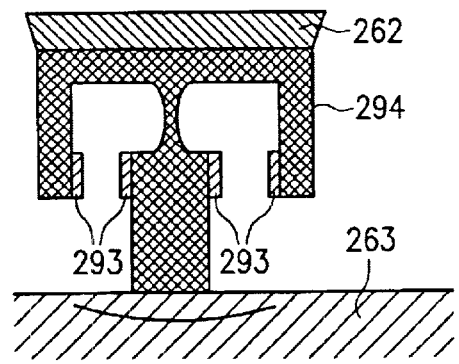
FIG. 40 is a cross-sectional view illustrating still another structure example of the actuator.

The concrete examples of the actuator, 287 are shown in FIGS. 38, through 40. Namely, the actuator 287 shown in FIG. 38 is composed of piezoelectric elements 288 and an enlargement mechanism 289 for enlarging the movement of the piezoelectric element 288, and the actuator also utilizes the piezoelectric effect. The actuator 287 shown in. FIG. 39 is composed of coils 290 a magnetic core 291, and a moving magnet 292, and the actuator utilizes the magnetic force. The actuator 287 shown in FIG. 40 is composed of electrodes 293 and an enlargement mechanism 294, and the actuator utilizes the electrostatic attractive force.

According to the optical information recording and reproducing apparatus as mentioned heretofore, it is not necessary to provide a specially-used medium for obtaining the tracking error signal in addition to the moving medium (member)

for periodically moving (vibrating) the light emitted from the probe 264 and radiated onto the optical information recording medium 265 in the direction perpendicular to the direction of the data row arrangement on the optical information recording medium 265. Furthermore, it is not necessary to provide the land and the mark for inevitably lowering the recording density on the optical information recording medium 265. Any special devising is not needed for the probe itself 264. Consequently, the tracking error signal can be obtained with simple medium or structure.

Furthermore, the tip end portion of the probe 264 can be vibrated when it is parted from the surface of, the optical information recording medium 265. However, on the contrary, when the tip end portion thereof is brought into contact with the surface of the medium 265, it cannot be vibrated because of the restriction (restraint) due to the optical information recording medium 265. As mentioned before referring to FIGS. 26 through 29, since the time-elapsing variation of the optical signal intensity is caused by the vibration of the probe 264, when the tip end of the probe 264 is brought into contact with the optical information recording medium 265 and thereby the tip end thereof is restricted so as not to vibrate, the time-elapsing variation of the optical signal intensity (AC vibration) disappears. In such structure, the contact or non-contact of the tip end of the probe 264 with the optical information recording medium 265, that is, the signal in relation to the distance between the tip end of the probe 264 and the optical information recording medium 265 can be detected utilizing the above-mentioned phenomenon.

To state concretely, the time constant of the low-pass filter 275 shown in FIG. 30 is set so as to enable to grasp only the variation of the light signal caused by the vibration of the probe 264, and thereby the amplitude of the output is measured. When the amplitude becomes small or equal to zero, the contact of the tip end of the probe 264 with the optical information recording medium 265 can be known (detected). Utilizing the above-mentioned signal, an actuator not shown for adjusting the tracking of the probe 264 and another actuator not shown for adjusting the distance between the tip end of the probe 264 and the optical information recording medium 265 can be controlled.

In such way, according to this optical information recording and reproducing apparatus, only by using the movement (vibration) medium for periodically moving the light emitted from the probe 264 and radiated onto the optical information recording medium 265 in the direction perpendicular to the direction of the data row arrangement on the recording medium 265, it may become unnecessary to devise the complicated circuit and the probe 264 for measuring the distance between the tip end of the probe 264 and the optical information recording medium 265 without additionally to the construction and the material of the recording medium 265. Furthermore, it is not necessary to provide the light source of the special waveform, the specialized pattern formed on the recording medium 265, and the time-consuming signal processing, etc. Consequently, in such way, the distance between the tip end of the probe 264 and the surface of the optical information recording medium 265 can be known (detected) with the simple structure.

EIGHTH EMBODIMENT

Figure 41:
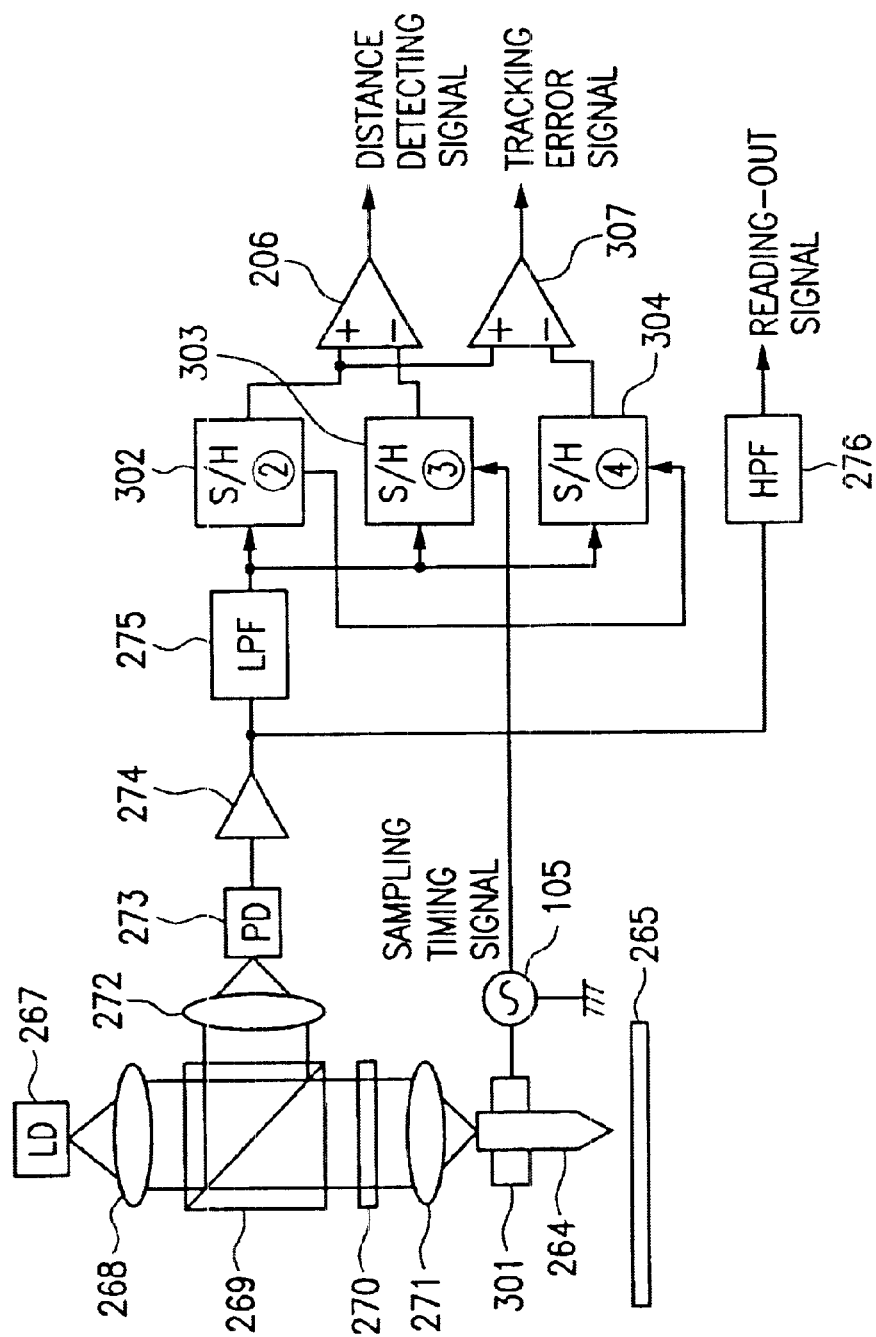
FIG. 41 is a block diagram of the optical system and the circuit for reading out the mark pit of the optical information recording and reproducing apparatus of the eighth embodiment according to the present invention.

FIG. 41 is a block diagram of the optical system and the circuit for reading out the mark pit of the optical information recording and reproducing apparatus of the eighth embodiment of the present invention. In FIG. 41, the member of the reference numeral same as that of FIG. 30 is the common member in FIG. 30 and FIG. 41 (first and eighth embodiments), and the detailed explanation thereof is omitted here.

As shown in FIG. 41, a vibrator 301 serving as the moving apparatus vibrates the probe 264. Either one of the vibrators as mentioned before referring to FIGS. 34 through 36 can be used. The output of a low-pass bitter is inputted to three sample hold circuits 302, 303, and 304. The sampling timing signal for determining the timing of sampling the instantaneous value of the output emitted by the low-pass filter 275 is inputted to the above sample hold circuits 302, 303, and 304 from the AC power source for. driving the vibrator 301. A differential amplifier 306 serving as the signal taking-out apparatus outputs the difference signal of the sample hold circuits 302 and 303 as the distance detecting signal, which another differential amplifier 307 also serving as the signal taking-out apparatus outputs the difference signal of the sample hold circuits 302 and 304 as the tracking error signal. The sample hold circuits 302, 303, and 304 respectively perform the operations of sample-holding the light signal intensities at the respective times ②, ③, and ④ shown in FIG. 27 and FIG. 29.

When the tracking is matched (fitted), the output signals of the light signal intensity at the times ② and ④ are equal to each other. Consequently, the output signal of the tracking error becomes 0 (zero). When the tracking is shifted as mentioned before referring to FIGS. 28 and 29, since the light signal intensity at the time ② is smaller than that at the time ④, the tracking error signal becomes negative. On the contrary, when the tracking is inversely shifted as mentioned before referring to FIGS. 28 and 29, since the light signal intensity at the time ② is larger than that at the time ④, the tracking error signal becomes positive. From the foregoing description, both of the shifting of the track and either one of the track shifting sides can be known or detected.

On the other hand, since the distance detecting signal representing the difference between the light signal intensities at the times ② and ③ shows the vibration amplitude of the probe 264, the signal relates to the distance between the tip end of the probe 264 and the optical information recording medium 265 as mentioned before.

From the signal as mentioned above, an actuator not shown for adjusting the tracking of the probe 264 and another actuator not shown for adjusting the distance between the tip end of the probe 264 and the surface of the optical information recording medium 265 can be controlled. Moreover, although the case of measuring the tracking error signal and the distance detecting signal at the same time, it may be allowable to detect (measure) only either one of the tracking error signal and the distance detecting signal.

In such way, according to this optical information recording and reproducing apparatus, only by using a vibrator 301 for periodically moving the light emitted from the probe 264 and radiated onto the optical information recording medium 265 in the direction perpendicular to the direction of the data row arrangement on the recording medium 265, it may become unnecessary to devise the complicated circuit and the probe 264 for measuring the distance between the tip end of the probe 264 and the optical information recording medium 265 without adding any limitation additionally to the construction and the material of the recording medium 265. Furthermore, it is not necessary to provide the light source of the special waveform, the specialized pattern formed on the recording medium 265, and the time-consuming signal processing, etc. Consequently, in such way, the tracking error signal can be obtained and the distance between the tip end of the probe 264 and the surface of the optical information recording medium 265 can be known (detected) with the simple structure.

NINTH EMBODIMENT

Figure 42:
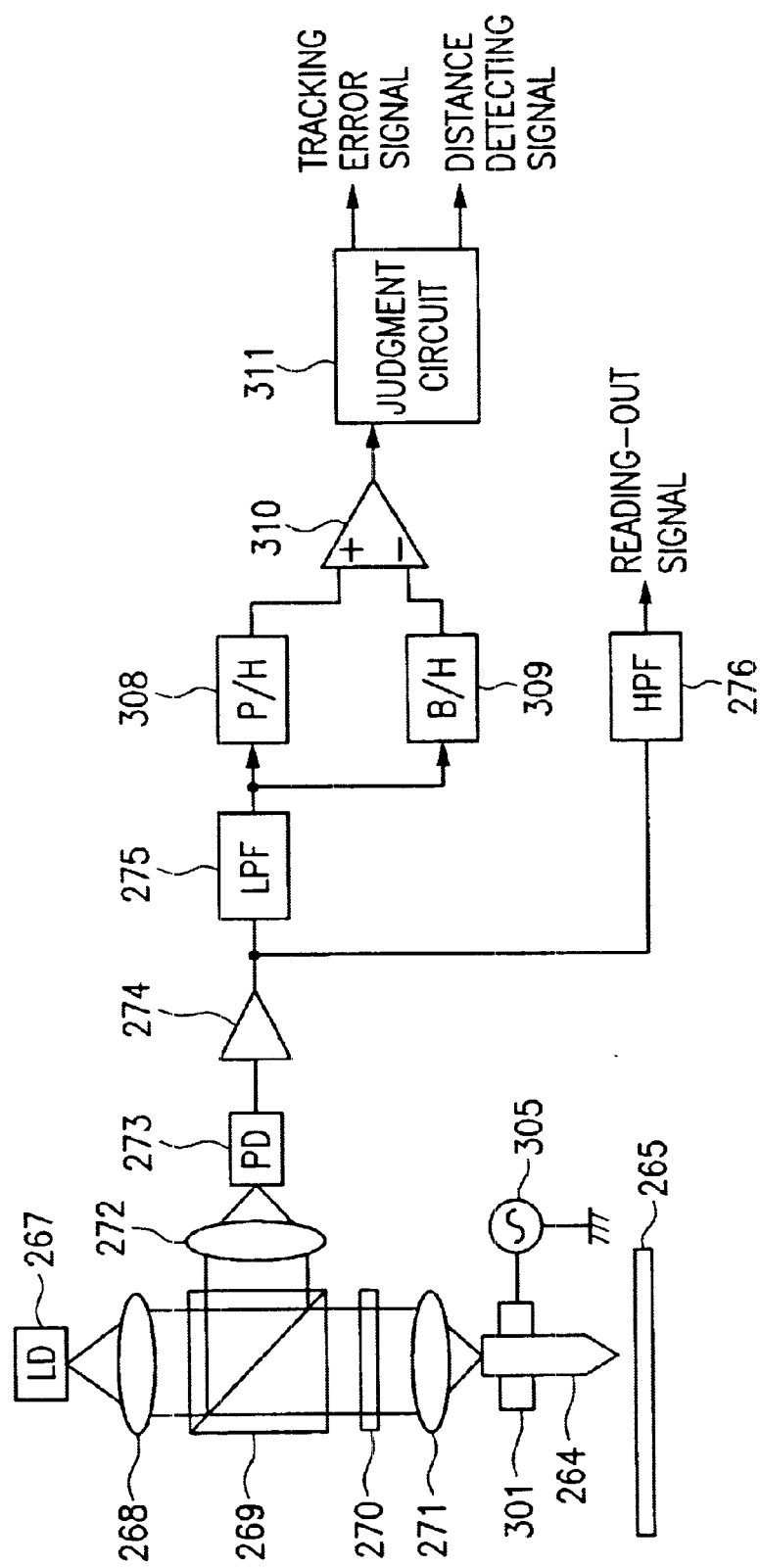
FIG. 42 is a block diagram of the optical system and the circuit for reading out the mark pit of the optical information recording and reproducing apparatus of the ninth embodiment according to the present invention.

FIG. 42 is a block diagram of the optical system and the circuit for reading out the mark pit of the optical information recording and reproducing apparatus of the ninth embodiment of the present invention. In. FIG. 42, the member of the reference numeral same as that of FIG. 41 is the common member in FIG. 40 and FIG. 41 (eighth and ninth embodiments), and the detailed explanation thereof is omitted here.

As shown in FIG. 42, the output signal of a low-pass filter 275 is inputted to a peak holding circuit 308 and a bottom holding circuit 309 at the same time, and then the maximum value and the minimum value of the output signal emitted from the low-pass filter 275 can be detected. A differential amplifier 310 takes the difference between the maximum value outputted from the peak holding circuit 308 and the minimum value outputted from the bottom holding circuit 309, and the difference signal thus taken is outputted to a judgment (discrimination) circuit 311 serving as the signal taking-out apparatus.

As described before referring to FIGS. 26 through 29, when the tracking is shifted, the difference between the maximum value and the minimum value of the light signal intensity, that is, the difference signal outputted from the differential amplifier 310 may become large. Furthermore, when the distance between the tip end of the probe 264 and the optical information recording medium 365 becomes small and the amplitude of the probe 264 also becomes small, the difference between the maximum value and the minimum value, that is, the difference signal outputted from the differential amplifier 310 may also become small.

As is apparent from the above-mentioned property, a judgment circuit 311 outputs the tracking error signal and the distance detection signal. Utilizing those signals, an actuator not shown for adjusting the tracking of the probe 264 and another actuator not shown for adjusting the distance between the tip end of the probe 264 and the surface of the optical information recording medium 265 can be controlled.

In such way, according to this optical information recording and reproducing apparatus, only by using a vibrator 301 for periodically moving the light emitted from the probe 264 and radiated onto the optical information recording medium 265 in the direction perpendicular to the direction of the data row arrangement on the recording medium 265, it may become unnecessary to devise the complicated circuit and the probe 264 for measuring the distance between the tip end of the probe 264 and the optical information recording medium 265 without adding any limitation additionally to the construction and the material of the recording medium 265. Furthermore, it is not necessary to provide the light source of the special waveform, the specialized pattern formed on the recording medium 265, and the time-consuming signal processing, etc. Consequently, in such way, the tracking error signal can be obtained and the distance between the tip end of the probe 264 and the surface of the optical information recording medium 265 can be known (detected) with the simple structure.

TENTH EMBODIMENT

Figure 43:
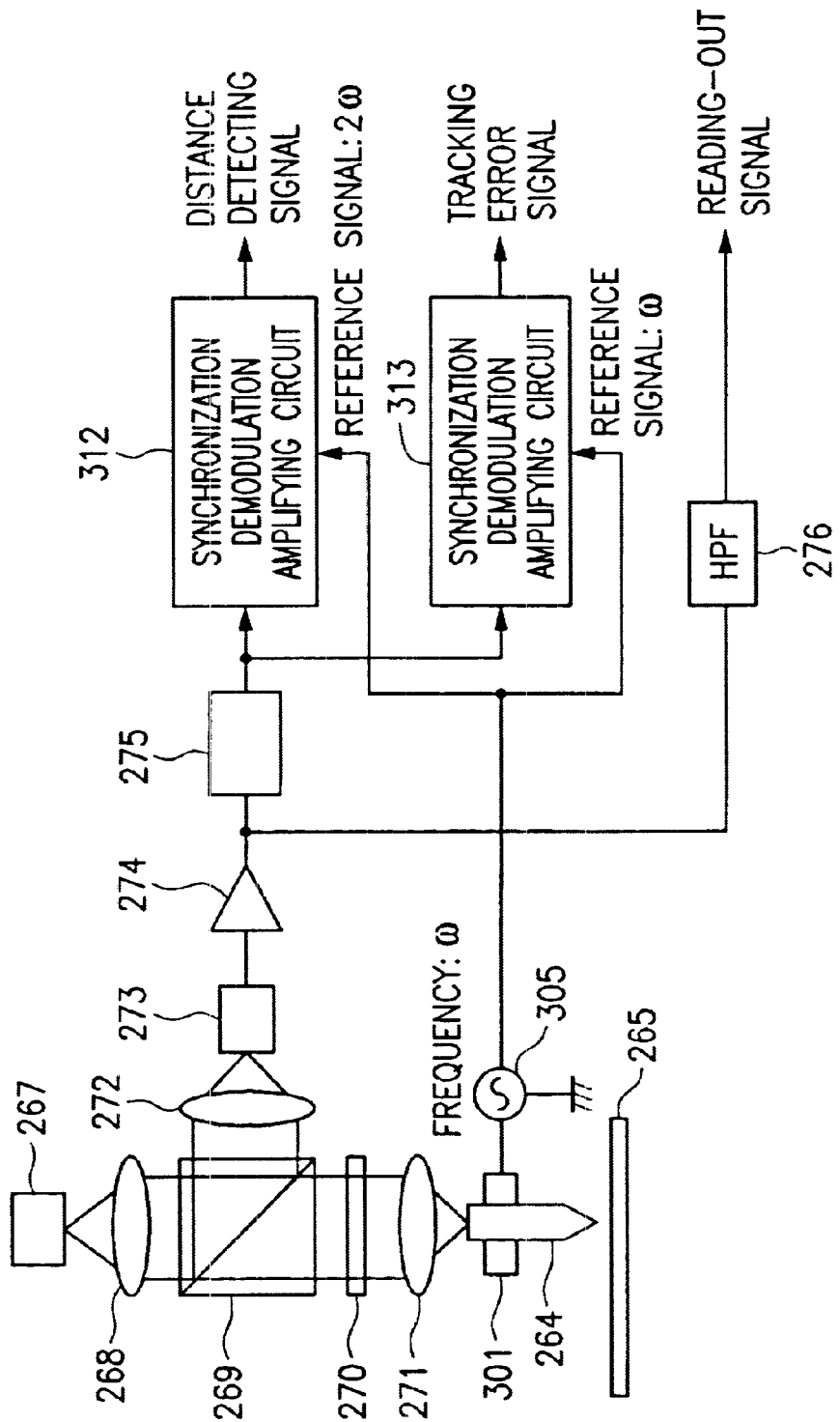
FIG. 43 is a block diagram of the optical system and the circuit for reading out the mark pit of the optical information recording and reproducing apparatus of the tenth embodiment according to the present invention.

FIG. 43 is a block diagram of the optical system and the circuit for reading out the mark pit of the optical information recording and reproducing apparatus of the ninth embodiment of the present invention. In FIG. 43, the member of the reference numeral same as that of FIG. 42 is the common member in FIG. 41 and FIG. 42 (ninth and tenth embodiments), and the detailed explanation thereof is omitted here.

As shown in FIG. 43, the output signal of a low-pass filter 275 is inputted to synchronization detecting amplifier circuits, 312 and 313 serving as the signal taking-out apparatus. The synchronization detecting amplifier circuits 312 and 313 detect only the signal of the frequency same as that of the reference signal in synchronism with the phase of the reference-signal, and the circuits 312 and 313 output the effective value of the detected-signal as the DC voltage. The AC signal of the frequency at the time when the light emitted from the probe 264 vibrates by the action of the actuator 316, that is, the frequency w of the AC power source 305 is inputted to the synchronization detecting amplifier circuit 313. The frequency 2w is created from the frequency-w by use of the circuit not shown, and the frequency 2w thus created is inputted as the reference signal. In the structure as mentioned heretofore, as is apparent from FIG. 27, when the tracking is matched, there exists no component of the frequency w in the light signal intensity. Consequently, the output of the synchronization detecting amplifier circuit 313 is 0 (zero) at this time. When the tracking is shifted in the direction as shown in FIG. 28, the component of the frequency w appears as shown in FIG. 29. Consequently, the voltage output appears in the synchronization detecting amplifier circuit 313.

Assuming that the voltage output at this time is positive, when the tracking is shifted in the direction inverse to the direction shown in FIG. 28, the negative voltage output appears in the synchronization detecting amplifier circuit 313. Since the track shifting and the side of the track shifting can be known (detected), the output signal of the synchronization detecting amplifier circuit 313 turns out to be the tracking error signal. An actuator not shown for adjusting the tracking of the probe 264 can be controlled by use of the signal.

When the distance between the tip end of the probe 264 and the optical information recording medium 265 becomes small or large, the amplitude of the optical signal intensity may also become small or large as shown in FIG. 27. The frequency of the light t signal intensity shown in FIG. 27 is two times of the vibration frequency of the probe 264, that is, 2w. Consequently, the information of the distance between the tip end of the probe 264 and the optical information recording medium 265 can be obtained from the output of the synchronization detecting amplifier circuit 312 in such way as mentioned heretofore. However, since the synchronization detecting amplifier circuit 313 is not sensitive (not responding) to the input of the w-frequency component, the circuit 313 is also not sensitive to the amplitude variation of the 2w-component corresponding to the distance variation. Consequently, the synchronization detecting amplifier circuit 313 can obtain the tracking error signal independently from (regardless of) the variation of the distance between the tip end of the probe 264 and the surface of the optical information recording medium 265. Similarly, since the synchronization detecting amplifier circuit 312 is not sensitive to the input of the w-frequency component, the circuit 312 is also not sensitive to the amplitude variation of the w-frequency component caused due to the shift of tracking. Consequently, the synchronization detecting amplifier circuit 312 can obtain the distance detecting signal showing the distance between the tip end of the probe 264 and the optical information recording medium 265 independently from (regardless of) the shift of tracking.

In such way, according to this optical information recording and reproducing apparatus, only by using a vibrator 301 for periodically moving the light emitted from the probe 264 and radiated onto the optical information recording medium 265 in the direction perpendicular to the direction of the data row arrangement on the recording medium 265, it may become unnecessary to devise the complicated circuit and the probe 264 for measuring the distance between the tip end of the probe 264 and the optical information recording medium 265 without adding any limitation additionally to the construction and the material of the recording medium 265. Furthermore, it is not necessary to provide the light source of the special waveform, the specialized pattern formed on the recording medium 265, and the time-consuming signal processing, etc. Consequently, in such way, the tracking error signal can be obtained and the distance between the tip end of the probe. 264 and the surface of the optical information recording medium 265 can be known (detected) with the simple structure.

MODIFICATION OF TENTH EMBODIMENT

As the modification of the tenth embodiment of the present invention, it may be allowable to make the frequency w for vibrating the probe 264, that is, the light radiated therefrom equal to the resonance frequency $w_o$ of the cantilever as exemplary shown in FIGS. 34 through 36.

Namely, when the tip end of the probe 264 approaches the surface of the optical information recording medium 265 and the capillary force such as inter-atomic force or electrostatic force is exerted therebetween, the resonance frequency of the cantilever is shifted. However, since the vibrator 301 is forcibly vibrated with the initial resonance frequency, the amplitude thereof may be reduced. By utilizing such medium (number), the sensitivity to the capillary force can be made considerably high, compared with the case of not using the resonance frequency. As the result, it is possible to measure the distance between the tip end of the probe 264 and the surface of the optical information recording medium 265 with high sensitivity.

ELEVENTH EMBODIMENT

The vibration medium for vibrating the probe 264 in the radius direction of the optical information recording medium referring to FIGS. 34 through 36 and FIGS. 38 through 40 is vibrated in the direction same as that of the spot light emitted from the probe 264 for the purpose of tracking. Consequently, vibrating the probe 264 and tracking can be done with only one actuator.

Figure 44:
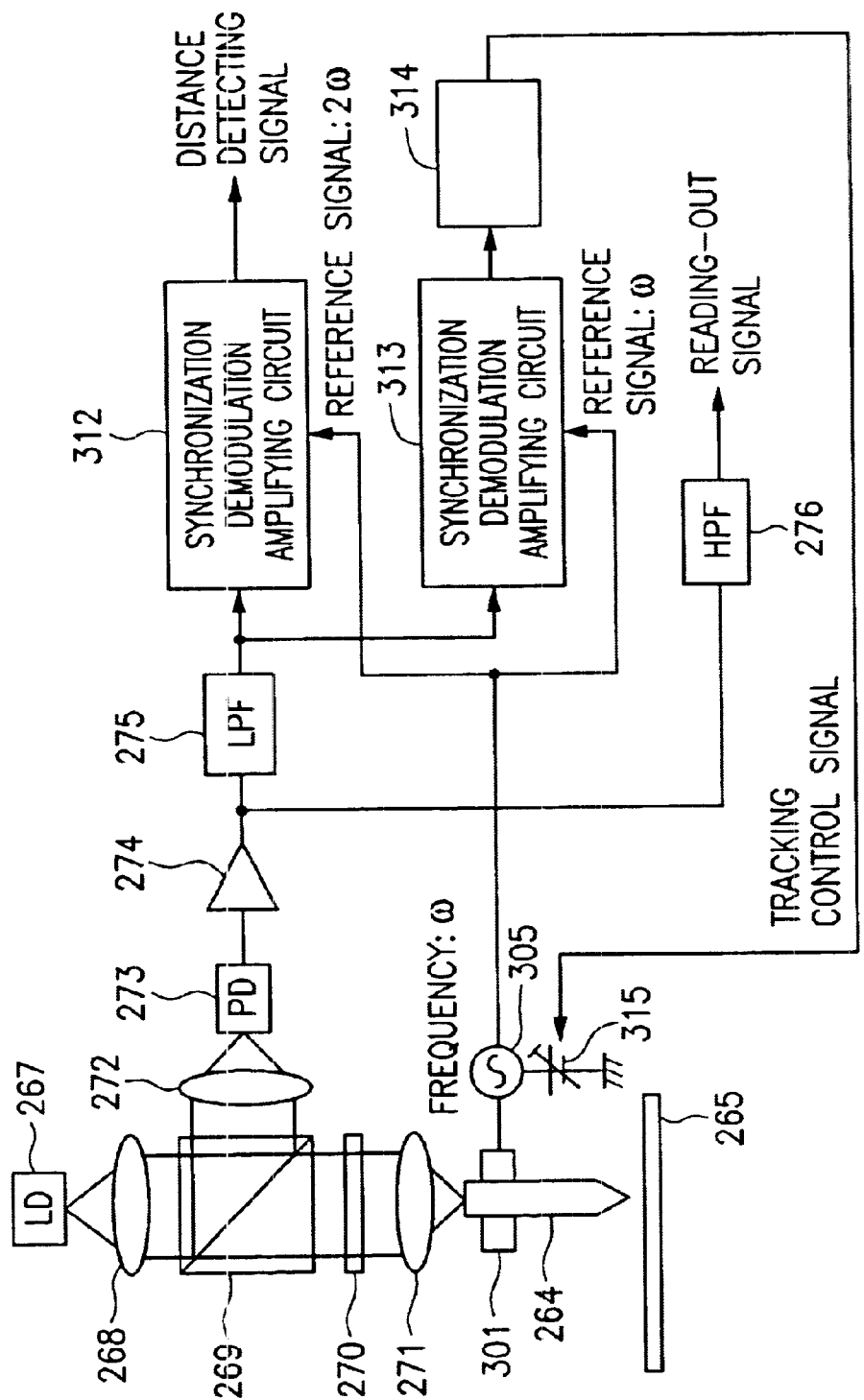
FIG. 44 is a block diagram of the optical system and the circuit for reading out the mark pit of the optical information recording and reproducing apparatus of the eleventh embodiment according to the present invention.

FIG. 44 is a block diagram of the optical system and the circuit for reading out the mark pit of the optical information recording and reproducing apparatus of the eleventh embodiment of the present invention in FIG. 44, the member of the reference numeral same as that of FIG. 41. is the common member in FIG. 41 and FIG. 44 (eighth and eleventh embodiments), and the detailed explanation thereof is omitted here.

In FIG. 44, a feedback circuit 314 outputs the tracking control signal on the basis of the tracking error signal and controls the output voltage of a variable DC power source 315 connected in series to the AC power source, that is, the voltage for adjusting the tracking.

As the result, the superposed voltage created by superposing the output voltage of the AC power source 305 for vibrating the probe 264 on the output voltage of the variable DC power source 315 for tracking the probe 264 is applied to an actuator 316. In such structure, since the apparatus for vibrating the probe 264 is constructed with the actuator 316 same as the tracking apparatus, those apparatuses can be made with simple structure and the recording/reproducing head can be small-sized. Thereby, the operations of writing-in and reading-out can be done with high speed.

TWELFTH EMBODIMENT

Figure 45:
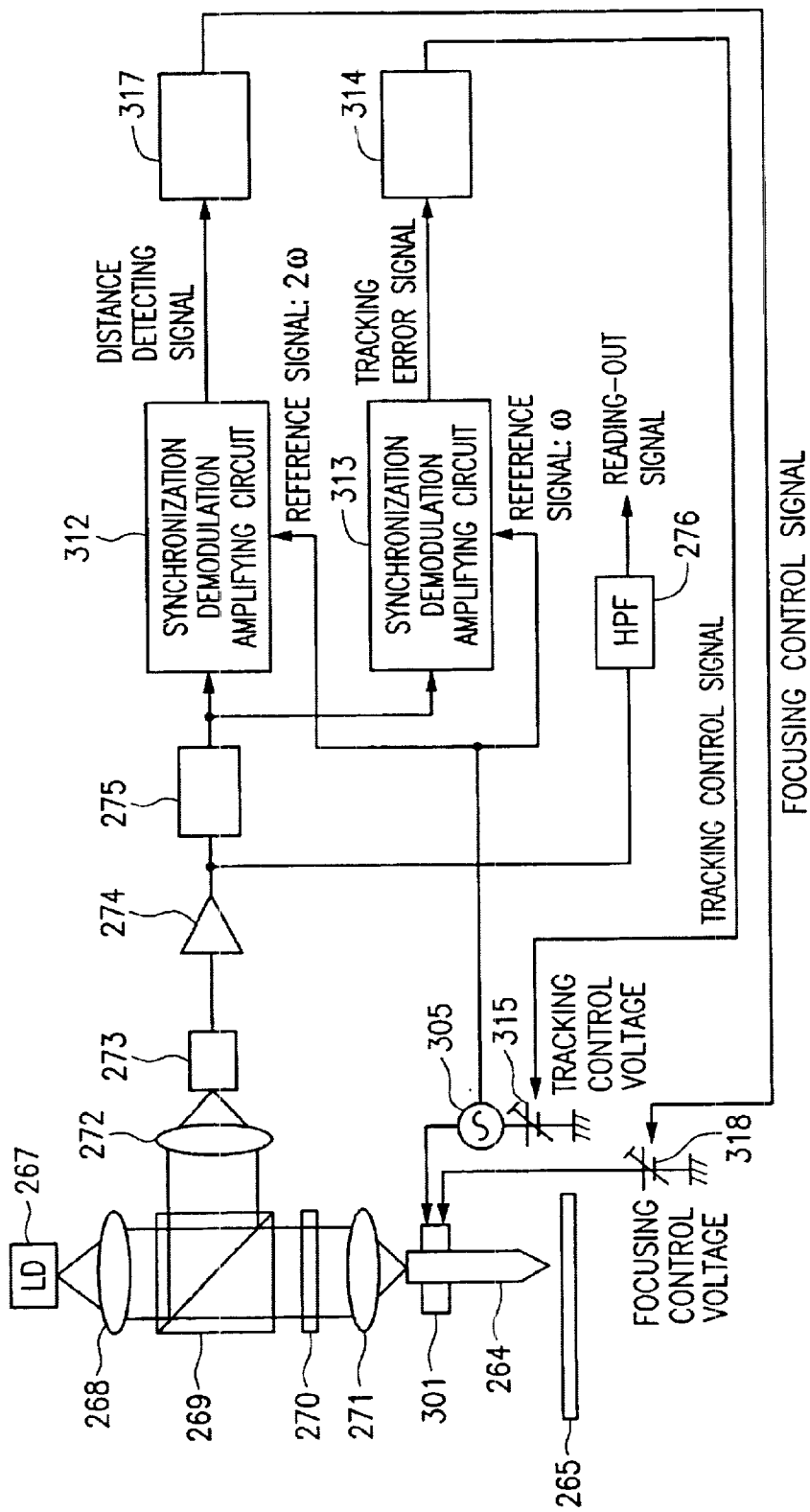
FIG. 45 is a block diagram of the optical system and the circuit for reading out the mark pit of the optical information recording and reproducing apparatus of the twelfth embodiment according to the present invention.

FIG. 45 is a block diagram of the optical system and the circuit for reading out the mark pit of the optical information recording and reproducing apparatus of the twelfth embodiment of the present invention. In FIG. 45, the member of the reference numeral same as that of FIG. 44 is the common member in FIG. 44 and FIG. 45 (eleventh and twelfth embodiments), and the detailed explanation thereof is omitted here.

In the twelfth embodiment of the present invention, in addition to vibrating the probe 264 and tracking it, the control of the distance between the tip end of the probe 264 and the optical information recording medium 266 (here, called "focusing") can be performed by one actuator serving as the moving apparatus.

Namely, in FIG. 45, a feedback circuit 317 outputs the focusing control signal on the basis of the distance detecting signal and controls the output voltage of a variable DC power source 318, that is, the voltage for adjusting the focusing, and then, the circuit can drive the actuator 316 and perform the focusing by inputting the voltage thus controlled to the actuator 316.

In such situation, since the apparatus for vibrating the probe 264, the tracking apparatus, and the focusing apparatus are respectively constructed with the same actuator 316, those apparatuses can be made with simple structure, and since the recording/reproducing head is small-sized, the operations of writing-in and reading-out can be done with high speed.

Figure 46:
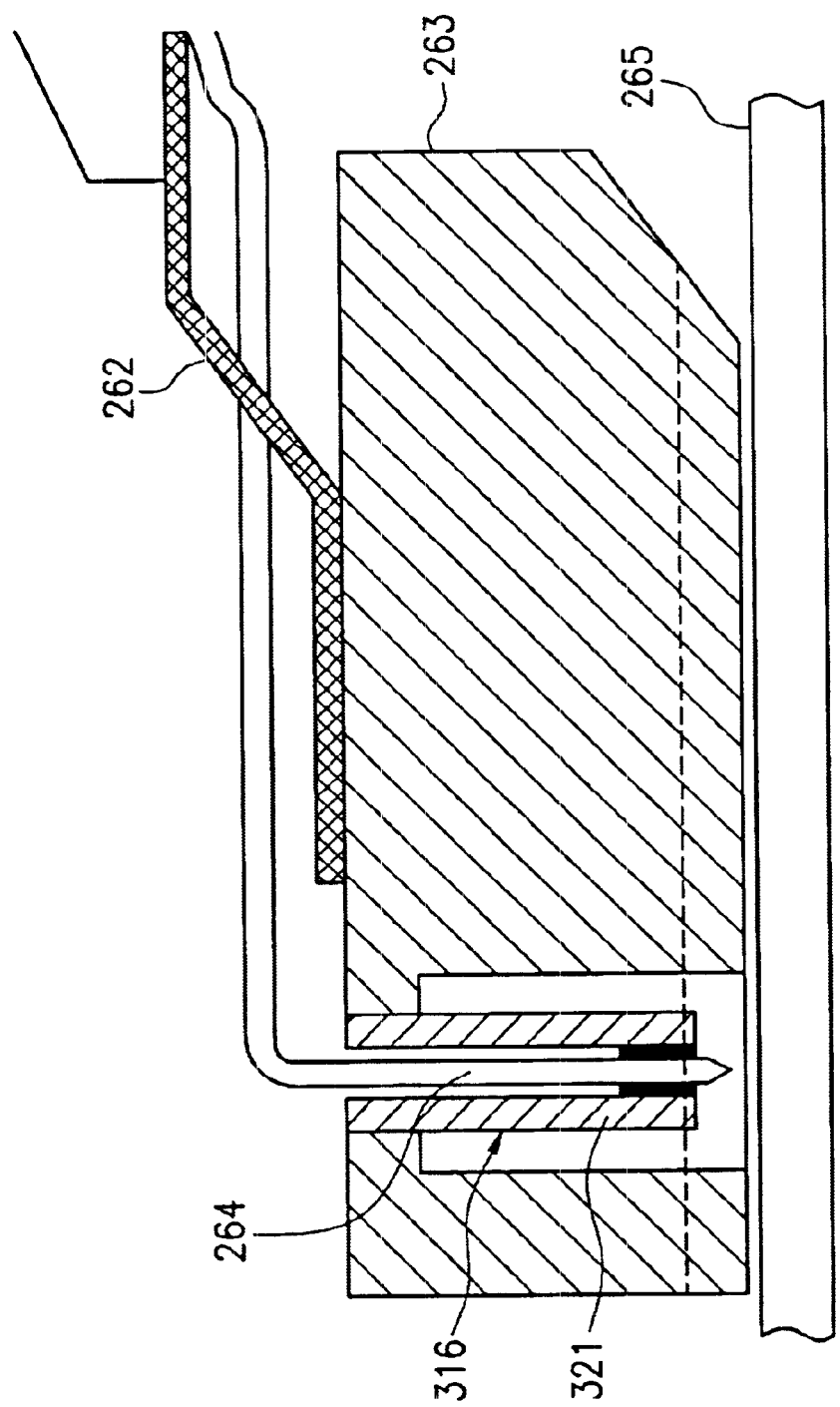
FIG. 46 is an elevational cross-sectional view of the head portion of the optical information recording and reproducing apparatus provided with the actuator which is the structural element of the optical system and the circuit.

The detail of the actuator 316 is described hereinafter. FIG. 46 is an elevational cross-sectional view of the head portion of the optical information recording and reproducing apparatus provided with the actuator which is the structural element of the optical system and the circuit.

In FIG. 46, a vertical hole is formed through the slider 263. A circular cylinder shaped vibrator 321 is inserted into the vertical hole and the upper portion thereof is firmly bonded to the hole with adhesive (bonding) agent. The probe 264 is further inserted into the interior of the cylindrical vibrator 321 and the probe 264 is firmly bonded to the lower portion of the vibrator 321. The actuator 316 is made in such structure as mentioned above.

Figure 47:
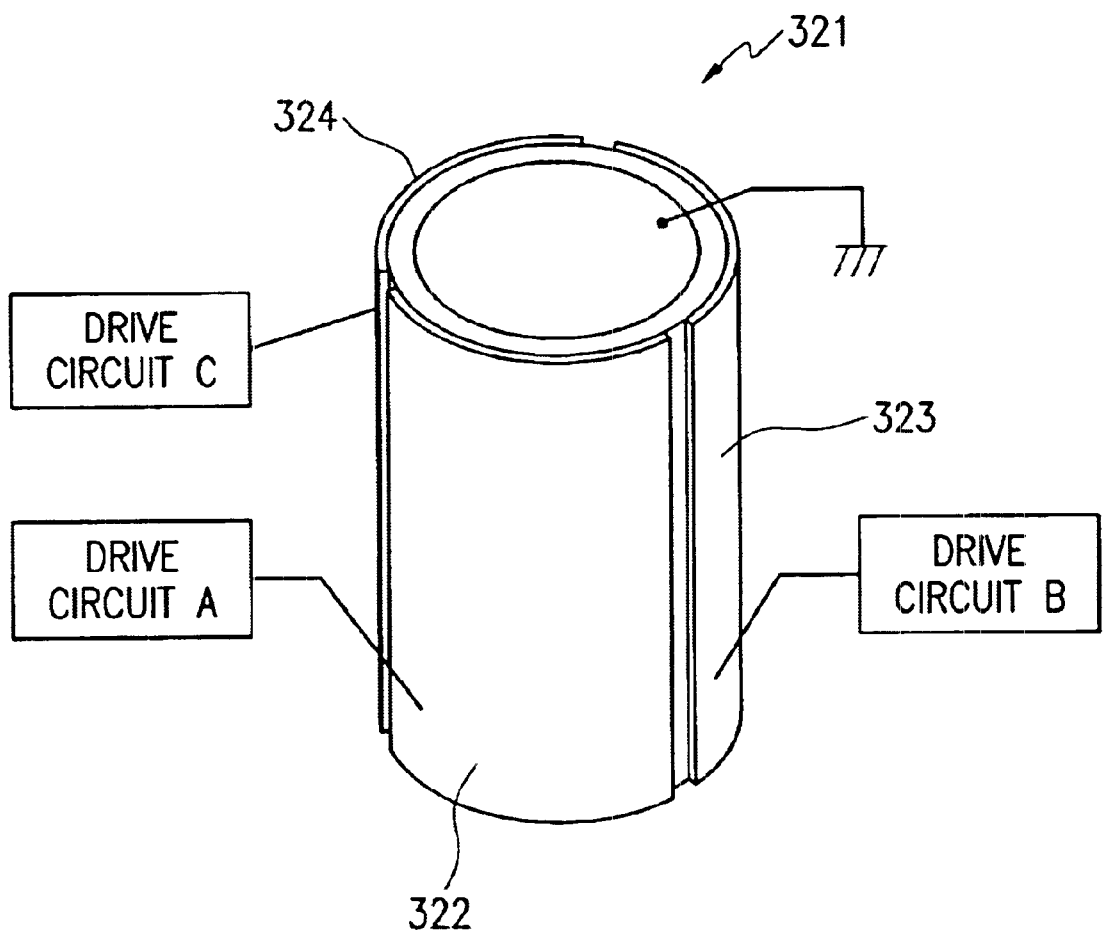
FIG. 47 is a perspective view of a structure example of the actuator.

FIG. 47 is a perspective view showing an example of the cylindrical vibrator 321. In FIG. 47, the vibrator 321 is a three-divided electrodes type cylindrical piezoelectric vibrator. An electrode film is formed on the entire inner circumferential surface of the cylinder and electrically grounded (connected to the earth). Electrodes 322, 323, and 324 divided into three in the circumferential direction of the cylinder are formed on the outer circumferential surface of the cylinder. Drive circuits A, B, and C are respectively connected to the electrodes 322, 323, and 324. The polarization of the vibrator occurs in the direction of the vibrator's thickness going toward the center of the vibrator axis.

Next, the operation of the vibrator is described. When an equal negative voltage is respectively applied to the electrodes 322, 323, and 324 from the three drive circuits A, B, and C, the cylindrical vibrator 321 expands in the direction of the vibrator's axis. Here, when the output voltages of the drive circuits A, B, and C are controlled, the focusing operation can be done.

On the other hand, when a negative voltage is respectively applied to the drive circuits A and B and a positive voltage is applied to the drive circuit C, the cylindrical vibrator 321 is bent toward the electrode 324. If all of those voltages are inversed, the vibrator 321 is bent in the reverse direction. Here, when the output voltages of the driving circuits A, B, and C are controlled, the operations of vibrating the probe 264 and tracking that can be done.

Figure 48:
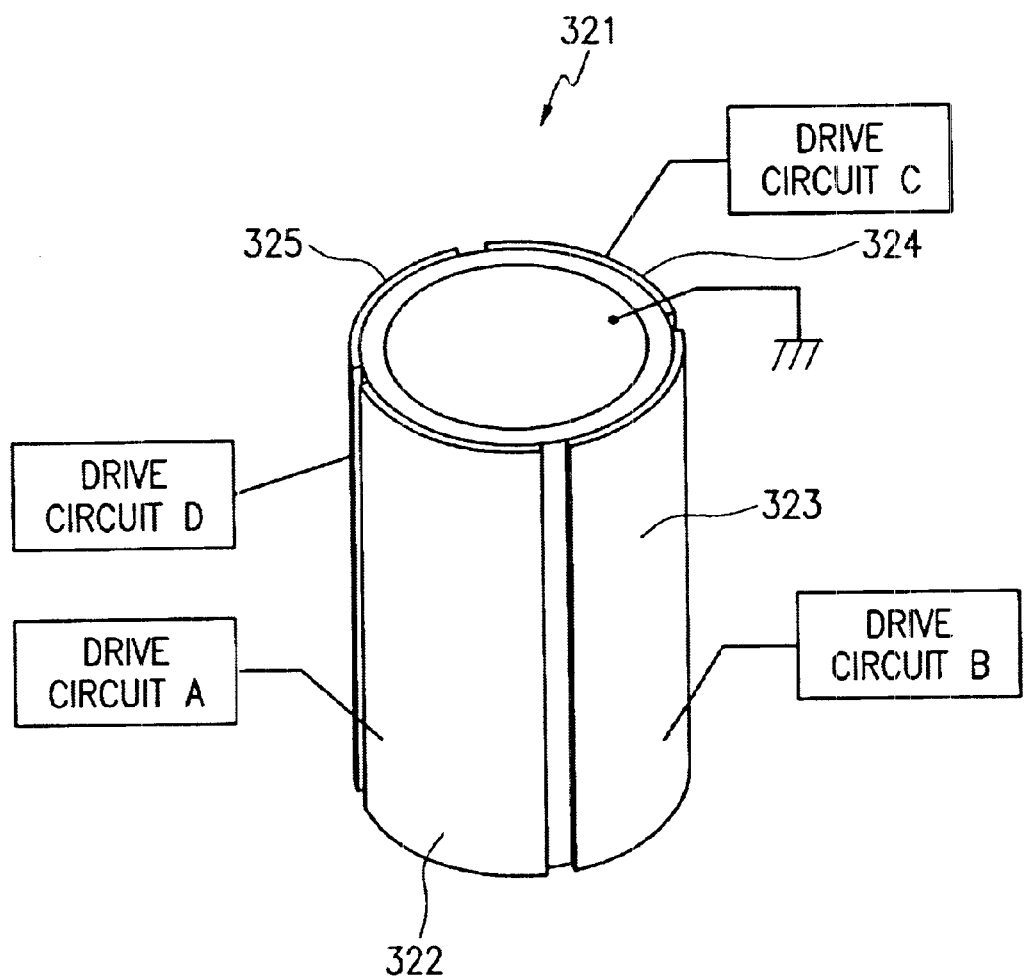
FIG. 48 is a perspective view of another structure example of the actuator.

FIG. 48 is a perspective view showing another example of the cylindrical vibrator 321. In FIG. 48, the different point of the cylindrical vibrator 321 from that in FIG. 47 is that four electrodes 322, 323, 324, and 325 divided in the circumferential direction are formed on the outer circumferential surface of the cylinder, and drive circuits A, B, C, and D are respectively connected to the divided electrodes 322, 323, 324, and 325.

Next, the operation of the vibrator is described. The electrodes 322 and 324 are disposed so as to oppose to each other. An equal voltage is respectively applied to those electrodes 322 and 324 from the drive circuits A and C, and thereby the cylindrical vibrator 321 expands or contracts. In such structure, the focusing operation can be done. On the other hand, when the voltages of the properties (polarities) inverse to each other are respectively applied to the electrode 323 and the other electrode 325 both perpendicular to the electrodes 322 and 324 and opposing to each other, since the cylindrical vibrator 321 is bent toward the electrode at the side of the positive voltage, the operations of vibrating the probe 264 and tracking can be done. In such way, in the cylindrical vibrator 321 shown in FIG. 48, the operations of focusing, vibrating the probe 264, and tracking can be controlled independently.

Figure 49:
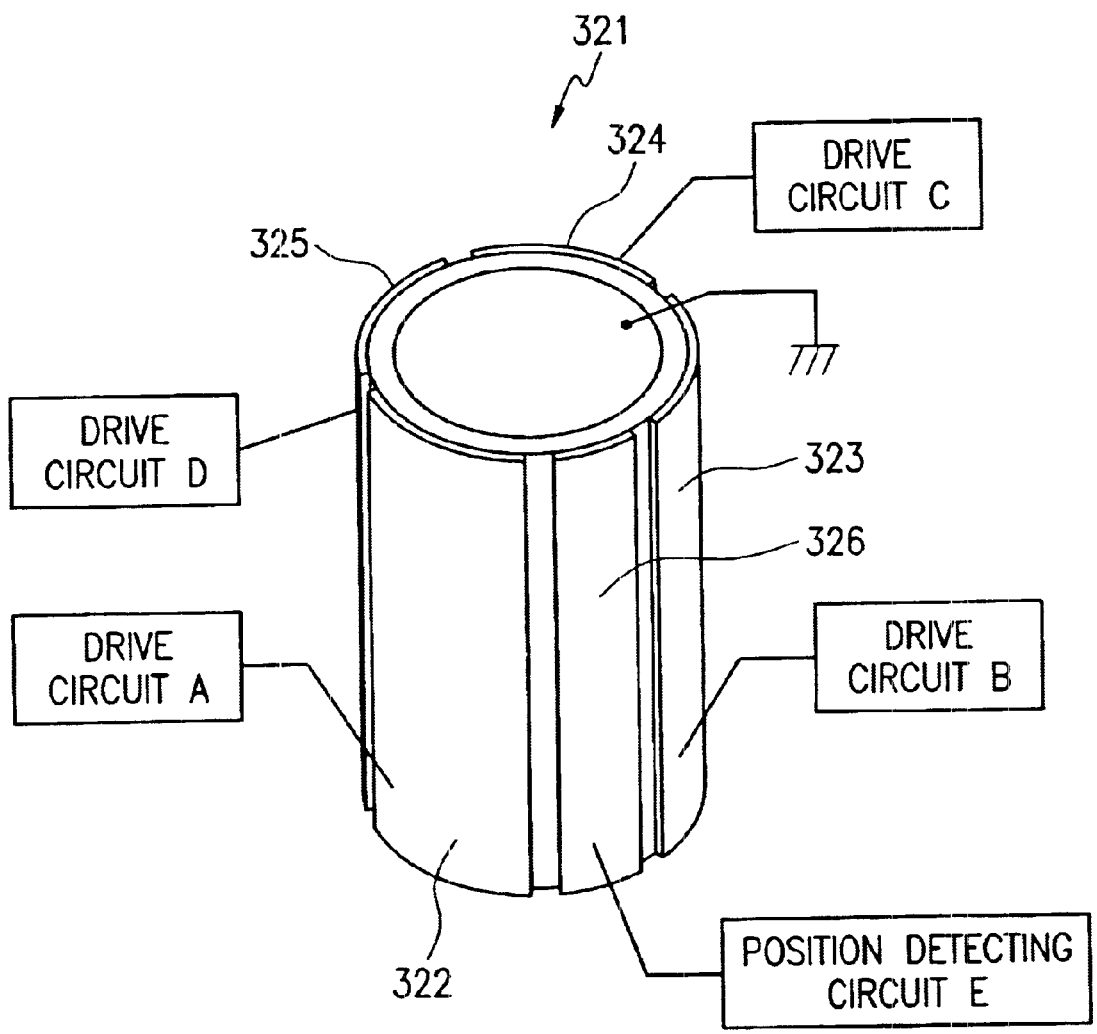
FIG. 49 is a perspective view of still another structure example of the actuator.

FIG. 49 is a perspective view showing still another example of the cylindrical vibrator 321. In FIG. 49, the different point of the cylindrical vibrator 321 from that in FIG. 48 is that a fifth electrode 326 divided in the circumference direction on the outer circumferential surface of the cylinder is provided and a position detecting circuit E for detecting the voltage generated on the electrode 326 is connected to the electrode E. In such structure, since the voltage corresponding to the amount of the deviation (displacement) of the cylindrical vibrator 321 appears on the electrode 326 by the action of the piezoelectric effect, the deviation amount of the cylindrical vibrator 321 can be known by detecting the voltage by use of the position detecting circuit E. And then, the detection signal of the position detecting circuit E is fed back to the drive circuits A through D, and thereby the focusing position and the tracking position can be controlled to the desired state.

Figure 50:
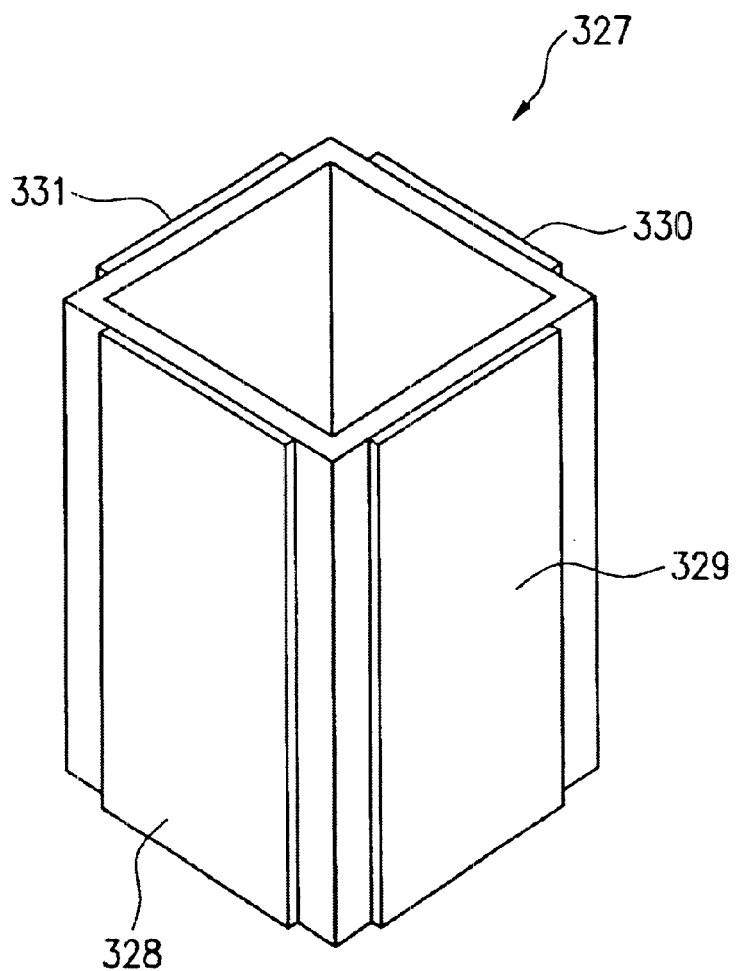
FIG. 50 is a perspective view of still another structure example of the actuator.

In the example shown in FIG. 50, four flat-plate electrodes 328 through 331 are stickled on the four circumferential surfaces of the metal cylinder 327 having a square (or rectangular) cross section.

Next, the operation of the square vibrator is described. The electrodes 328 and 330 are disposed so as to oppose to each other. An equal voltage is respectively applied to those electrodes 328 and 330, and thereby the metal cylinder 327 expands or contracts. In such structure, the focusing operation can be done. On the other hand, when the voltages of the properties (polarities) inverse to each other are respectively applied to the electrode 329 and the other electrode 331 both perpendicular to the electrodes 328 and 330 and opposing to each other, since the metal cylinder 327 is bent toward the electrode at the side of the positive voltage, the operations of vibrating the probe 264 and tracking can be done. In such way, in the metal cylinder 327 shown in FIG. 50, the operations of focusing, vibrating the probe 264, and tracking can be controlled independently.

Furthermore, in such structure as shown in FIG. 50, the bonding of the probe 264 with adhesive agent can be made facilitated, and in addition, the impact-proofness can be made enhanced (improved).

SUMMARY OF SEVENTH THROUGH TWELFTH EMBODIMENTS

As is apparent from the foregoing descriptions, according to the present invention, in the optical information recording and reproducing apparatus, the medium which is specially used for the tracking needs not to be provided in addition to or in place of the moving apparatus. The land or the mark both lowering the recording density is not required to prepare on the optical information recording medium. It is not necessary to specially devise the probe itself. The tracking error signal can be obtained with the simple medium or structure.

Furthermore, in the same optical information recording and reproducing apparatus, only the moving apparatus is used. In addition, it is not necessary to device the complicated circuit or the probe for measuring the distance between the tip end of the probe and the surface of the optical information recording medium without limiting the structure and material of the optical information recording medium. The light source of the special wavelength, the pattern to be formed on the optical information recording medium, and the time-consuming signal processing are not requires at all. The tracking error signal can be obtained with simple medium or structure, and the distance between the tip end of the probe and the surface of the optical information recording medium. Furthermore, the distance therebetween can be measured with high sensitivity. Furthermore, the moving (vibrating) apparatus is constructed with the same actuator as that of the tracking apparatus, and such actuator can be made with simple structure, and the recording/reproducing head can be made small-sized. Consequently, the operations of writing-in and reading-out can be performed with high speed.

THIRTEENTH EMBODIMENT

Figure 57:
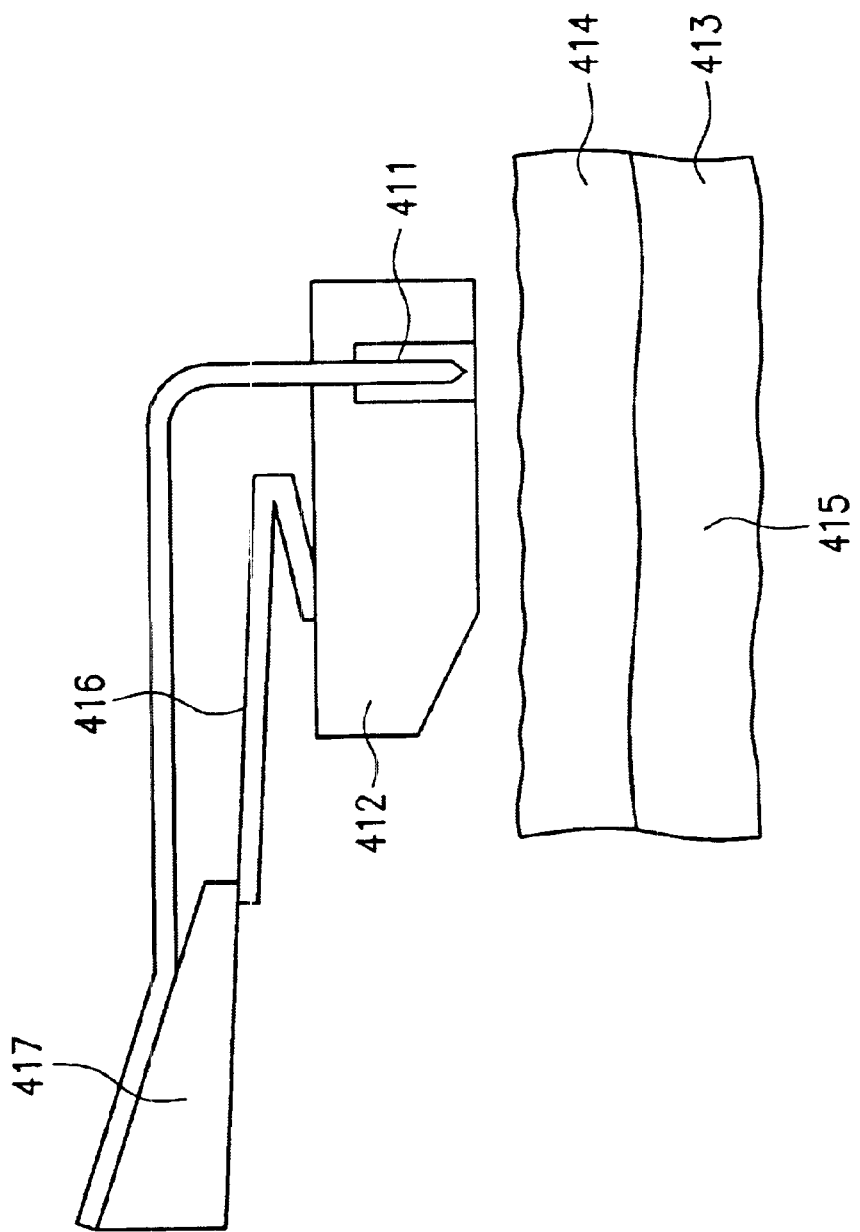
FIG. 57 is an outlined side elevational view illustrating the structure of the information recording and reproducing apparatus of the background art 11.
Figure 58:
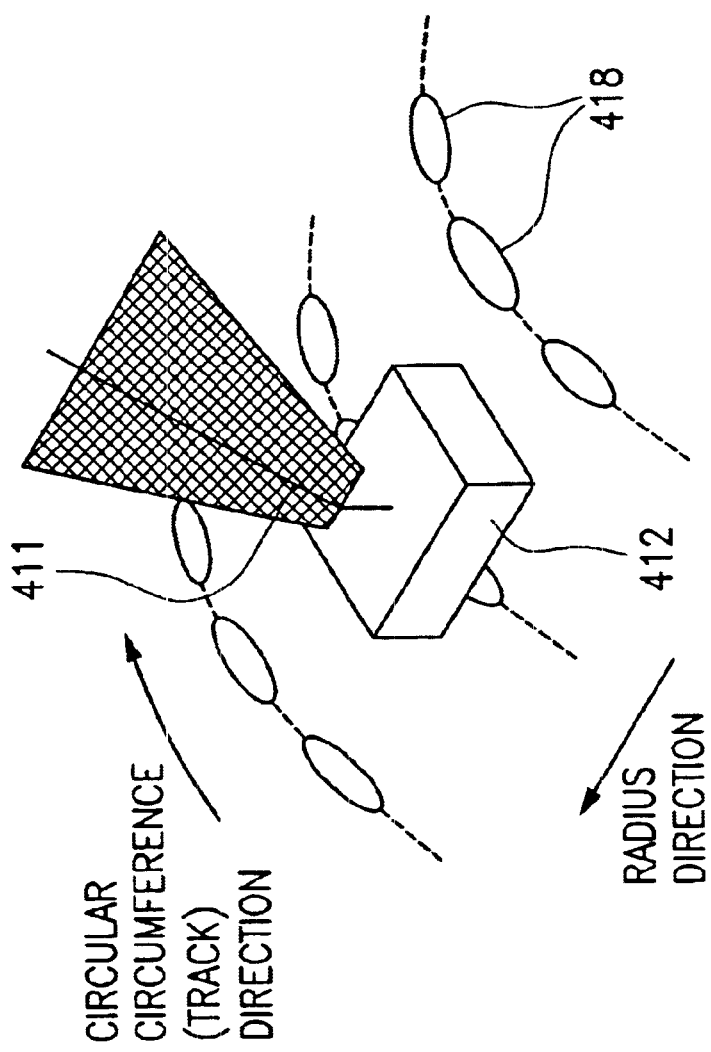
FIG. 58 is a schematic perspective view illustrating the state of scanning the mark pit.
Figure 59:
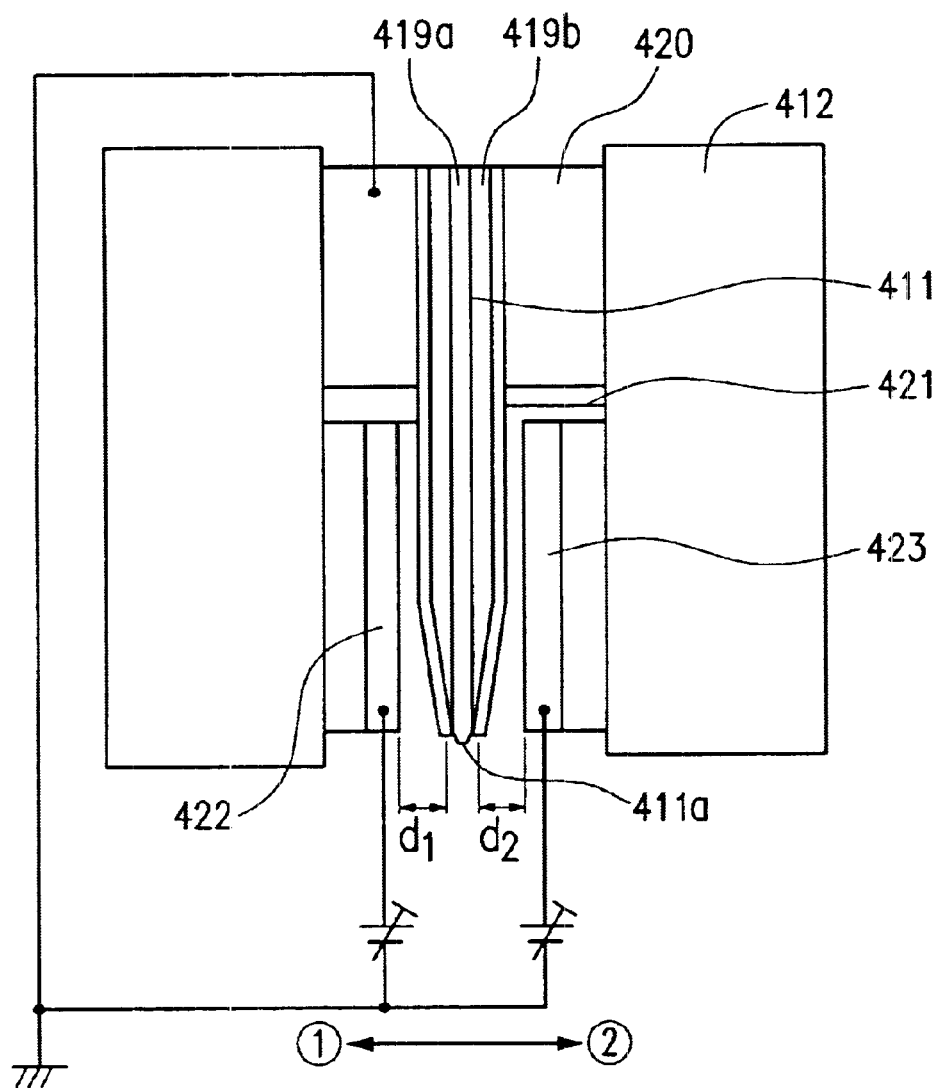
FIG. 59 is an enlarged cross-sectional structural view illustrating the cross section of the probe and the vicinity thereof enlarged in the radius direction of the probe and circuit connected thereto.

The thirteenth embodiment of the present invention is described hereinafter in detail, referring to FIG. 52. Basically, the embodiment relates to the information recording and reproducing apparatus illustrated in FIGS. 57 through 59. In those figures, same reference numeral is attached to same part.

Figure 52:
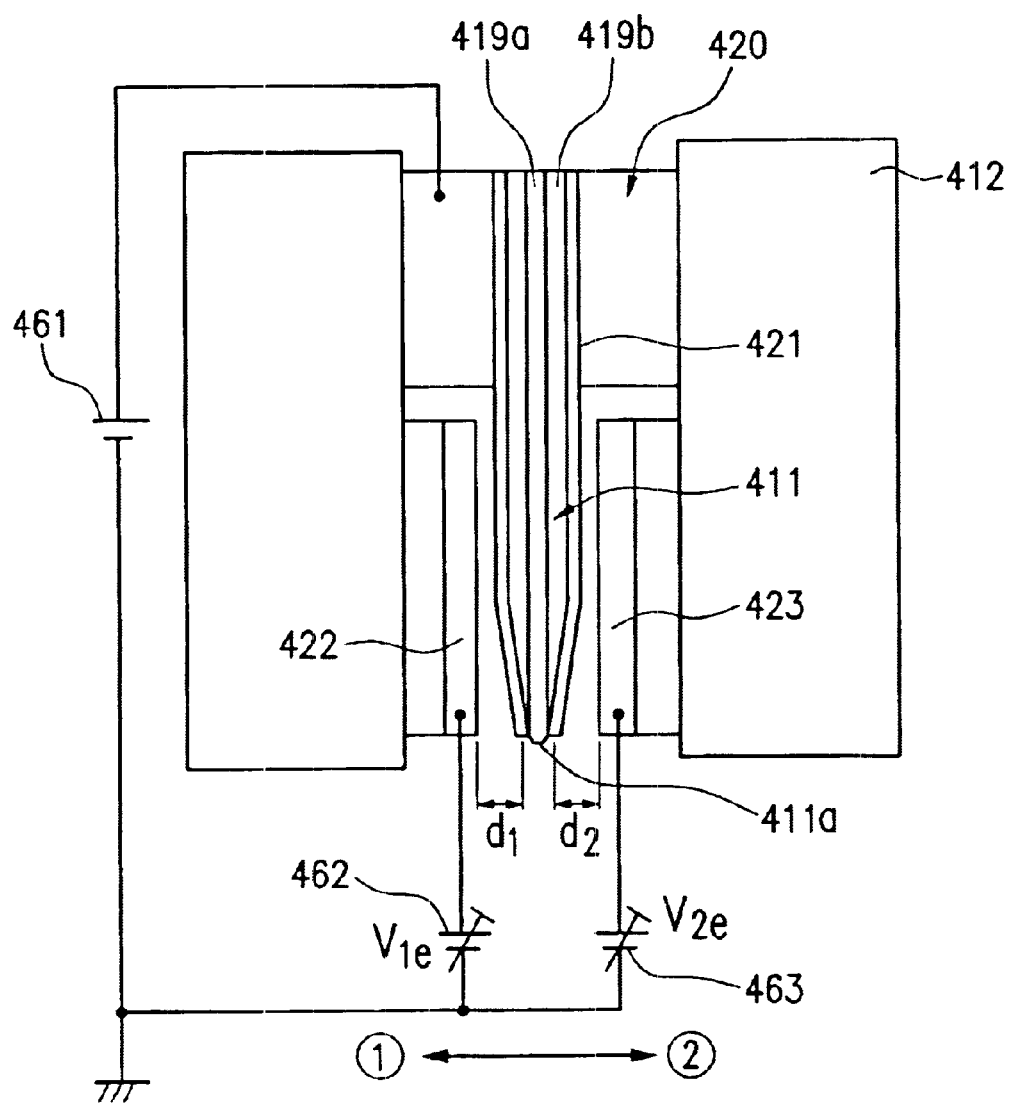
FIG. 52 is an enlarged cross-sectional structural view illustrating the cross section of the vicinity of the probe enlarged in the radius direction thereof, in the information recording and reproducing apparatus of the thirteenth and fourteenth embodiments according to the present invention.

In FIG. 52, a probe 411 constructed with an optical fiber structure including a core 419a and a clad 419b has an upper-end base side and a tip end side. The upper-end base side of the probe 411 is fixed on a slider 412 through a common electrode part 20, and the tip end side 411a opposing to the recording medium 415 is free. As mentioned above, the probe 411 is constructed with a so-called cantilever structure. The tip end 411a thereof is finely sharpened by the etching. A light intercepting metal film 421 coats the entire surface of the probe 411 so as to emit the light from the small opening of the tip end 411a. The opening has a diameter equal to or smaller than the wavelength of the light propagating through the optical fiber, and a so-called adjacent field light is emitted therefrom. Even though the other probe except for the probe emitting such adjacent field light is employed, any one of the probes having the same or similar structure can be applied to the information recording and reproducing apparatus of the present invention. For instance, it is possible to employ an internal light-focusing type probe having the opening having a diameter larger than the employed wavelength. By use of the light emitted from such probe 411, the operation of writing in or reading out the information is performed on the recording medium 415. A power source 461 is connected across the light-intercepting metal film 421 coating the probe 411 and the earth (ground). The power source 461 serves as a bias voltage applying member for applying a bias voltage $V_b$ therebetween. It is allowable to set the bias voltage $V_b$ to either one of the positive value or the negative value.

A pair of electrodes 422 and 423 are provided in the radius direction (tracking direction) of the recording medium 415 at the time of the slider 412, so as to put the probe 411 between the electrodes 422 and 423. Those electrodes are fixed in the slider 412. Different voltages $V_1$ and $V_2$ are respectively applied across the electrodes 422 and 423 and the common electrode 420 (light-intercepting metal film 421) of the probe 411. In order to create the. voltages $V_1$ and $V_2$, power sources 462 and 463 both serving as the control voltage applying medium for respectively applying the control voltages $V_{1e}$ and $V_{2e}$ are respectively connected across the electrodes 422 and 423 and the earth (ground).

Consequently, in such structure, the voltages $V_1$ and $V_2$ are respectively applied across the electrodes 422 and 423 as the superposing voltage of the bias voltage $V_b$ from the power source 461 and the control voltages $V_{1e}$ and $V_{2e}$ from the power sources 462 and 463. Those power sources 461, 462, and 463 operate as the voltage applying-media (members). Here, all of the common (minus) terminals are connected to the earth (ground).

In such structure, the electrostatic attractive force is exerted between the electrodes 422 and 423 and the probe 411. Thereby, the probe 411 is put in a state of the cantilever and the tip end 411a of the probe 411 swings in the radius direction of the recording medium 415. As the result, the tip end 411a of the probe 411 can be moved. Such movement is necessary for the tracking.

In FIG. 52, the electrostatic attractive force $F_1$ exerted in the direction ① and the electrostatic attractive force $F_2$ exerted in the direction ② are respectively expressed by the following equations (16) and (17):

$$F_1 = -(\tfrac{1}{2})(\partial C_1/\partial d_1)V_1^2 = (\tfrac{1}{2})(V_1^2/d_1^2)\epsilon_a S_1 \quad (16)$$

$$F_2 = -(\tfrac{1}{2})(\partial C_2/\partial d_2)V_2^2 = (\tfrac{1}{2})(V_2^2/d_2^2)\epsilon_a S_2 \quad (17)$$

In those equations (16) and (17), $c_1$ and $c_2$ represent the respective electrostatic capacitances between the probe 411 and the electrodes 422 and 423, $S_1$ and $S_2$ equivalent square measures of the electrostatic capacitances $c_1$ and $c_2$, $d_1$ and $d_2$ the respective distances between the probe 411 and the electrodes 422 and 423, and $\epsilon a$ the dielectric constant of the air. Furthermore, the values of the electrostatic capacitances $c_1$ and $c_2$ are assumed to be expressed by the following equations (18) and (19):

$$C_1 = \epsilon_a \cdot S_1/d_1 \quad (18)$$

$$C_2 = \epsilon_a \cdot S_2/d_2 \quad (19)$$

Namely, the assumption is same as that of the equations (3) and (4) in the first embodiment.

Consequently, the electrostatic attractive force is proportional to the square of the voltage and inversely proportional to the square of the distance.

Here, the voltages $V_{1e}$ and $V_{2e}$ from the power sources 462 and 463 are assumed to be expressed by the following equations (20) and (21):

$$V_{1e} = -\Delta V \quad (20)$$

$$V_{2e} = +\Delta V \quad (21)$$

By changing the values of those voltages ($-\Delta V$, $+\Delta V$), the tip end 411a of the probe 411 can be moved. On this occasion, the electric potential difference $V_1$ between the electrode 422 and the probe 411 and the electric potential difference $V_2$ between the electrode 423 and the probe 411 are respectively expressed by the following equations (22) and (23):

$$V_1 V_b + \Delta V \quad (22)$$

$$V_2 = V_b - \Delta V \quad (23)$$

Consequently, the force F exerted on the probe 411 is expressed by the following equation (24):

$$F = F_1 - F_2 = (\tfrac{1}{2})(V_1^2/d_1^2)\epsilon_a S_1 - (\tfrac{1}{2})(V_2^2/d_2^2)\epsilon_a S_2 = (2\Delta V + V_b/d^2 \cdot \epsilon_a S \quad (24)$$

Here, the following are assumed:

$$S_1 = S_2 \quad (25)$$

$$d_1 = d_2 = d \quad (26)$$

In such way, the electrostatic attractive force is proportional to the control voltage $\Delta V$, and thereby the force exerted on the probe 411 can be easily controlled.

Here, according to the thirteenth embodiment of the present invention mentioned heretofore, the bias voltage $V_b$ is a voltage which is independently set from the voltages $V_{1e}$ and $V_{2e}$ for the control voltage $\Delta V$, and all of the common terminals of the power sources of $V_b$, $V_{1e}$ and $V_{2e}$ are connected to the earth (GND). Consequently, the stability of the electric potential is raised (improved) compared with the aforementioned background art 2. In addition, the, circuit construction can be made further simplified.

FOURTEENTH EMBODIMENT

The fourteenth embodiment of the present invention is described hereinafter in detail, also referring to FIG. 52. Since the construction thereof is same as that of the thirteenth embodiment and has been already described, the explanation of the construction is omitted here.

At first, when the probe 411, is moved in the direction ①, only the voltage $V_{1e}$ is applied to the probe 411 and the voltage $V_{2e}$ is not applied thereto. On the contrary, when the probe 411 is moved in the opposite direction ②, vice versa. At this time, the electrostatic attractive force $F_1$ in the direction ① and the electrostatic attractive force $F_2$ in the direction ② are expressed by the following equations (27) and (28):

$$F_1 = -(\tfrac{1}{2})(\partial C_1/\partial d_1)V_{1e}^2 = (\tfrac{1}{2})(V_{1e}^2/d_1^2)\epsilon_a S_1 \quad (27)$$

$$F_2 = -(\tfrac{1}{2})(\partial C_2/\partial d_2)V_{2e}^2 = (\tfrac{1}{2})(V_{2e}^2/d_2^2)\epsilon_a S_2 \quad (28)$$

In those equations (27) and (28), $c_1$ and $c_2$ represent the respective electrostatic capacitances between the probe 411 and the electrodes 422 and 423, $S_1$ and $S_2$ equivalent square measures of the electrostatic capacitances $c_1$ and $c_2$, $d_1$ and $d_2$ the respective distances between the probe 411 and the electrodes 422 and 423, and $\epsilon a$ the dielectric constant of the air. Furthermore, the values of the electrostatic capacitances $c_1$ and $c_2$ are assumed to be expressed by the following equations (29) and (30):

$$C_1 = \epsilon_a \cdot S_1/d_1 \quad (29)$$

$$C_2 = \epsilon_a \cdot S_2/d_2 \quad (30)$$

Namely, the assumption is same as that of the equations (3) and (4) in the first embodiment.

Consequently, the electrostatic attractive force is proportional to the square of the voltage and inversely proportional to the square of the distance.

Here, when the probe 411 is moved in the direction ①, the voltage $V_{2e}$ is not applied to the probe 411. The equations should be rewritten to $$d_1 = d_2 = d, \text{ and}$$

$$S_1 = S_2 S.$$

In order to control the probe 411, if the dynamically changing voltage is $V_a$, $V_{1e}$ can be expressed by the following equation:

$V_{1e}V_a$

As the result, since only the equation (27) remains, the force F exerted on the probe 411 is expressed by the following equation (31):

$$F=(\tfrac{1}{2})(V_a^2/d^2)\epsilon_a S \qquad (31)$$

Next, as shown in FIG. 52, assuming that the bias voltage $V_b$ Is applied across the electrodes 422 and 423 and the probe 411 and the control voltages $V_{1e}$ and $V_{2e}$ To be respectively applied to the electrodes 422 and 423 for controlling the probe 411 have polarities inverse to each other and a same absolute value, namely, $V_{1e}=-V_a$ And $V_{2e}=+V_a$, the electrostatic attractive force $F_1$ In the direction ① is expressed by the following equation (32), and the electrostatic attractive force $F_2$ in the direction ② is expressed by the following equation (33):

$$F_1=(\tfrac{1}{2})\{(V_b+V_a)/d^2\}\epsilon_a S=(\tfrac{1}{2})\{(V_a^2+2V_bV_a+V_b^2)/d^2\}\epsilon_a S \qquad (32)$$

$$F_2=(\tfrac{1}{2})\{(V_b-V_a)/d^2\}\epsilon_a S=(\tfrac{1}{2})\{(V_a^2-2V_bV_a+V_b^2)/d^2\}\epsilon_a S \qquad (33)$$

The total force W by the above both electrostatic attractive forces $F_1$ and $F_2$ exerted on the probe 311 is expressed by the following equation (34):

$$W=F_1-F_2=(\tfrac{1}{2})(4V_bV_a/d^2)\epsilon_a S \qquad (34)$$

Here, the condition of satisfying the inequality W>F is expressed by the following inequality (35):

$$(\tfrac{1}{2})(4V_bV_a/d^2)\epsilon_a S>(\tfrac{1}{2})(V_a^2/d^2)\epsilon_a S \qquad (35)$$

Consequently, it may be allowable that the bias voltage $V_b$ Satisfies the following inequality (36) or the control voltage $V_a$:

$$V_b>V_a/4. \qquad (36)$$

Namely, when the bias voltage $V_b$ equal to or larger than ¼ of the control voltage $V_a$ for controlling the position of the probe 411 is applied, the force in the case of performing the control operation of moving the probe 411 with the applied bias voltage $V_b$ and the dynamically changed control voltage $V_a$ turns out to be larger than the force in the case of performing the control operation of moving the probe 411 with only the dynamically changed control voltage $V_a$ without applying the bias voltage $V_b$. To state in other words, if the condition of the inequality (30) is satisfied, even the control voltage $V_a$ of further low voltage can obtain same force. Since the control voltage $V_a$ has to be changed with high speed in order to perform the tracking of the probe 411, the load of the drive circuit can be reduced by decreasing the voltage value. Furthermore, since the bias voltage $V_b$ is a simple DC voltage, it is further simple to construct a high-voltage circuit, compared with the case of making high the control voltage $V_a$.

In such way, according to the fourteenth embodiment, since the (voltage) value of the bias voltage $V_b$ is set so as to satisfy the condition of the inequality (30), not only the linearity of the electrostatic attractive force in relation to the voltage can be improved but the load of the drive circuit can be reduced, as the effect of applying the bias voltage $V_b$. As the result, the (voltage) value of the dynamically changed control voltage $V_a$ can be lowered (decreased) in order to perform the operation of tracking the probe 411. Consequently, the load (cost, power consumption, and size) of the circuit for outputting the control voltage $V_a$.

Figure 53:
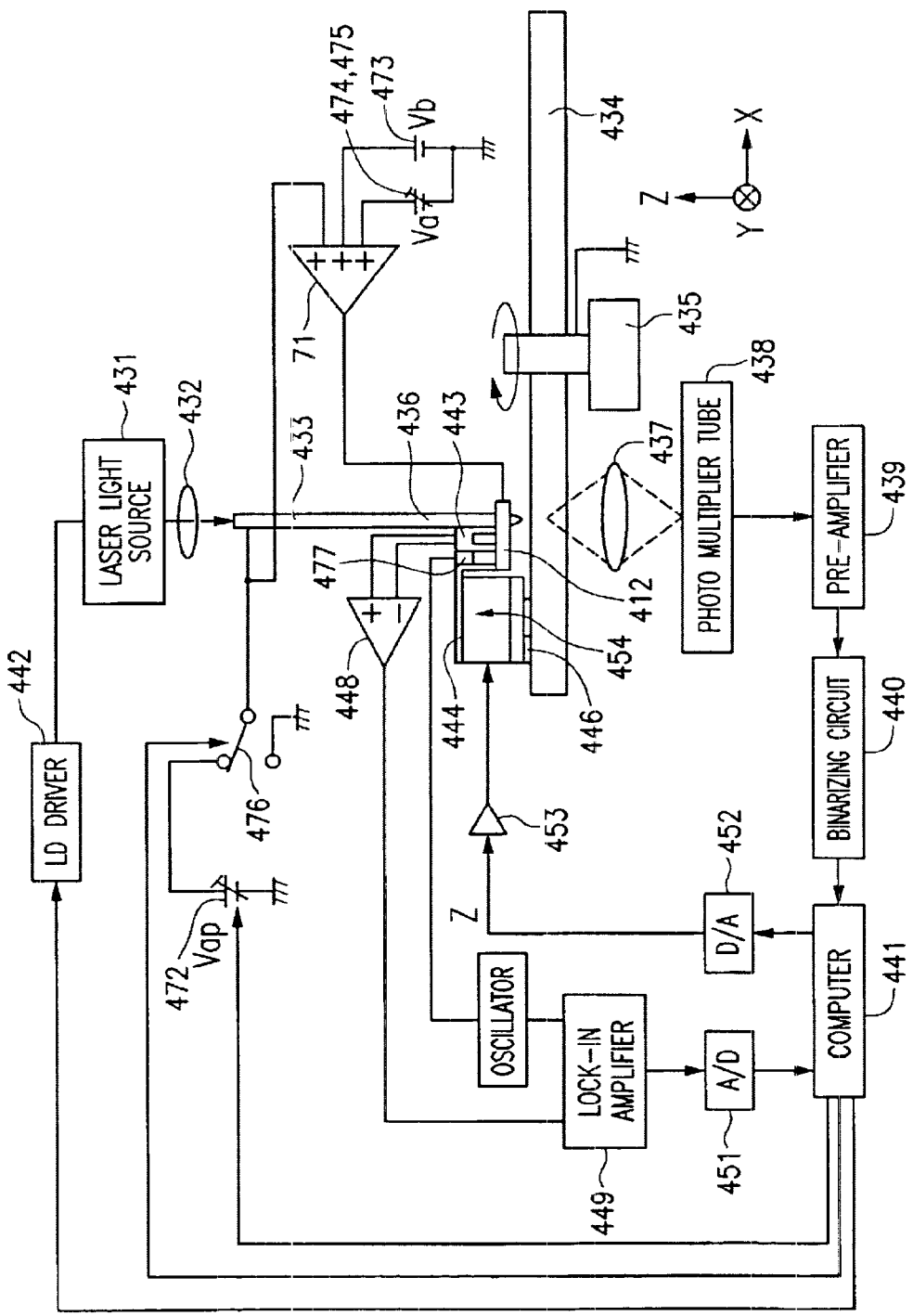
FIG. 53 is a structural block diagram illustrating the structure of the information recording and reproducing apparatus of the fifteenth embodiment according to the present invention.

The fifteenth embodiment of the present invention is described hereinafter in detail, referring to FIGS. 53 and 54.

Figure 60:
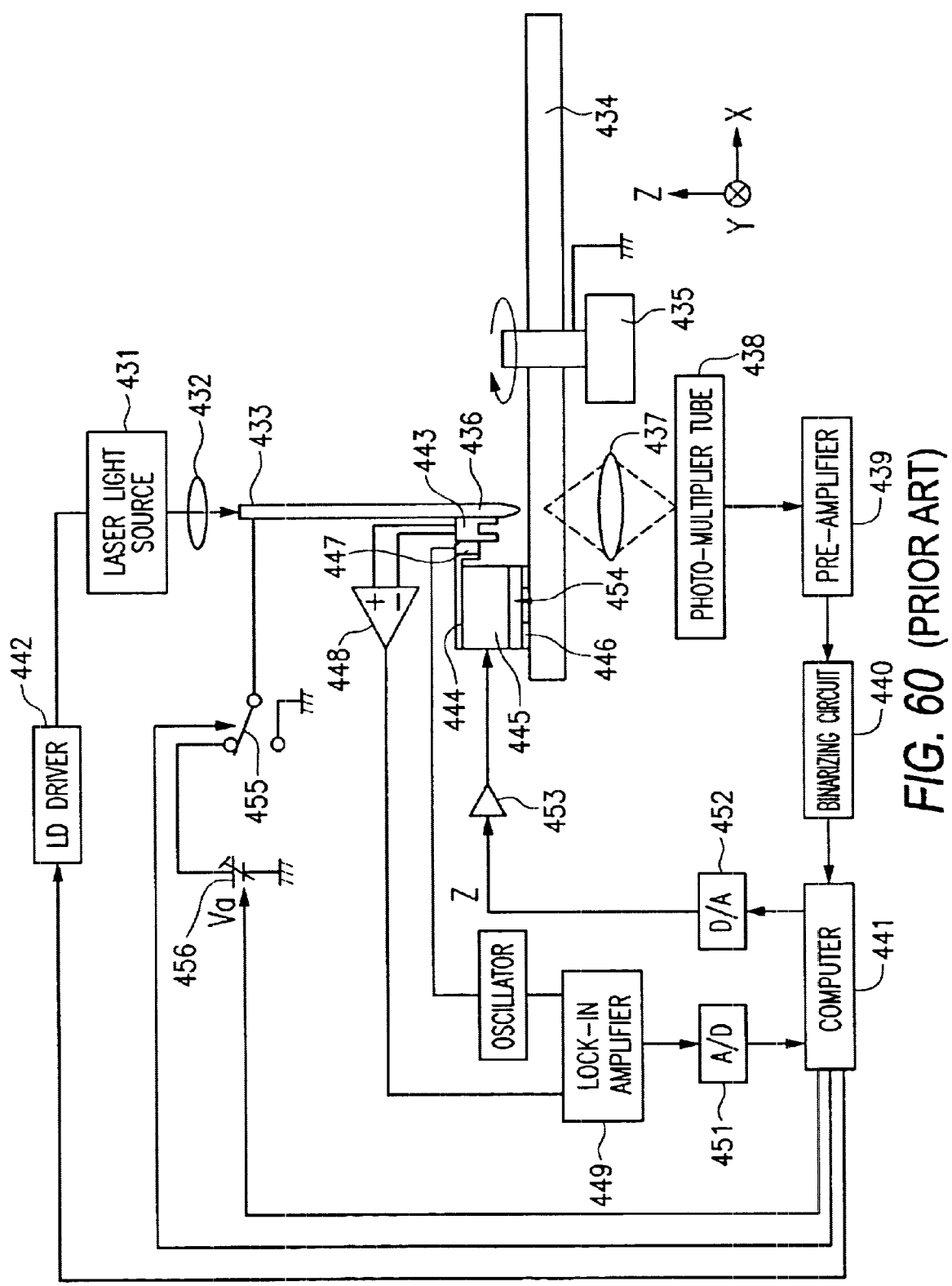
FIG. 60 is a structural block diagram illustrating the structure of the information recording and reproducing apparatus of the background art 12.

Basically, the fifteenth embodiment of the invention is same as the information recording and reproducing apparatus as shown in FIGS. 52 and 60. Same reference numeral is attached to the same part.

At first, a larger light source 431 oscillates continuously. The light emitted from the laser light source 431 is focused onto the surface of an optical fiber 433 by a coupling lens 432 and enters the core of the optical fiber 433. The light exists as the adjacent field light in the close vicinity (several tens nm) of the sharpened tip end of the optical fiber 433. A recording medium 434 is rotated by a spindle motor 435. The information is recording on the surface of the recording medium 434 by the area (mark) having a contrast of transmission factor. When the tip end of the optical fiber 433 functioning as the probe 436 approaches the position several tens nm or less from the surface of the recording medium 434, the adjacent field light going out (oozing out) from the tip end of the probe 436 propagates toward the recording medium 434, and the transmission light having a power corresponding to the transmission factor of the previous (aforementioned) mark goes out from the opposite side of the recording medium 434 to the side of the probe 436. The light thus going out therefrom enters a photomultiplier (PMT) 438 through a coupling lens 437. The PMT converts the incident light to the electric signal is amplified by a pre-amplifier 439, and thereafter converted to digital information by a binarizing circuit 440 and the digitalized information is inputted to a computer 441. In such way, the information on the recording medium 434 can be read out. Since the recording medium 434 and the probe 436 move relatively to each other, the information recorded on the marks arranged in the circular circumferential direction (tracking direction) is stored in order into the computer 441 in a time series.

If the recording medium 434 is capable of being written in, the data can be written in similarly in the medium 434. Necessary written-in pulse is applied to the LD driver 442 from the computer 441. The pulse drives the laser light source 431, and thereby the information is written in on the surface of the recording medium 434 in order.

On that occasion, the distance between the surface of the recording medium 434 and the tip end of the probe 436 has to be set to several tens nm. In practice, the recording medium 434 has a concave and/or convex surface and moves up and down on the ordinary occasion due to the occurrence of the surface movement at the time of the recording medium rotation. Therefore, it is necessary to perform the control operation so as to make constant the distance. For such control operation, even in the fifteenth embodiment, the shear force or the electrostatic attractive force both based on the inter-atomic force is utilized on the surface of the recording medium 434 and at the tip end of the probe 436.

Here, the probe 436 is bonded with adhesive agent on the one-side cantilever of a quartz vibrator 443. The quartz vibrator 443 is connected to a laminated piezoelectric element 445 via an L-shaped holder 444. The laminated piezoelectric element 445 is connected onto a sliding-proof pad 446. The sliding-proof pad 446 is brought into contact with the surface of the recording medium 434. When the medium 434 rotates, the sliding-proof pad 446 slidably moves on the recording medium 434. At this time, a relative movement occurs between the recording medium 434 and the probe 436. When the voltage is applied to the laminated piezoelectric element 445, since the element expands and contracts in the direction Z, the distance between the probe 436 and the surface of the recording medium 434 can be changed.

The quartz vibrator 443 is vibrated with the resonance frequency by the piezoelectric element 447. When the surface of the recording medium 434 approaches the tip end of the probe 436, the shear force and the electrostatic attractive force based on the inter-atomic force are exerted between the surface of the recording medium 434 and the tip end of the probe 436. The above force acts as a spring between the surface of the recording medium 434 and the tip end of the probe 436. Thereby, the resonance frequency of the entire vibration system is changed. However, by the action of the piezoelectric element 447, the vibration frequency is not changed at all. Therefore, the state of the entire vibration system is deviated from the resonant state and thereby the amplitude of the vibration may be reduced. The voltage created by the quartz vibrator 443 is amplified by the differential amplifier 448 and inputted to a lock-in amplifier 449. The lock-in amplifier 449 amplifies the amplitude of the quartz vibrator and converts the amplified amplitude to DC voltage in synchronism with the vibration frequency. The output of the lock-in amplifier is taken in by a computer 441 via an A/D converter 451. The computer 441 calculates the numerical value for controlling the distance between the probe 436 and the surface of the recording medium from the difference between the distance therebetween and the standard value corresponding to the desired distance. The computer 441 outputs the calculated numerical value. The outputted value is converted to the analog voltage by a D/A-converter 452. Thereafter, the converted voltage is amplified by a power amplifier 453 and inputted to the laminated piezoelectric element 445. Thereby, the distance between the probe 436 and the surface of the recording medium 434 is controlled by the computer 441.

Here, the entire object carried on the sliding-proof pad 446 including the 454. The slider 454, is fixed on a base plate through a suspension, an arm, and an arm motor, all not shown. A spindle motor 435 is further fixed on the same base plate. Refer to the structure shown in FIG. 57. However, the slider 454 can be moved in the tracking direction by the action of the arm motor, and the slider 454 can be further moved up and down, namely in the direction Z by the suspension. Furthermore, the slider 454 is pushed (pressed) against the surface of the recording medium 434 with suitable force by the action of the suspension. The sliding-proof pad 446 is brought into contact with the surface of the recording medium 434.

On the other hand, it is necessary to provide a tracking actuator in order to perform the operation of tracking the tip end of the probe 436 on the mark row (track) of the recording medium 434. As described in the thirteenth and fourteenth embodiments, the electrostatic attractive force is utilized for the tracking. Consequently, the structure of the probe 436 and the vicinity thereof is same as that shown in FIG. 52. Namely, a pair of electrodes 422 and 423 are provided so as to put the probe 436 therebetween in the tracking, direction thereof. The voltage is applied across the probe 436 and the electrode 422 or 423 and the tip end 436a of the probe 436 is bent by the action of the force exerted therebetween. The tracking is done in such way.

Figure 54:
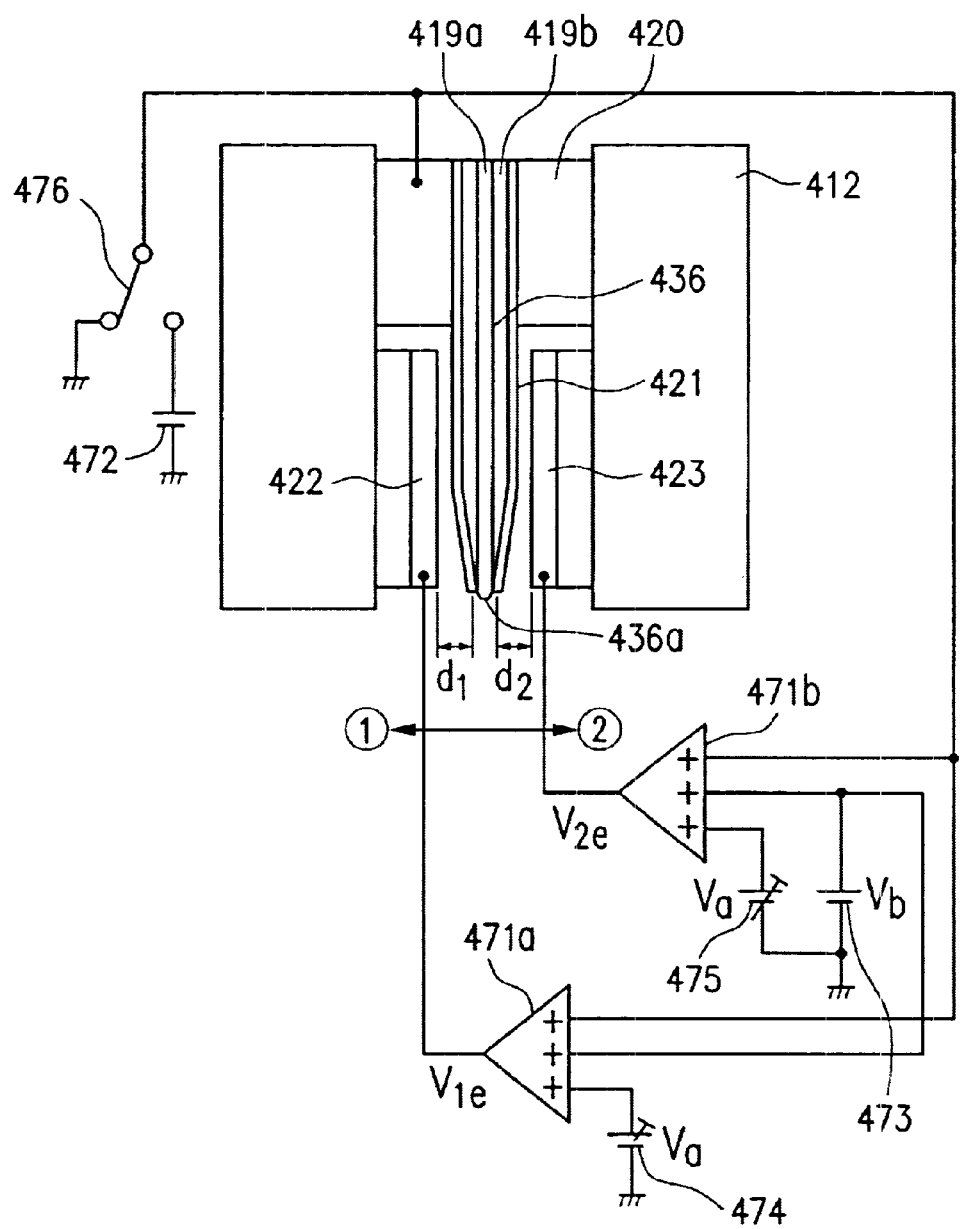
FIG. 54 is a structural cross-sectional view illustrating the cross section of the probe and the vicinity thereof enlarged in the radius direction and the circuit connected thereto.
Figure 55:
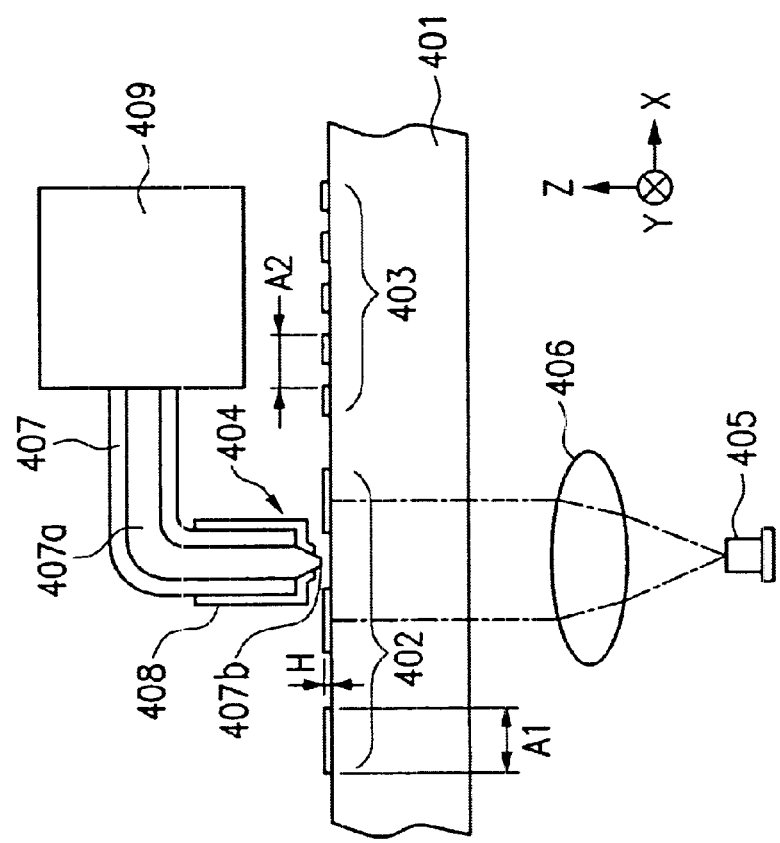
FIG. 55 is a side elevational cross-sectional view illustrating the structure of the probe and the vicinity thereof in the background art 10.
Figure 56:
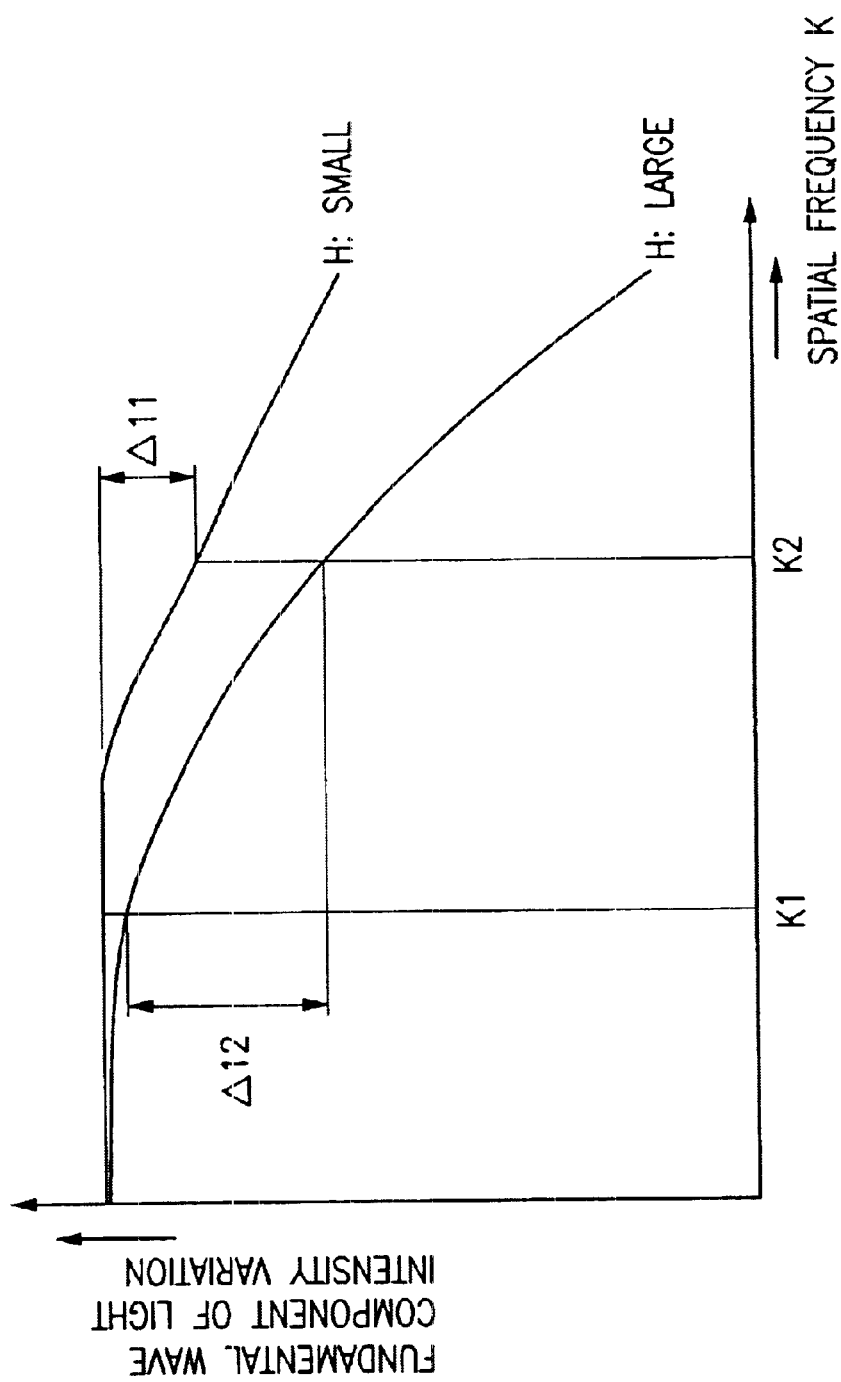
FIG. 56 is a property graph showing the relationship between the spatial frequency at the pattern scanning and the fundamental wave component of the light intensity variation.

FIG. 54 is a structural view illustrating the cross section of the probe and the vicinity thereof enlarged in the radius direction (tracking direction) and the circuit connected thereto. The output sides of the three-inputs adding amplifiers 471a and 471b respectively serve as the superposed voltage adding medium. An approach voltage $V_{ap}$ from a power source 472 or a ground (earth) voltage to be selectively applied, the bias voltage $V_b$ from the power source 473, and the control voltage $-V_a$ from the power source 474 are respectively applied to the three input terminals of the additional amplifier 471a. On the other hand, the approach voltage $V_{ap}$ from the power source 472 or the ground (earth) voltage to be selectively applied, the bias voltage $V_b$ from the power source 473, and the control voltage $-V_a$ from the power source 474 are respectively applied to the three input terminals of the additional amplifier 471b.

Consequently, the voltage $V_{1e}$ TO be applied to the one-side electrode 422 is a superposed voltage created by superposing the approach voltage $V_{ap}$ Or the ground voltage, the bias voltage $V_b$ and the control voltage $-V_a$. On the other hand, the voltage $V_{2e}$ to be applied to the other-side electrode 423 is to another superposed voltage created by superposing the approach voltage $V_{ap}$ or the ground voltage, the bias voltage $V_b$ and the control voltage $+V_a$. The tracking of the probe 436 is performed by changing both of the control voltages $+V_a$ and $-V_a$.

As mentioned in the thirteenth and fourteenth embodiments, the reason of applying such voltages created by superposing the bias voltage $V_b$ independent from the control voltage $+V_a$ and $-V_a$ on the other voltages is to improve the linearity of the electrostatic attractive force in relation to the control voltages $+V_a$ and $-V_a$ and to realize the apparatus of low voltage. In such structure, the approach voltage Vapor the ground voltage is applied to the probe 436. Which voltage should be applied thereto is described later.

When the information recording and reproducing apparatus as mentioned heretofore is put in the state of waiting, the probe 436 has to be distantly parted from the recording medium 434 such that the probe 436 does not come into contact with the recording medium 434. Therefore, as mentioned above, before starting the operations of writing-in or reading-out, the works of causing the probe 436 to approach the surface of the recording medium 434 are required inevitably.

On this occasion, as mentioned above, if the distance between the probe 436 and the surface of the recording medium 434 is intended to know only by the shear force, it may be impossible to know the approach of the probe 436 to the surface of the recording medium 434 cannot be known until the distance therebetween becomes near to several tens nm. As the result, the collision is apt to occur frequently.

In such situation, as in the case of the proposal according to the background art 12, the present embodiment (fifteenth embodiment) solves the above-mentioned problem by causing the electric potential difference between the probe 436 and the surface of the recording medium 434.

On the assumption thereof, it is absolutely necessary that the probe 436 is made of the electrically conductive material from the base portion to the tip end and the recording medium itself 434 is also conductive. Regarding the probe 436 utilizing the optical fiber 433 employed for measuring the adjacent field light, the emission of the light from the clad 419b results in the noise. In order to prevent the occurrence of the noise, the clad 419b is coated with the metal coating as the light-intercepting metal film 421. Therefore, the former condition as mentioned above can be satisfied generally. Furthermore, since the materials of the recording medium 434 such as optomagnetic material, phase varying (changing) materials, etc. are conductor or semiconductor, and consequently the value of the resistance ratio of those materials is low. Therefore, the latter condition as mentioned above can be also satisfied on many occasions.

On such assumption as mentioned heretofore, a switch 476 which can be controlled by the computer 441 is further provided. The switch can be changed over from the side of the power source side 472 to the ground (earth), and vice versa. An approach voltage applying medium is constructed with the above power source 472.

At first, the power source 472 for emitting the approach voltage $V_{ap}$ is connected to the light-intercepting metal film 421 (common electrode 420) of the probe 436. Since the light-intercepting metal film 421 can be attached to the entire optical fiber 433, by connecting the power source 472 to the base-portion of the optical fiber 433 (probe 436), the approach voltage $V_{ap}$ can be applied to the tip end of the probes 436. The recording medium 434 is connected to the standard electric potential (ground) through the shaft of the spindle motor 435.

In such structure, the approach voltage $V_{ap}$ is applied across the light-intercepting metal film 421 at the tip end of the optical fiber 433 (probe 436) and the surface of the recording medium 434. At this time, if the distance d between the probe 436 and the surface of the recording medium 434 is neither equal to nor smaller than 20 nm, the inter-atomic force, that is, the shear force does not work sufficiently. However, since, the electrostatic attractive force is proportional to the square of the approach voltage $V_{ap}$ and inversely proportional to the square of the distance d between the probe 436 and the surface of the recording medium 434, the electrostatic force can work sufficiently from the position more largely parted therefrom than the case of the shear force (inter-atomic force).

Consequently, since the attention of the electrostatic attractive force in relation to the distance d is considerably mild (not sharp) compared with the case of the shear force, even though the distance d between the probe 436 and the surface of the recording medium 434 is large, the approach of the both can be grasped as the decrease of the amplitude of the quartz vibrator 443.

As to the extent of the distance between the probe 436 and the surface of the recording medium 434, the approach of the both to be grasped can be adjusted by the approach voltage $V_{ap}$. When the approach of the both is intended to grasp from the further distant place, it may be allowable to increase the approach voltage $V_{ap}$.

On this occasion, according to the fifteenth embodiment of the invention, the voltages $V_{1e}$ and $V_{2e}$ to be respectively applied to the electrodes 422 and 423 change with the same value as that of the increasing and decreasing approach voltage for the probe 436, the electric potential differences between the probe 436 and the electrodes 422 and 423 is regardless of the increase/decrease of the approach voltage $V_{ap}$ for the probe 436. Consequently, since the electric potential differences between the probe 436 and the electrodes 422 and 423 is determined only by the bias voltage $V_b$ and the control voltages $-V_a$ and $+V_a$, the tracking operation of the probe 436 is not affected at all by the approach voltage $V_{ap}$.

At the time of waiting, the slider 454 is brought into contact with the recording medium 434. At this time, the spindle motor 435 is rotated or stopped. However, it may be preferable that the spindle motor 435 is stopped in consideration of the risk that the probe 436 and the surface of the recording medium are brought into contact with each other.

Before performing the operations of writing-in and reading-out, keeping the state of applying the approach voltage $V_{ap}$ across the probe 436 and the recording medium 434, the quartz vibrator 443 and the probe 436 are vibrated by the piezoelectric element 447 with the resonance-frequency. The vibration amplitude of the probe 436 is always monitored from (by) the output of the quartz vibrator 443. The voltage of the rapid ramp rate is applied to the piling type piezoelectric element 445, and thereby the probe 436 is caused to approach the surface of the recording medium 434 with high speed. When the amplitude of the vibration becomes small, the voltage of the piling type piezoelectric element 445 is held and thereby the operation of causing the probe 436 to approach the surface of the recording medium 434 is stopped. Furthermore, the electric potential difference between the probe 436 and the recording medium 434 is eliminated and the voltage of the slow ramp rate is applied to the piling type piezoelectric element 445, the tip end of the probe 436 and the surface of the recording medium 434 are caused to approach each other so as to obtain the desired distance with low speed by use of the actuator (e.g., piezoelectric element, etc.) of a slight shock. Thereafter, the operations of writing-in and reading-out is started.

As an example, at the time of waiting, the slider 454 is previously made such that the distance between the tip end, of the probe 436 and the surface of the sliding-proof pad 446 is almost 0.5 $\mu$m. And then, for instance, the approach voltage $V_{ap}$ is set to almost 2V. The vibration amplitude of the probe 436 is always monitored from (by) the output of the quartz vibrator 443, and the voltage of the rapid ramp rate is applied to the piling-type piezoelectric element 445 and thereby the probe 436 is caused to approach the surface of the recording medium 434 with high speed.

When the distance between the probe 436 and the surface of the recording medium 434 becomes almost 200 nm, the vibration amplitude of the quartz vibrator 443 becomes small by the action of the electrostatic attractive force therebetween. The computer 441 grasps the variation (reduction) of the vibration amplitude and holds the voltage of the piling type piezoelectric element 445, and then stops the operation of causing the probe 436 to approach the surface of the recording medium 434. When the distance becomes smaller than almost 200 nm, the approach of the probe 436 to the surface of the recording medium 434 is detected and the movement of the probe 436 is stopped. In such way, there is no fear that the probe 436 collides with (strikes against) the surface of the recording medium 434 due to the overrun during the time period from the detection of the distance to the stopping of the probe movement. Consequently, the first approach can be performed with the comparatively high speed (approx. 0.1 um/s).

Next time, the switch 476 is changed over to the earth (ground) side. In such state, the electric potential difference between the probe 436 and the surface of the recording medium 434 disappears, and thereby the electrostatic attractive force is not exerted on both of the probe 436 and the recording medium 434. Thereafter, the voltage of the slow ramp rate is applied to the piling type piezoelectric element 445 and thereby the tip end of the probe 436 is caused to approach the surface of the recording medium 434 with the low speed (approx. 10 nm/s). When the probe 436 approaches the surface of the recording medium 436 to the extent of almost several tens nm, the vibration amplitude of the quartz 443 becomes small by the action of the shear force between the probe 436 and the surface of the recording medium 434. When both of them approach each other, the computer 441 grasps the approach therebetween and stops the deviation (displacement) of the piling type piezoelectric element 445. At this time, since the speed of approach becomes slower than that in the preceding stage, the probability of the overrun may becomes small. Consequently, even though the distance at the time of stopping between the probe 436 and the surface of the recording medium 434 becomes small, there occurs no fear that both of them collide with each other. Thereafter, the operations of writing-in and reading-out are started.

In such way, when the distance between the probe 436 and the surface of the recording medium 434 is large (long), both of them can be caused to approach each other with high speed, and thereby the approach between the probe 436 and the recording medium 434 can be grasped from the stage of large distance therebetween utilizing the electrostatic attractive force. As the result, the collision of the probe 436 with the recording medium can be prevented. By stepwisely decreasing the electric potential difference between the probe 436 and the surface of the recording medium 434 and the approaching speed therebetween, the sequence as mentioned heretofore can be performed. In the final approach, the voltage applied across both of them is eliminated. In such state, the distance between the probe 436 and the surface of the recording medium 434 is detected utilizing the shear force, and then the approach is finished.

When the distance therebetween is detected only by the shear force, unless both of them approach each other to the extent of several tens nm, the approach of both cannot be detected. Therefore, it is necessary to perform the approach with the very slow speed to the extent of several tens nm/s from the beginning of the approach. As the result, it is necessary to expense much time until the beginning of the writing-in and reading-out operations.

However, according to the fifteenth embodiment of the present invention, it is possible to select the speed of approaching speed corresponding to the distance between the probe 436 and the surface of the recording medium 434 as in the case of the background art 12. Consequently, the time until the starting of the writing-in and reading-out operations can be shortened.

To state concretely, in order to obtain the displacement of almost 500 um at several tens V as the piling type piezoelectric element 445, it may be preferable to use the piezoelectric element laminated with 20–30 layers. The thickness thereof may be almost 2 mm. It may be allowable to use a type of the piled piezoelectric element, the thickness of which increases when the voltage is applied thereto. However, in order to make large the distance between the probe 436 and the surface of the recording medium 434 at the time of waiting or at the time of turning off the power source, it may be more preferable to use another type of the piled piezoelectric element, the thickness of which decreases when the voltage is applied thereto.

Moreover, in the fifteenth embodiment, although the electric potential difference between the probe 436 and the surface of the recording medium 434 is eliminated in the final approach, it is not limited to the above-mentioned. For instance, it may be also allowable that the approaching voltage value at the final approach is further lowered than the approaching voltage value $V_{ap}$ at the approach just one step preceding to the final approach, and keeping the state of the approaching voltage $V_{ap}$ the electrostatic attractive force is applied (exerted), and then the approach is finished. In such way, on the condition that the approaching voltage is applied thereto, the electrostatic attractive force can be detected and at the same time, the distance between the probe 436 and the surface of thee recording medium can be kept constant, and then, the operations of writing-in reading-out on the recording medium can be done. Furthermore, in the final approach, even though the approach voltage value at the final approach is not further lowered than the approach voltage value $V_{ap}$ at the approach just one step preceding to the final approach, same operations can be done.

In such way as mentioned heretofore, according to the fifteenth embodiment, both of the lowering of the tracking control voltage due to the bias voltage $V_b$ and the control voltages $-V_a$ and $+V_a$ and the improvement of the linearity in relation to the tracking control voltage may not be affected at all by the approach voltage $V_{ap}$ applied to the probe in order to realize the rapid approach.

Consequently, the embodiment can accomplish both of the rapid approach and lowering of the tracking control voltage and the improvement of the linearity in relation to the tracking control voltage. Furthermore, in order to realize the rapid approach, it is not necessary to use the special pattern as in the case of the background art 13. In addition, it is not necessary to expense so much time for the signal processing.

Moreover, in the thirteenth through fifteenth embodiments, although, the circular disc on which the data row is arranged in the state of circular circumference is assumed as the recording medium 15 or 34, the disc is not always limited thereto. It may be allowable to use a card-shaped (flat) recording medium on which the data row is arranged linearly.

SUMMARY OF THIRTEENTH THROUGH FIFTEENTH EMBODIMENTS

As is apparent from the foregoing descriptions, according to the present invention, some advantageous functional effects as mentioned below can be attained.

According to the thirteenth embodiment of the present invention, the information recording and reproducing apparatus includes the control voltage applying medium for applying the control voltage to a pair of electrodes mounted so as to put the probe therebetween in the tracking direction perpendicular to the track direction of the data row arrangement on the recording medium in order to displace (deviate) the tip end of the probe in the tracking direction, and further includes the bias voltage applying medium for applying to the probe the bias voltage independent from the control voltage. In such structure, the bias voltage, independent from the control voltage, and the standard voltage of those voltages can be taken commonly (connected commonly to each other). Consequently, the stability of the control voltage can be improved and the circuit construction can be further simplified.

According to the fourteenth embodiment of the present invention, since the value of the bias voltage is suitably set to a value such that the value may become larger than a quarter (¼) of the control voltage value required for the probe to receive a desired force at the time of not applying the bias voltage thereto, the linearity of the electrostatic attractive force can be improved and the control voltage for the tracking can be lowered. In addition, the load of the circuit for outputting the control voltage can be reduced.

According to the fifteenth embodiment of the present invention, the high-speed approach operation can be intended to realize by applying the approach voltage to the probe only at the time of causing the probe to approach the recording medium. For this reason, it is not necessary to use a special pattern, and the signal processing time does not become long at all.

On this occasion, although the control voltage, the bias voltage, and the approach voltage are superposedly applied to the electrodes), since the voltage to be applied to the electrode(s) changes with same value as the increase/decrease of the approach voltage in cooperation therewith, such voltage change does not exert any influence upon the electric potential difference due to the control voltage and the bias voltage. Consequently, it may be possible to improve the control property of the tracking operation and to lower the control voltage.

SIXTEENTH EMBODIMENT

Most optical discs are intended to read using reflective light and feature a reflective layer. Some optical discs are intended to be read using transmitted light and therefore do no include a reflective layer. However, even in such discs, there is some reflective light produced due to a difference in the refractive indices of the various layers which comprise an optical disc.

Figure 61:
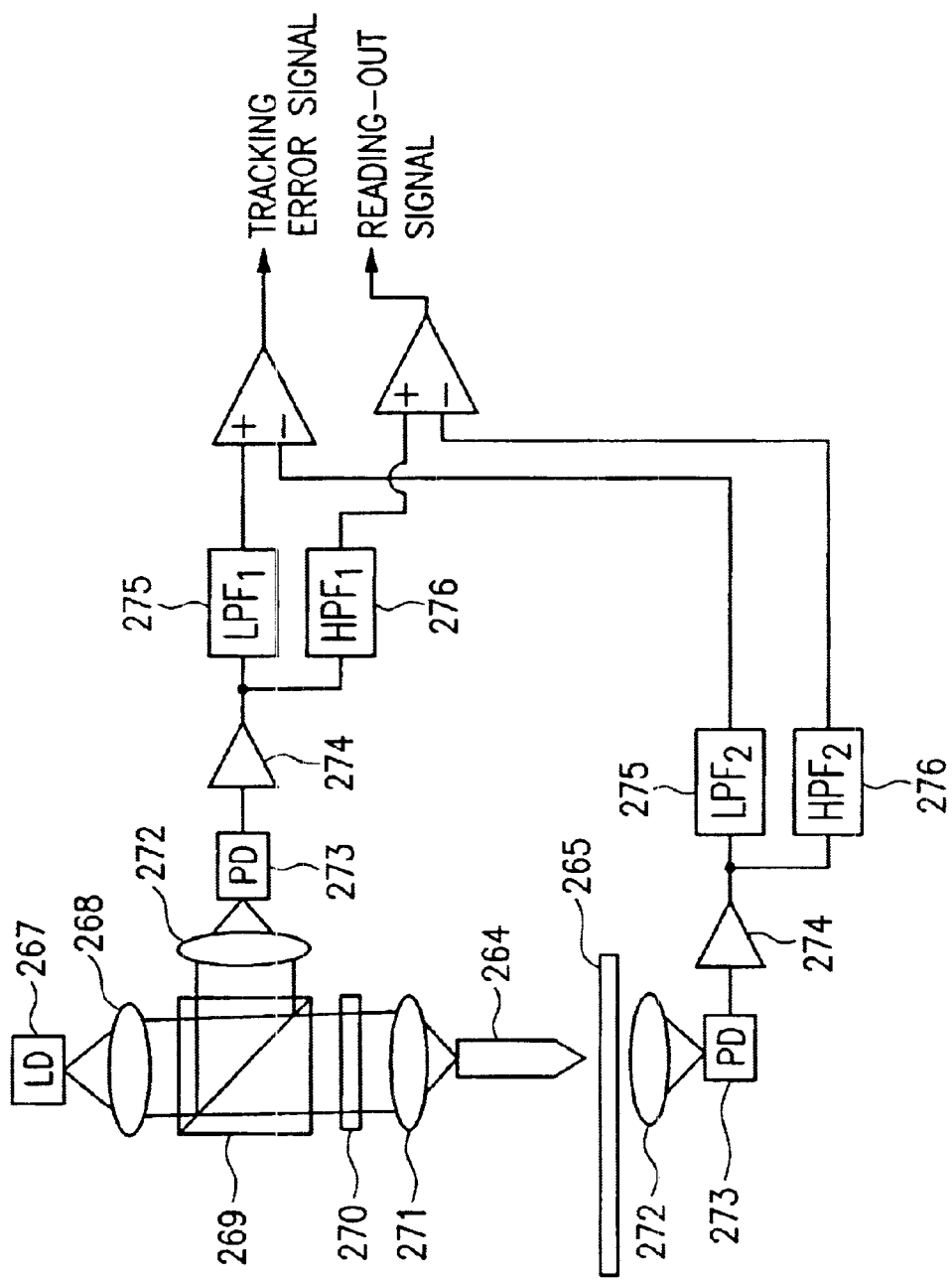
FIG. 61 is an illustration of the sixteenth embodiment.

FIG. 61 is a structural block diagram of an optical information recording and reproducing apparatus for performing the operation of recording and reproducing said optical information on a recoding medium by radiating light from the tip end of a probe. The apparatus comprises a moving apparatus for periodically moving the radiating position of said light in a direction perpendicular to the direction of the data row arrangement on said optical information recording medium; and a signal taking-out apparatus for acquiring tracking error signal on said radiating position from reflected light ($LPF_1$ 275, $HPF_1$ 276) and transmitted light ($LPF_2$ 275, $HPF_2$ 276) in said light in relation to said periodic movement. The magnitude of the signal obtained by using both the reflected light and the transmitting light is greater than that obtained using only the reflected light or the transmitting light.

The first through fifteenth embodiments of the present invention have been described heretofore. However, obviously, other numerous additional embodiments and modifications or variations of the present invention are possible in light of the above teachings. It is therefore to be understood that, within the scope of the appended claims, the present invention may be practiced otherwise than specifically described herein.

This document claims priority and contains subject matter-related to Japanese:Patent Application No. JAPA 10-351, 189, filed in the Japanese Patent Office on Dec. 10, 1998, Japanese Patent Application No. JAPA 11-021, 194, filed in the Japanese Patent Office on Jan. 29, 1999, Japanese Patent Application No. JAPA 11-055, 207, filed in the Japanese Patent Office on Mar. 3, 1999, and Japanese Patent Application No. JAPA 11-195, 545, filed in the Japanese Patent Office on Jul. 9, 1999, and the entire contents of which are hereby incorporated by reference.

What is claimed is:

1. An optical information recording and reproducing apparatus for performing the operation of recording and reproducing said optical information on recording medium by radiating light from the tip end of a probe comprising:

a moving apparatus for periodically moving the radiating position of said light in a direction perpendicular to the direction of the data row arrangement on said optical information recording medium; and a signal taking-out apparatus for acquiring tracking error signal on said-radiating position from reflected light and transmitted light in said light in relation to said periodical movement.

2. The optical information recording and reproducing apparatus as defined in claim 1, wherein a predetermined signal is taken out from said light radiated onto said optical information recording medium and the instantaneous value thereof is held; and wherein said tracking error signal and a distance signal in relation to the distance between the tip end of said probe for radiating said light and the surface of said optical information recording medium are acquired from said instantaneous value.

3. The optical information recording and reproducing apparatus as defined in claim 2, wherein said moving apparatus is an actuator same as a tracking apparatus for tracking said radiating position of said light.

4. The optical information recording and reproducing apparatus as defined in claim 1, wherein a predetermined signal is taken out from said light radiated onto said optical information recording medium and the maximum value and the minimum value of said taken-out predetermined signal; and wherein said tracking error signal and a distance signal in relation to the distance between the tip end of said probe and the surface of said-recording medium are acquired from the maximum value and the minimum value thereof.

5. The optical information recording and reproducing apparatus as defined in claim 4, wherein said moving apparatus is an actuator same as a tracking apparatus for tracking said radiating position of said light.

6. The optical information recording and reproducing apparatus as defined in claim 1, wherein said moving apparatus moves the radiating position of said light with a frequency w;

wherein said signal taking-out apparatus takes out the signal from said light radiated onto said optical information recording medium and acquires said tracking error signal from the frequency component w of said signal of said radiated light; and wherein a distance signal in relation to the distance between the tip end of said probe and the surface of said recording medium is acquired from the frequency component 2w.

7. The optical information recording and reproducing apparatus as defined in claim 6, wherein said moving apparatus is an actuator same as a tracking apparatus for tracking said radiating position of said light.

8. The optical information recording and reproducing apparatus as defined in claim 1, wherein said moving apparatus vibrates said probe with the resonance frequency $w_o$ thereof and thereby moves said radiating position of said light with the frequency $w_o$;

wherein said signal taking-out apparatus takes out said signal from said light radiated onto said optical information recording medium and acquires said tracking error signal from the component of said frequency $w_o$ of said signal; and wherein a distance signal in relation to the distance between the tip end of said probe and the surface of said recording medium from the component of said frequency $2w_0$ of said signal.

9. The optical information recording and reproducing apparatus as defined in claim 8, wherein said moving apparatus is an actuator same as a tracking apparatus for tracking said radiating position of said light.

10. The optical information recording and reproducing apparatus as defined in claim 1, wherein said moving apparatus is an actuator same as a tracking apparatus for tracking said radiating position of said light.

11. The optical information recording and reproducing apparatus as defined in claim 10, wherein said actuator utilizes an electrostatic attractive force.

12. The optical information recording and reproducing apparatus as defined in claim 10, wherein said actuator utilizes an electromagnetic force.

13. The optical information recording and reproducing apparatus as defined in claim 10, wherein said actuator utilizes a piezoelectric effect.

14. An optical information recording and reproducing apparatus for performing the operation of recording and reproducing said optical information on recording medium by radiating light from the tip end of a probe comprising:

a moving apparatus for periodically moving the radiating position of said light in a direction perpendicular to the direction of the data row arrangement on said optical information recording medium; and a signal taking-out apparatus for acquiring distance signal in relation to the distance between the tip end of said probe for radiating said light and the surface of said optical information recording medium from reflected light and transmitted-light in said light in relation to said periodical movement.

15. The optical information recording and reproducing apparatus as defined in claim 14, wherein a predetermined signal is taken out from said light radiated onto said optical information recording medium and the instantaneous value thereof is held; and wherein a tracking error signal and said distance signal in relation to the distance between the tip end of said probe for radiating said light and the surface of said optical information recording medium are acquired-from said instantaneous value.

16. The optical information recording and reproducing apparatus as defined in claim 15, wherein said moving apparatus is an actuator same as a tracking apparatus for tracking said radiating position of said light.

17. The optical information recording and reproducing apparatus as defined in claim 14, wherein a predetermined signal is taken out from said light radiated onto said optical information recording medium and the maximum value and the minimum value of said taken-out predetermined signal; and wherein a tracking error signal and said distance signal in relation to the distance between the tip end of said probe and the surface of said recording medium are acquired from the maximum value and the minimum value thereof.

18. The optical information recording and reproducing apparatus as defined in claim 17, wherein said moving apparatus is an actuator same as a tracking apparatus for tracking said radiating position of said light.

19. The optical information recording and reproducing apparatus as defined in claim 14, wherein said moving apparatus moves the radiating position of said light with a frequency w;

wherein said signal taking-out apparatus takes out the signal from said light radiated onto said optical information recording medium and acquires a tracking error signal from the frequency component w of said signal of said radiated light; and wherein said distance signal in relation to the distance between the tip end of said probe and the surface of said recording medium is acquired from the frequency component 2w.

20. The optical information recording and reproducing apparatus as defined in claim 19, wherein said moving apparatus is an actuator same as a tracking apparatus for tracking said radiating position of said light.

21. The optical information recording and reproducing apparatus as defined in claim 14, wherein said moving apparatus vibrates said probe with the resonance frequency $w_o$ thereof and thereby moves said radiating position of said light with the frequency $w_o$;

wherein said signal taking-out apparatus takes out said signal from said light radiated onto said optical information recording medium and acquires a tracking error signal from the component of said frequency $w_o$ of said signal; and wherein said distance signal in relation to the distance between the tip end of said probe and the surface of said recording medium from the component of said frequency $2w_0$ of said signal.

22. The optical information recording and reproducing apparatus as defined in claim 21, wherein said moving apparatus is an actuator same as a tracking apparatus for tracking said radiating position of said light.

23. The optical information recording and reproducing apparatus as defined in claim 14, wherein said moving apparatus is an actuator same as a tracking apparatus for tracking said radiating position of said light.

24. The optical information recording and reproducing apparatus as defined in claim 23, wherein said actuator utilizes an electrostatic attractive force.

25. The optical information recording and reproducing apparatus as defined in claim 23, wherein said actuator utilizes an electromagnetic force.

26. The optical information recording and reproducing apparatus as defined in claim 23, wherein said actuator utilizes a piezoelectric effect.

27. A method of performing the operation of recording and reproducing optical information on recording medium by radiating light from the tip end of a probe comprising the steps of:

periodically moving the radiating position of said light by use of a moving apparatus in a direction perpendicular to the direction of the data row arrangement on said optical information recording medium; and acquiring tracking error signal on said radiating position from reflected light and transmitted light in said light in relation to said periodical movement by use of a signal taking-out apparatus.

28. The method of performing the operation of recording and reproducing optical information as defined in claim 27 further comprising the steps of:

taking out a predetermined signal from said light radiated onto said optical information recording medium and holding the instantaneous value thereof; and ;

acquiring said tracking error signal and a distance signal in relation to the distance between the tip end of said probe for radiating said light and the surface of said optical information recording medium from said instantaneous value.

29. The method of performing the operation of recording and reproducing optical information as defined in claim 28, wherein said moving apparatus is an actuator same as a tracking apparatus for tracking said radiating position of said light.

30. The method of performing the operation of recording and reproducing optical information as defined in claim 27 further comprising the steps of:

taking out a predetermined signal from said light radiated onto said optical information recording medium and the maximum value and the minimum value of said taken-out predetermined signal; and acquiring said tracking error signal and a distance signal in relation to the distance between the tip end of said probe and the surface of said recording medium from the maximum value and the minimum value thereof.

31. The method of performing the operation of recording and reproducing optical information as defined in claim 30, wherein said moving apparatus is an actuator same as a tracking apparatus for tracking said radiating position of said light.

32. The method of performing the operation of recording and reproducing optical information as defined in claim 27 further comprising the steps of:

moving the radiating position of said light with a frequency w by use of said moving apparatus;

taking out the signal from said light radiated onto said optical information recording medium by use of said signal taking-out apparatus;

acquiring said tracking error signal from the frequency component w of said signal of said radiated light; and acquiring a distance signal in relation to the distance between the tip end of said probe and the surface of said recording medium from the frequency component 2w.

33. The method of performing the operation of recording and reproducing optical information as defined in claim 32, wherein said moving apparatus is an actuator same as a tracking apparatus for tracking said radiating position of said light.

34. The method of performing the operation of recording and reproducing optical information as defined in claim 27 further comprising the steps of:

vibrating said probe with the resonance frequency $w_0$ thereof by use of said moving apparatus and thereby moving said radiating position of said light with the frequency $w_0$;

taking out said signal from said light radiated onto said optical information recording medium by use of said signal taking-out apparatus;

acquiring said tracking error signal from the component of said frequency $w_o$ of said signal; and acquiring a distance signal in relation to the distance between the tip end of said probe and the surface of said recording medium from the component of said frequency $2W_o$ of said signal.

35. The method of performing the operation of recording and reproducing optical information as defined in claim 34 wherein said moving apparatus is an actuator same as a tracking apparatus for tracking said radiating position of said light.

36. The method of performing the operation of recording and reproducing optical information as defined in claim 27, wherein said moving apparatus is an actuator same as a tracking apparatus for tracking said radiating position of said light.

37. The method of performing the operation of recording and reproducing optical information as defined in claim 36, wherein said actuator utilizes an electrostatic attractive force.

38. The method of performing the operation of recording and reproducing optical information as defined in claim 36, wherein said actuator utilizes an electromagnetic force.

39. The method of performing the operation of recording and reproducing optical information as defined in claim 36, wherein said actuator utilizes a piezoelectric effect.

40. A method of performing the operation of recording and reproducing optical information on recording medium by radiating light from the tip end of a probe comprising the steps of:

periodically moving the radiating position of said light by use of a moving apparatus in a direction perpendicular to the direction of the data row arrangement on said optical information recording medium; and acquiring distance signal in relation to the distance between the tip end of said probe for radiating said light and the surface of said optical information recording medium from reflected light and transmitted light in said light in relation to said periodical movement by use of a signal taking-out apparatus.

41. The method of performing the operation of recording and reproducing optical information as defined in claim 40 further comprising the steps of:

taking out a predetermined signal from said light radiated onto said optical information recording medium and holding the instantaneous value thereof; and acquiring a tracking error signal and said distance signal in relation to the distance between the tip end of said probe for radiating said light and the surface of said optical information recording medium from said: instantaneous value.

42. The method of performing the operation of recording and reproducing optical information as defined in claim 41, wherein said moving apparatus is an actuator same as a tracking apparatus for tracking said radiating position of said light.

43. The method of performing the operation of recording and reproducing optical information as defined in claim 40 further comprising the steps of:

taking out a predetermined signal from said light radiated onto said optical information recording medium and the maximum value and the minimum value of said taken-out predetermined signal; and acquiring a tracking error signal and said distance signal in relation to the distance between the tip end of said probe and the surface of said recording medium from the maximum value and the minimum value thereof.

44. The method of performing the operation of recording and reproducing optical information as defined in claim 43 wherein said moving apparatus is an actuator same as a tracking apparatus for tracking said radiating position of said light.

45. The method of performing the operation of recording and reproducing optical information as defined in claim 40 further comprising the steps of:

moving the radiating position of said light with a frequency w by use of said moving apparatus;

taking out the signal from said light radiated onto said optical information recording medium by use of said signal taking-out apparatus;

acquiring a tracking error signal from the frequency component w of said signal of said radiated light; and acquiring said distance signal in relation to the distance between the tip end of said probe and the surface of said recording medium from the frequency component 2w.

46. The method of performing the operation of recording and reproducing optical information as defined in claim 45, wherein said moving apparatus is an actuator same as a tracking apparatus for tracking said radiating position of said light.

47. The method of performing the operation of recording and reproducing optical information as defined in claim 40 further comprising the steps of:

vibrating said probe with the resonance frequency $w_o$ thereof by use of said moving apparatus and thereby moving said radiating position of said light with the frequency $w_o$;

taking out said signal from said light radiated onto said optical information recording medium by use of said signal taking-out apparatus;

acquiring a tracking error signal from the component of said frequency $w_o$ of said signal; and acquiring said distance signal in relation to the distance between the tip end of said probe and the surface of said recording medium from the component of said frequency $2W_o$ of said signal.

48. The method of performing the operation of recording and reproducing optical information as defined in claim 47, wherein said moving apparatus is an actuator same as a tracking apparatus for tracking said radiating position of said light.

49. The method of performing the operation of recording and reproducing optical information as defined in claim 40, wherein said moving apparatus is an actuator same as a tracking apparatus for tracking said radiating position of said light.

50. The method of performing the operation of recording and reproducing optical information as defined in claim 49, wherein said actuator utilizes an electrostatic attractive force.

51. The method of performing the operation of recording and reproducing optical information as defined in claim 49, wherein said actuator utilizes an electromagnetic force.

52. The method of performing the operation of recording and reproducing optical information as defined in claim 49, wherein said actuator utilizes a piezoelectric effect.

53. An optical information recording and reproducing apparatus for performing the operation of recording and reproducing said optical information on recording medium by radiating light from the tip end of a probe comprising:

light moving means for periodically moving the radiating position of said light in a direction perpendicular to the direction of the data row arrangement on said optical information recording medium; and signal taking-out means for acquiring tracking error signal on said radiating position from reflected light and transmitted light in said light in relation to said periodical movement.

54. An optical information recording and reproducing apparatus for performing the operation of recording and reproducing said optical information on recording medium by radiating light from the tip end of a probe comprising:

light moving means for periodically moving the radiating position of said light in a direction perpendicular to the direction of the data row arrangement on said optical information recording medium; and signal taking-out means for acquiring distance signal in relation to the distance between the tip end of said probe for radiating said light and the surface of said optical information recording medium from reflected light and transmitted light in said light in relation to said periodical movement.

* * * * *